United States Patent
Wu et al.

(10) Patent No.: US 10,960,394 B2
(45) Date of Patent: Mar. 30, 2021

(54) MICROFLUIDIC DETERMINATION OF LOW ABUNDANCE EVENTS

(71) Applicant: Amberstone Biosciences, Inc., Laguna Hills, CA (US)

(72) Inventors: George Guikai Wu, Cerritos, CA (US); Hamed Shadpour, Mission Viejo, CA (US); Per Niklas Hedde, Irvine, CA (US)

(73) Assignee: Amberstone Biosciences, Inc., Laguna Hills, CA (US)

( * ) Notice: Subject to any disclaimer, the term of this patent is extended or adjusted under 35 U.S.C. 154(b) by 0 days.

(21) Appl. No.: 16/888,047

(22) Filed: May 29, 2020

(65) Prior Publication Data

US 2020/0376488 A1    Dec. 3, 2020

Related U.S. Application Data

(60) Provisional application No. 62/855,734, filed on May 31, 2019.

(51) Int. Cl.
*B01L 3/00* (2006.01)
*G01N 15/14* (2006.01)
(Continued)

(52) U.S. Cl.
CPC ....... *B01L 3/502715* (2013.01); *B01L 3/0241* (2013.01); *B01L 3/0268* (2013.01);
(Continued)

(58) Field of Classification Search
None
See application file for complete search history.

(56) References Cited

U.S. PATENT DOCUMENTS

| | | |
|---|---|---|
| 6,778,724 B2 | 8/2004 | Wang et al. |
| 8,730,479 B2 | 5/2014 | Ness et al. |

(Continued)

FOREIGN PATENT DOCUMENTS

| | | |
|---|---|---|
| WO | WO-2015015199 A2 | 2/2015 |
| WO | WO-2016024095 A1 | 2/2016 |

(Continued)

OTHER PUBLICATIONS

Baret, et al. Fluorescence-activated droplet sorting (FADS): efficient microfluidic cell sorting based on enzymatic activity. Lab Chip. Jul. 7, 2009;9(13):1850-8. doi: 10.1039/b902504a. Epub Apr. 23, 2009.

(Continued)

*Primary Examiner* — Neil N Turk
(74) *Attorney, Agent, or Firm* — Wilson Sonsini Goodrich & Rosati

(57) ABSTRACT

Provided are microfluidic systems and methods for detecting, sorting, and dispensing of low abundance events such as single cells and particles, including a variety of eukaryotic and bacterial cells, for a variety of bioassay applications. The systems and methods described herein, when implemented in whole or in part, will make relevant microfluidic based tools available for a variety of applications in biotechnology including antibody discovery, immuno-therapeutic discovery, high-throughput single cell analysis, target-specific compound screening, and synthetic biology screening.

13 Claims, 36 Drawing Sheets

(51) Int. Cl.
   *B01L 3/02* (2006.01)
   *G01N 15/10* (2006.01)
(52) U.S. Cl.
   CPC ......... *B01L 3/5085* (2013.01); *B01L 3/50273* (2013.01); *B01L 3/502761* (2013.01); *B01L 3/502784* (2013.01); *G01N 15/147* (2013.01); *G01N 15/1434* (2013.01); *G01N 15/1459* (2013.01); *G01N 15/1484* (2013.01); *B01L 2200/0647* (2013.01); *B01L 2200/0673* (2013.01); *B01L 2300/06* (2013.01); *B01L 2300/0654* (2013.01); *B01L 2400/02* (2013.01); *G01N 2015/1006* (2013.01); *G01N 2015/149* (2013.01); *G01N 2015/1452* (2013.01)

(56) References Cited

U.S. PATENT DOCUMENTS

| | | | |
|---|---|---|---|
| 8,765,455 | B2 | 7/2014 | Beer et al. |
| 2005/0103690 | A1* | 5/2005 | Kawano ............. G01N 15/1484 209/576 |
| 2012/0078531 | A1 | 3/2012 | Lo et al. |
| 2012/0122084 | A1 | 5/2012 | Wagner et al. |
| 2012/0196288 | A1* | 8/2012 | Beer ....................... C12Q 1/686 435/6.12 |
| 2018/0056288 | A1 | 3/2018 | Abate et al. |
| 2018/0321130 | A1 | 11/2018 | Wu |

FOREIGN PATENT DOCUMENTS

| | | |
|---|---|---|
| WO | WO-2016174229 A1 | 11/2016 |
| WO | WO-2016193758 A1 | 12/2016 |

OTHER PUBLICATIONS

Debs, et al. Functional single-cell hybridoma screening using droplet-based microfluidics. Proc Natl Acad Sci USA. Jul. 17, 2012;109(29): 11570-11575. doi: 10.1073/pnas.1204514109. Epub Jul. 2, 2012.

Debs, et al. Functional single-cell hybridoma screening using droplet-based microfluidics. Supporting Information. Proc Natl Acad Sci USA. Jul. 17, 2012;109(29):1-6. doi: 10.1073/pnas.1204514109. Epub Jul. 2, 2012.

Eyer, et al. Single-cell deep phenotyping of IgG-secreting cells for high-resolution immune monitoring. Nat Biotechnol. Oct. 2017;35(10):977-982. doi: 10.1038/nbt.3964. Epub Sep. 11, 2017.

Frenzel, et al. Microfluidic train station: highly robust and multiplexable sorting of droplets on electric rails. Lab on a Chip. The Royal Society of Chemistry. Feb. 17, 2017. 17(6). pp. 1024-1030. doi:10.1039/c6lc01544a.

Mazutis, et al. Single-cell analysis and sorting using droplet-based microfluidics. Nat Protoc. May 2013; 8(5): 870-891. Published online Apr. 4, 2013. doi: 10.1038/nprot.2013.046.

Mcgorty, et al. Open-top selective plane illumination microscope for conventionally mounted specimens. Opt Express. Jun. 15, 2015; 23(12): 16142-16153. Published online Jun. 9, 2015. doi: 10.1364/OE.23.016142.

Cole, et al. Printed droplet microfluidics for on demand dispensing of picoliter droplets and cells. Proc Natl Acad Sci USA. Aug. 15, 2017;114(33):8728-8733. doi: 10.1073/pnas.1704020114. Epub Jul. 31, 2017.

International search report with written opinion dated Sep. 14, 2020 for PCT/US2020/035340.

* cited by examiner

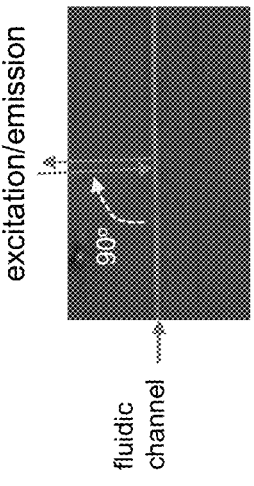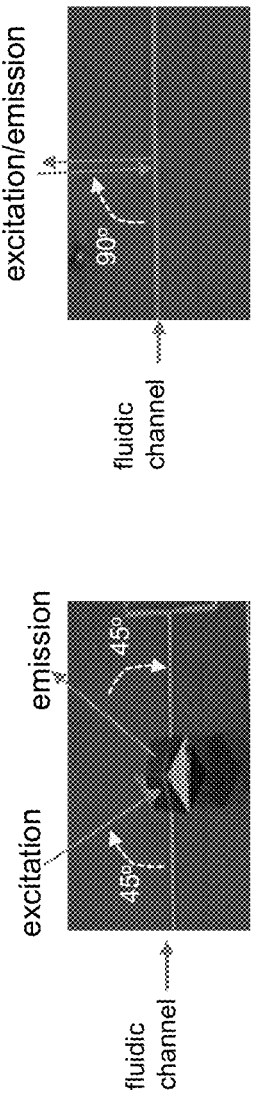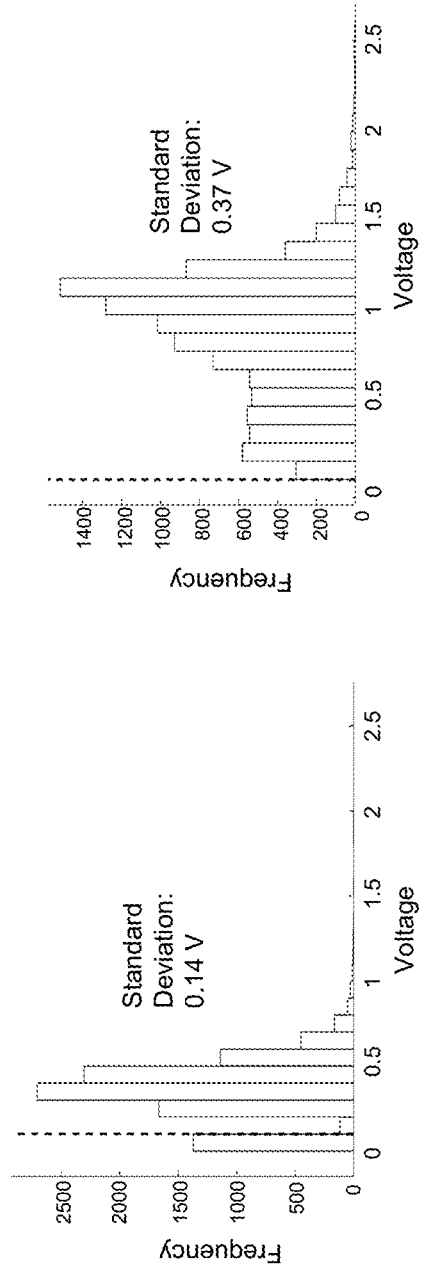
Figure 19A
Figure 19B
Figure 19C
Figure 19D

MICROFLUIDIC DETERMINATION OF LOW ABUNDANCE EVENTS

CROSS-REFERENCE

This application claims the benefit of U.S. Provisional Application No. 62/855,734, filed May 31, 2019, entitled "Microfluidic Determination of Low Abundance Events", which application is incorporated herein by reference.

BACKGROUND

Single cell analysis technologies are critical to biotechnological research and development due to the complex heterogeneity of cells, and their interconnectedness with each other. A widely used single cell analysis tool is flow cytometry (FC), which is able to analyze individual cells according to their size, shape, and the fluorescence properties of cell surface and intracellular markers. It is called fluorescence activated cell sorting (FACS) when the device also enables the sorting of specific cells from a heterogeneous cell population.

The great success of FACS is in part due to its high throughput for screening individual single cells based on fluorescent detection at up to tens of thousands of cells per second. However, FACS can neither be used to probe secreted factors from individual single cells, nor probe the interactions between two single cells.

A variety of microfluidic technologies have been developed for single cell analysis, including microchambers, micro-wells, and droplets. Microchambers and nano-wells have limited applications due to their relatively low throughput. In the past decade, droplet microfluidics has gained increasingly more attention. Droplet microfluidics are uniquely advantageous due to the ultra-small assay volume (usually less than 1 nanoliter (nL)), flexible throughput (thousands to hundreds of millions of cells), and maneuverability such as merging, splitting, trapping, detecting, and sorting, which fit well for many biological assays of individual single cells including genomic analysis and live cell assays.

Despite the progress of droplet technologies, there remain major bottle necks that limit important applications requiring highly accurate and efficient single cell or particle detection and isolation. For example, antigen-specific high-quality T or B cells are generally low abundance events among a T or B cell immune repertoire, respectively. There are significant unmet demands to further improve the accuracy and efficiency of current droplet technologies, which will enable the effective isolation of such low abundance events prevalent in many biological applications.

SUMMARY

It would therefore be desirable to provide devices, systems, and methods which enable more accurate and efficient detecting, sorting, and dispensing of low abundance events such as single cells and particles. Not necessarily all such aspects or advantages are achieved by any particular embodiment. Thus, various embodiments may be carried out in a manner that achieves or optimizes one advantage or group of advantages taught herein without necessarily achieving other aspects or advantages as may also be taught or suggested herein.

The present disclosure is related to systems and methods for detecting, sorting, and dispensing droplets in bioassays, including determining low abundance events such as rare single-cell clones and entities that are present in a complex biological sample.

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

Provided are methods, modules and systems for detecting, sorting, and dispensing water-in-oil droplets or emulsions comprising cell(s) and/or particle(s) in a microfluidic system. Provided are advanced modules, systems and methods for highly efficient sorting and dispensing of single cells in low abundance events related applications using one, two or more detection points and/or serial sorting. Provided are also the methods and systems for synchronizing droplet detection and dispensing in support of the post-processing downstream analyses.

In a first aspect, a system for detecting, sorting, and dispensing droplets for use in bioassays is provided. The system comprises a microfluidic device comprising a first channel connected to a second channel and a waste channel by a first sorting junction; a plurality of water-in-oil droplets, wherein at least two of the plurality of droplets each comprise at least one cell, at least one particle, or at least one cell plus at least one particle; a first detector or sensor corresponding to a first point of detection disposed along the first channel upstream of the sorting junction, wherein the first detector comprises an optical detector; a second detector or sensor corresponding to a second point of detection disposed along the second channel downstream of the sorting junction; a target droplet dispensing module comprising a dispensing nozzle disposed downstream of the second point of detection; and a processor configured to index each of a plurality of target droplets dispensed by the dispensing nozzle with an optical signal of the same target droplet detected by a) the first detector or sensor at the first point of detection, b) the second detector or sensor at the second point of detection, or c) both the first detector or sensor and the second detector or sensor.

In some embodiments, the system may further comprise a droplet generation module, a droplet incubation module, or a droplet generation plus a droplet incubation module.

In some embodiments, the at least one cell may be a mammalian cell, a eukaryotic cell, a yeast cell, a bacterial cell, a primary cell, an immortalized cell, a cancer cell, a hybrid cell, or a derivative or an engineered form thereof.

In some embodiments, the at least one particle may be a microparticle or a nanoparticle.

In some embodiments, the optical detector may comprise a photo multiplier tube (PMT), a camera-like device, a charge coupled device (CCD) camera, a complementary metal-oxide semiconductor (CMOS) camera, or an avalanche photodiode detector (APD).

In some embodiments, the second detector or sensor may comprise an optical sensor or a non-optical sensor. The optical sensor or non-optical sensor may be configured to detect the presence of a droplet in a non-discriminative manner with respect to the at least one cell or at least one particle.

In some embodiments, the second detector or sensor may comprise an optical sensor or a non-optical sensor. The optical sensor or non-optical sensor may be configured to detect the presence of a droplet, a relative speed of the droplet, and/or a size of the droplet in the second channel.

In some embodiments, the second detector or sensor may comprise an optical detector or a non-optical detector.

In some embodiments, the second detector or second sensor may comprise an optical detector. In some embodiments, the second detector or second sensor may comprise a photo multiplier tube (PMT), a camera, a camera-like device, a camera-like detector, a charge coupled device (CCD) camera, a complementary metal-oxide semiconductor (CMOS) camera, or an avalanche photodiode detector (APD).

In some embodiments, the second detector or sensor may be configured to detect two or more optical signals (e.g., images) for each of a plurality of target droplets, wherein the two or more optical signals (e.g., images) detected by the second detector or sensor comprise the second signal from the second point of detection. In some embodiments, the two or more images for each of the plurality of target droplets may comprise a signal generated by a modulated or pulsed light source configured to provide repetitive short illumination of light energy. In some embodiments, the modulated or pulsed light source may optionally comprise one or more lasers or laser-like sources configured to provide stroboscopic illumination.

In some embodiments, the system may comprise an optical assembly configured to provide a short illumination for generating one of the two or more optical signals at the second point of detection. The duration of the short illumination may be within a range of about 0.5 to about 50 milliseconds, or about 5 to about 30 milliseconds. In some embodiments, the optical assembly may comprise a modulated or pulsed laser source, and wherein the short illumination comprises stroboscopic illumination provided by the modulated or pulsed laser source. In some embodiments, the first detector or sensor may be configured to provide a precise timing trigger to the optical assembly to trigger the stroboscopic illumination. Alternatively, or in combination, the processor may be configured to synchronize the first detector or sensor with triggering of modulated or pulsed light source to repetitively illuminate (such as with stroboscopic illumination) the second point of detection.

In some embodiments, the system may comprise an optical assembly configured to provide droplet imaging (e.g., with stroboscopic illumination) at a point of detection (e.g., the first or the second point of detection). An upstream detector or sensor (e.g., the first detector or sensor or a third detector or sensor) may be configured to detect or sense a droplet upstream of the point of detection in order to provide a first signal to trigger illumination (such as stroboscopic illumination) at an appropriate timing to image a droplet with high spatiotemporal resolution at the designated point of detection (e.g., to generate a second signal). Such a signal generated by imaging can be used to inform subsequent droplet sorting and/or droplet dispensing. A processor may be configured to synchronize the sorting and/or dispensing mechanism with one or more of the first and the second detectors or sensors based on one or more of the first and the second signals/images.

In some embodiments, the second detector or second sensor may comprise a non-optical detector configured to detect non-optical signals. The non-optical signals may represent individual droplets. The non-optical signals may comprise contact conductivity, contactless conductivity, impedance, or magnetic force.

In some embodiments, the system may comprise one or more bypass channels connected to a main fluidic channel downstream of a sorting junction but upstream of a dispensing nozzle (i.e., this segment of fluidic channel is a "sorting channel") The bypass channel may be further connected to a widened channel, compartment, or chamber (generally, a "buffer zone") that may serve to reduce the speed of traveling droplets in the sorting channel. In some embodiments, a serial or an array of pillars may be provided at the interface between the bypass channels and the sorting channel to constrain the droplets moving along the sorting channel.

In some embodiments, the at least one cell may be labelled with a fluorophore or expresses a fluorescent molecule. Alternatively, or in combination, the at least one cell may express a luminescent or luminogenic molecule.

In some embodiments, the at least one particle may be labelled with a fluorophore.

In some embodiments, the second point of detection may be disposed about 1 cm to about 60 cm upstream of the dispensing nozzle.

In some embodiments, any of the systems described herein may further comprise a third detector or sensor corresponding to a third point of detection disposed downstream of the second point of detection and upstream of the target droplet dispensing module. In some embodiments, the third point of detection may be disposed about 1 cm to about 60 cm upstream of the dispensing nozzle In some embodiments, any of the systems described herein may comprise a third channel connected to the second channel and a second waste channel by a second sorting junction, the second sorting junction disposed downstream of the first sorting junction and upstream of the target droplet dispensing module. The system may further comprise a third detector or sensor corresponding to a third point of detection disposed downstream of the second sorting junction and upstream of the target droplet dispensing module. In some embodiments, the third point of detection may be disposed about 1 cm to about 60 cm upstream of the dispensing nozzle.

In some embodiments, any of the systems described herein may comprise a laser or a laser-like source. The laser or laser-like source can be configured to illuminate the first, second, and/or third point of detection. The laser-like source can comprise a light emitting diode (LED). In some embodiments, the system may further comprise a laser modulator comprising a beam splitter comprising an optical element configured to split an energy beam generated by the laser or laser-like source into a first beam and a second beam. The optical element may direct the first and second beams to the first or second point of detection to provide dual focusing at the first or second point of detection along the fluidic flow direction. In some embodiments, the optical element of the beam splitter may comprise a fiber optical splitter that can split light into two outgoing laser beams. In some embodiments, the optical element of the beam splitter may comprise a birefringent polarizer such as a Wollaston prism, which can split light into two linearly polarized outgoing laser beams with orthogonal or near orthogonal polarization.

In some embodiments, the system may further comprise an optical element configured to provide dual focusing along the first channel at the first point of detection. The optical element may comprise an optical fiber splitter or a birefringent polarizer configured to split an energy beam generated by one or more lasers or laser-like sources into a first beam and a second beam and direct the first and second beams to the first point of detection.

In some embodiments, any of the systems described herein may comprise a laser modulator comprising a remote focusing device. The remote focusing device may comprise an optical element configured for remote focusing such that multiple focal planes at different axial positions along a microfluidic channel (e.g., a first channel, a second channel, a third channel, etc.) can be detected in rapid sequence or in parallel. The optical element of the remote focusing device may comprise an electrical lens or a tunable acoustic gradient (TAG) index lens. Alternatively, or in combination, the system may further comprise a laser modulator comprising an optical element configured to generate a uniform, non-diffracting beam across the first or second channel at the first or second point of detection, respectively. The optical element may comprise an axicon, an annular aperture, or a spatial light modulator.

In some embodiments, the target droplet dispensing module may be configured to dispense the target droplets into one or more collection tubes or plates in a controlled manner. The one or more collection tubes or plates may comprise a 96-well plate, a 384-well plate, or a multi-well plate. In some embodiments, the dispensing module may comprise an x-y-z moving dispenser, a rotatory dispenser, or the combination thereof.

In some embodiments, the first signal or the second signal may comprise an optical signal, an electrical signal, or an optical signal plus an electrical signal. The first signal or the second signal may be configured to synchronize one or more of the first point of detection and/or the second point of detection with the dispensing nozzle.

In some embodiments, any of the systems described herein may further comprise a magnet, a pair of magnets, or an array of magnets adjacent the first channel or the second channel. The magnet, pair of magnets, or array of magnets may be positioned at a distance of about 0.01 mm to about 30 mm from the first point of detection or the second point of detection. For example, the magnet, pair of magnets, or array of magnets may be positioned at a distance of about 0.1 mm to about 10 mm away from the first point of detection or the second point of detection. In some embodiments, the magnet, pair of magnets, or array of magnets may comprise a permanent magnet, a tunable electric magnet, or the combination thereof.

In some embodiments, the processor may be configured to synchronize the dispensing nozzle with one or more of the first or second detector or sensor based on one or more of the first signal or the second signal.

In another aspect, a system for detecting droplets in bioassays is provided. The system comprises a microfluidic device comprising a first channel having a size of at least 35 μm, for example at least about 60 μm, in each cross-sectional inner dimension; a plurality of water-in-oil droplets, at least two of the plurality of droplets comprising at least one cell, at least one particle, or at least one cell plus at least one particle; a prism adjacent to the first channel; a first objective disposed at a first corner of the prism; a second objective disposed at a second corner of the prism, the second objective disposed at an angle relative to the first objective; a laser configured to generate a laser energy; and a laser modulator comprising a remote focusing unit or an optical element generating a non-diffracting beam, wherein the laser modulator is configured to modulate the laser energy before it enters one or more of the first objective or the second objective. At least one of the first objective or second objective is configured to direct the modulated laser energy to illuminate the plurality of droplets that pass through a first detection point of the first channel.

In some embodiments, the system may further comprise a droplet sorting module. Alternatively, or in combination, the system may further comprise a dispensing module.

In some embodiments, the angle may be about 60 degrees to about 120 degrees. For example, the angle may be about 80 degrees to about 100 degrees. Preferably, the angle may be about 90 degrees.

In some embodiments, the first objective or the second objective may be configured to direct the modulated laser energy at an angle of about 30 degrees to about 60 degrees relative to the first channel. For example, the first objective or the second objective may be configured to direct the modulated laser energy at an angle of about 40 degrees to about 50 degrees. Preferably, the first objective or the second objective may be configured to direct the modulated laser energy at an angle of about 45 degrees.

In some embodiments, the remote focusing unit may comprise a tunable acoustic gradient (TAG) index lens.

In some embodiments, the optical element generating a non-diffracting beam may comprise an axicon, an annular aperture, or a spatial light modulator.

In some embodiments, the prism may comprise a material having a refractive index of about 1.28 to about 1.6. For example, the prism may comprise a material having a refractive index of about 1.29 to about 1.58.

In another aspect, a system for detecting, sorting, and dispensing droplets is provided. The system comprises a microfluidic device comprising a first channel connected to a second channel and a waste channel by a first sorting junction; a plurality of water-in-oil droplets, at least two of the plurality of droplets each comprise at least one cell, at least one particle, or at least one cell plus at least one particle; a first detector or sensor corresponding to a first point of detection disposed along the first channel upstream of the first sorting junction; a second detector or sensor corresponding to a second point of detection disposed along the second channel downstream of the first sorting junction, wherein the second detector or sensor is configured to detect two or more images for each of a plurality of target droplets; a sorting module; and a droplet dispensing module comprising a dispensing nozzle disposed downstream of the second point of detection.

In some embodiments, the plurality of target droplets may be a first batch of target droplets and further sorting downstream or upstream of the second detector or sensor may generate a second batch of target droplets.

In some embodiments, the system may further comprise a processor configured to index each of the plurality of target droplets dispensed by the dispensing nozzle with the signal of the same target droplet detected by the second detector or sensor at the second point of detection.

In some embodiments, the system may further comprise one or more lasers or laser-like light sources to generate illumination at the first point of detection.

In some embodiments, the system may further comprise an optical element configured to provide dual focusing along the first fluidic channel at the first point of detection. The optical element may comprise an optical fiber splitter or a birefringent polarizer. The optical element may be configured to split an energy beam generated by the one or more lasers or laser-like sources into a first beam and a second beam and direct the first and second beams to the first point of detection.

In some embodiments, the first detector or sensor may comprise a fast-response optical detector. The fast-response optical detector may comprise a photo multiplier tube (PMT), a photodiode, or an avalanche photodiode detector (APD).

In some embodiments, the second detector or sensor may comprise a camera or a camera-like detector.

In some embodiments, the two or more images for each of the plurality of target droplets may comprise a signal generated by a modulated or pulsed light source configured to provide repetitive short illumination of light energy. In some embodiments, each duration of the repetitive short illumination of light energy may last about 0.5 to about 50 milliseconds, or about 5 to about 30 milliseconds. In some embodiments, the modulated or pulsed light source may optionally comprise one or more lasers configured to provide stroboscopic illumination. In some embodiments, the signal generated by stroboscopic illumination may comprise a first signal. The first detector or sensor may be configured to detect or sense a second signal from the first point of detection. The processor may be configured to synchronize the dispensing nozzle with one or more of first or second detector or sensor based on one or more of the first signal and the second signal. Alternatively, or in combination, the processor may be configured to synchronize the first detector or sensor with triggering of modulated or pulsed light source to repetitively illuminate (such as with stroboscopic illumination) the second point of detection.

In some embodiments, the system may further comprise an optical assembly configured to provide repetitive short single-pulse or burst of pulses of light energy such as stroboscopic illumination at the second point of detection. In some embodiments, the system may further comprise an upstream detector or sensor corresponding to a third point of detection disposed along the second channel between the first sorting junction and the second point of detection. The upstream detector or sensor may be configured to provide a precise timing trigger to the optical assembly to trigger the stroboscopic illumination. Alternatively, or in combination, the first detector or sensor may be configured to provide a precise timing trigger to the optical assembly to trigger the stroboscopic illumination.

In some embodiments, the first detector or sensor may be configured to detect or sense a first signal from the first point of detection. The two or more images detected by the second detector or sensor may comprise a second signal from the second point of detection. A processor may be configured to synchronize the dispensing nozzle with one or more of the first or second detector or sensor based on one or more of the first signal and the second signal.

In some embodiments, the system may comprise an optical assembly configured to provide droplet imaging (e.g., with stroboscopic illumination) at a point of detection (e.g., the first or the second point of detection). An upstream detector or sensor may be configured to detect or sense a droplet upstream of the point of detection in order to provide a first signal to trigger illumination (such as stroboscopic illumination) at an appropriate timing to image a droplet with high spatiotemporal resolution at the designated point of detection (e.g., to generate a second signal). Such a signal generated by imaging can be used to inform subsequent droplet sorting and/or droplet dispensing. A processor may be configured to synchronize the sorting and/or dispensing mechanism with one or more of the first and the second detectors or sensors based on one or more of the first and the second signals/images.

Another aspect provides a system for droplet detecting, sorting, and dispensing. The system comprises a microfluidic device comprising (i) a first channel connected to a second channel and a first waste channel by a first sorting junction and (ii) a third channel connected to the second channel and a second waste channel by a second sorting junction disposed downstream of the first sorting junction; a plurality of water-in-oil droplets, wherein at least two of the plurality of droplets each comprise at least one cell, at least one particle, or at least one cell plus at least one particle; a multi-zone detection module comprising one or more detectors corresponding to a first point of optical detection disposed along the first channel and a second point of optical detection disposed along the second channel; a droplet dispensing module; and a processor configured to index each of a plurality of target droplets dispensed by the droplet dispensing module with an optical signal of the same target droplet detected by the first optical detector at the first point of detection or the second optical detector at the second point of detection.

In some embodiments, the one or more detectors may comprise a multi-zone optical detector with a single detection area in the microfluidic device comprising the first point of optical detection and the second point of optical detection. In some embodiments, at least a portion of the first channel or second channel disposed between the first point of optical detection and the second point of optical detection may comprise a looping channel that loops from the first point of optical detection to the second point of optical detection. Alternatively, or in combination, the multi-zone optical detector may comprise a multi-channel photo multiplier or a camera.

In another aspect, a method for detecting, sorting and dispensing droplets is provided. The method comprises providing a plurality of water-in-oil droplets to a first channel of a microfluidic device, wherein at least two of the plurality of droplets each comprise at least one cell, at least one particle, or at least one cell plus at least one particle; flowing the plurality of droplets past a first point of optical detection disposed along the first channel; detecting a first signal from each of the plurality of droplets at the first point of optical detection; identifying a first batch of target droplets based on the first signal; sorting the first batch of target droplets through a sorting actuator into a second channel of the microfluidic device to obtain sorted droplets; flowing sorted droplets past a second point of detection or a sensor disposed along the second channel; detecting a second signal from each of the sorted droplets at the second point of detection or sensor; identifying a second batch of target droplets based on the second signal; dispensing the second batch of target droplets individually; and indexing the second batch of target droplets with one or both of the first signal and the second signal such that each indexed dispensed droplet matches precisely one or both of the first signal detected from each of the first batch of target droplets and the second signal detected from each of the sorted droplets.

In some embodiments, the method may further comprise generating the plurality of water-in-oil droplets, incubating the plurality of water-in-oil droplets, or generating the plurality of water-in-oil droplets plus incubating the plurality of water-in-oil droplets.

In some embodiments, detecting the first signal may comprise detecting an optical signal from the at least one cell, the at least one particle, or the at least one cell plus the at least one particle.

In some embodiments, detecting the second signal may comprise detecting an optical signal from the at least one cell, the at least one particle, or the at least one cell plus the at least one particle.

In some embodiments, detecting the second signal may comprise detecting an optical signal or a non-optical signal indicative of a presence of one of the plurality of droplets within the second channel at the second point of detection or sensor.

In some embodiments, the second point of detection or the sensor may be disposed a distance of about 1 cm to about 60 cm upstream of a dispensing nozzle of a dispensing module.

In some embodiments, the first signal may be generated based on dual focusing along the first channel at the first point of detection.

In some embodiments, the method may further comprise illuminating the first point of optical detection and/or the second point of optical detection with one or more lasers or laser-like sources.

In some embodiments, the method may further comprise modulating a laser at the first point of detection by an optical element that provides dual focusing. The dual focusing optical element may comprise an optical fiber splitter or a birefringent polarizer.

In some embodiments, the method may further comprise modulating a laser at the first point of detection by a remote focusing device. The remote focusing device may comprise an electrical lens or a tunable acoustic gradient (TAG) index lens.

In some embodiments, the method may further comprise modulating a laser to generate a non-diffracting beam with an optical element. The optical element may comprise an axicon, an annular aperture, or a spatial light modulator.

In some embodiments, the second signal may comprise an optical signal or a non-optical signal.

In some embodiments, detecting the second signal may comprise detecting two or more images for each of the first batch of target droplets.

In some embodiments, dispensing may comprise dispensing the second batch of target droplets by a dispensing module into collection tubes or plates in a controlled manner. The plates may comprise a 96-well plate, a 384-well plate, or a multi-well plate.

In another aspect, a method for detecting, sorting and dispensing droplets is provided. The method comprises providing a plurality of water-in-oil droplets to a first channel of a microfluidic device, wherein at least two of the plurality of droplets each comprise at least one cell, at least one particle, or at least one cell plus at least one particle; flowing the plurality of droplets past a first point of optical detection disposed along the first channel; detecting a first signal from each of the plurality of droplets at the first point of detection, wherein the first signal is generated based on dual focusing along the first channel at the first point of detection; identifying a first batch of target droplets based on the first signal; sorting the first batch of target droplets into a second channel of the microfluidic device; flowing the first batch of target droplets past a second point of detection disposed along the second channel; detecting a second signal from each of the first batch of target droplets at the second point of detection, wherein the second signal is generated by imaging; identifying a second batch of target droplets, the second point of detection being based on spatial resolution such as imaging; and dispensing the second batch of target droplets.

In some embodiments, the method may further comprise indexing the second batch of target droplets such that each dispensed droplet matches precisely the second signal detected from each of the second batch of target droplets.

In some embodiments, detecting the first signal may comprise detecting the first signal with a fast-response optical detector. The fast-response optical detector may comprise a photo multiplier tube (PMT), a photodiode, or an avalanche photodiode detector (APD).

In some embodiments, the method may further comprise generating the dual focusing, such as with an optical splitter or a birefringent polarizer.

In some embodiments, detecting the second signal may comprise detecting the second signal with a camera.

In some embodiments, the method may further comprise illuminating the second point of detection with a laser or laser-like source. The laser-like source may be an LED.

In some embodiments, the second signal may be generated by stroboscopic illumination. The method may further comprise synchronizing dispensing and detecting the first signal or dispensing and detecting the second signal based on the first signal or the second signal.

In another aspect, a method for detecting droplets in bioassays is provided. The method comprises providing a plurality of water-in-oil droplets to a first channel of a microfluidic device, wherein at least two of the plurality of droplets each comprise at least one cell, at least one particle, or at least one cell plus at least one particle, and wherein at least a portion of the first channel has a size of at least 35 µm, for example at least about 60 µm, in each cross-sectional inner dimension; flowing the plurality of droplets past a first point of detection disposed along the first channel; directing laser energy to the first point of detection, wherein directing comprises (1) passing the laser energy through a laser modulator, the laser modulator comprising a remote focusing unit, an optical element generating a non-diffracting beam, or both, (2) directing the modulated laser energy through a first objective or a second objective, wherein the first objective and second objective are disposed at an angle relative to one another, and (3) directing the modulated laser energy from the first objective or second objected through a prism adjacent to the first channel and onto the first point of detection, wherein the first objective and the second objective are disposed at a first corner and a second corner, respectively, of the prism; detecting a first signal from each of the plurality of droplets as they flow past the first point of detection; and identifying target droplets based on the first signal.

In some embodiments, the method may further comprise sorting the target droplets from the rest of the plurality of droplets.

In some embodiments, the method may further comprise dispensing the target droplets.

In some embodiments, the angle may be about 60 degrees to about 120 degrees. For example, the angle may be about 80 degrees to about 100 degrees. Preferably, the angle may be about 90 degrees.

In some embodiments, directing modulated laser energy may comprise directing the modulated laser energy at an angle of about 30 degrees to about 60 degrees relative to the first channel. For example, directing modulated laser energy may comprise directing the modulated laser energy at an angle of about 40 degrees to about 50 degrees. Preferably, directing modulated laser energy may comprise directing the modulated laser energy at an angle of about 45 degrees.

In some embodiments, the remote focusing unit may comprise an electrical lens or a tunable acoustic gradient (TAG) index lens.

In some embodiments, the optical element generating a non-diffracting beam may comprise an axicon, an annular aperture, or a spatial light modulator.

In some embodiments, the prism may comprise a material having a refractive index of about 1.28 to about 1.6. For example, the prism may comprise a material having a refractive index of about 1.29 to about 1.58.

In some embodiments, the entire first channel may have a size of at least 35 µm, for example at least about 60 µm, in each cross-sectional inner dimension.

In another aspect, a method for detecting, sorting and dispensing droplets is provided. The method comprises providing a plurality of water-in-oil droplets to a first channel of a microfluidic device, wherein at least two of the plurality of droplets each comprise at least one cell, at least one particle, or at least one cell plus at least one particle; flowing the plurality of droplets past a first point of optical detection disposed along the first channel; detecting a first signal from each of the plurality of droplets at the first point of detection; identifying a first batch of target droplets based on the first signal; sorting the first batch of target droplets into a second channel of the microfluidic device; flowing the first batch of target droplets past a second point of detection disposed along the second channel; detecting a second signal from each of the first batch of target droplets at the second point of detection, wherein the second signal is generated by stroboscopic illumination; identifying a second batch of target droplets, the second point of detection being based on stroboscopic illumination; dispensing the second batch of target droplets; and indexing the second batch of target droplets such that each dispensed droplet matches precisely the second signal detected from each of the second batch of target droplets.

In some embodiments, the stroboscopic illumination may be generated by a constant or pulsed light source. For example, the stroboscopic illumination may be generated by modulating a continuous-wave (CW) laser either directly or with an acousto optic modulator or by using a pulsed laser source such as a q-switched laser.

In some embodiments, detecting the second signal may comprise detecting the second signal with a camera.

In some embodiments, detecting the first signal may comprise detecting the first signal with a fast-response optical detector. The fast-response optical detector may comprise a photo multiplier tube (PMT), a photodiode, or an avalanche photodiode detector (APD).

In some embodiments, the first signal or second signal may comprise an optical signal, an electrical signal, or an optical signal plus an electrical signal. The method may further comprise comprising synchronizing dispensing and detecting the first signal or dispensing and detecting the second signal based on the first signal or the second signal.

In another aspect, a method for detecting, sorting and dispensing droplets is provided. The method comprises providing a plurality of water-in-oil droplets to a first channel of a microfluidic device, wherein at least two of the plurality of droplets each comprise at least one cell, at least one particle, or at least one cell plus at least one particle; flowing the plurality of droplets past a first point of optical detection disposed along the first channel; detecting a first signal from each of the plurality of droplets at the first point of detection, wherein the first signal is detected by a multi-zone detection module comprising one or more detectors; identifying a first batch of target droplets based on the first signal; sorting the first batch of target droplets into a second channel of the microfluidic device; flowing the first batch of target droplets past a second point of optical detection disposed along the second channel; detecting a second signal from each of the first batch of target droplets at the second point of detection, wherein the second signal is detected by the multi-zone detection module; identifying a second batch of target droplets, the second point of detection being based on imaging; and dispensing the second batch of target droplets.

In some embodiments, the method may further comprise indexing each target droplet of the dispensed second batch of target droplets with the first signal of the same target droplet.

In some embodiments, the one or more detectors may comprise a multi-zone optical detector with a single detection area in the microfluidic device comprising the first point of optical detection and the second point of optical detection. In some embodiments, at least a portion of the first channel or second channel disposed between the first point of optical detection and the second point of optical detection may comprise a looping channel that loops from the first point of optical detection to the second point of optical detection. In some embodiments, the multi-zone optical detector may comprise a multi-channel photo multiplier or a camera.

These and other embodiments are described in further detail in the following description related to the appended drawing figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 19A-19D shows an exemplary implementation of an advanced optical configuration as part of a point of detection, using two objectives positioned at a 45-degree angle to each other at two corners of a prism (FIGS. 19A and 19C) or at a 45-degree angle without a prism (FIGS. 19B and 19D), in accordance with embodiments.

DETAILED DESCRIPTION

Figure 1:
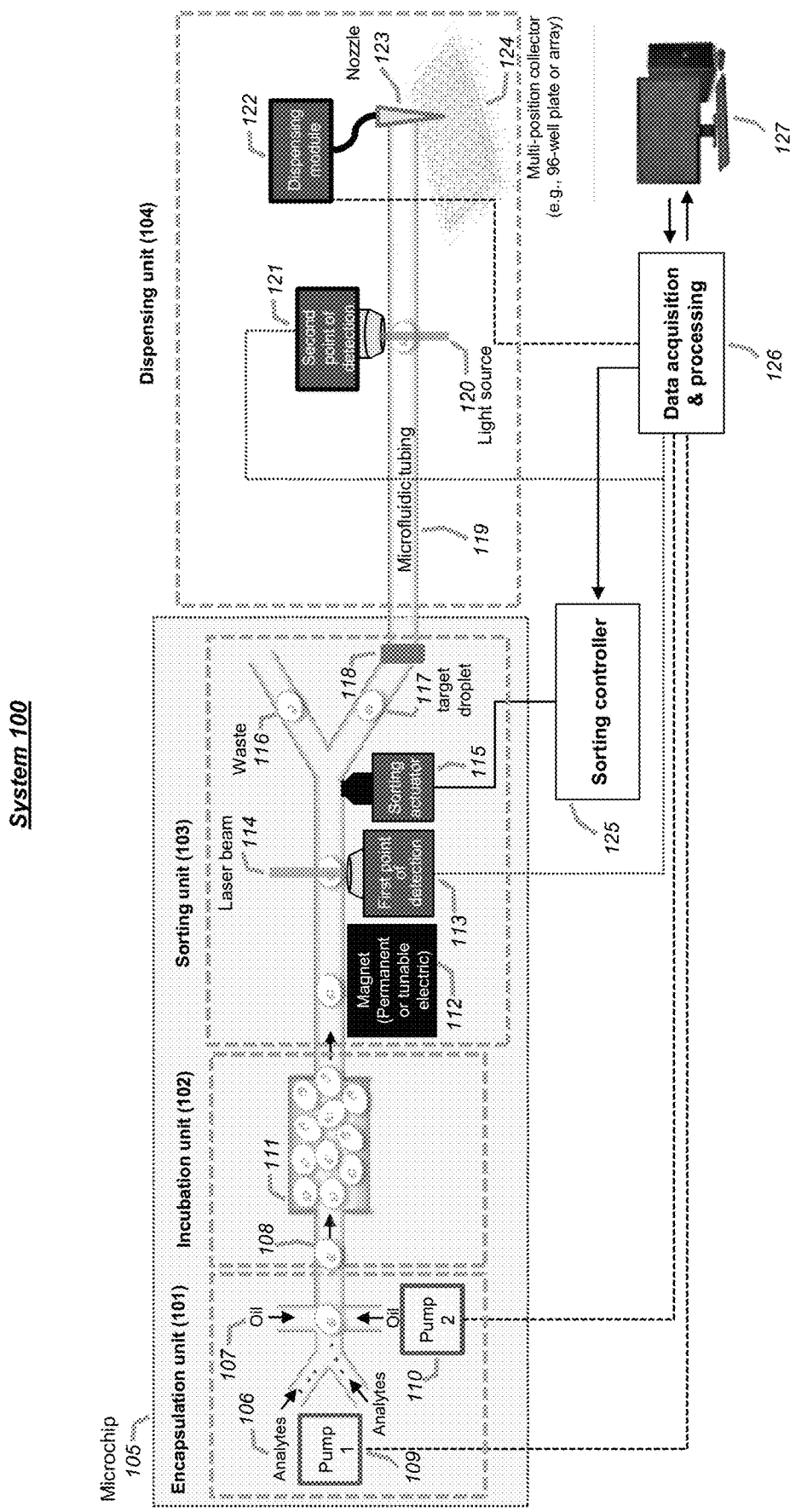
FIG. 1 illustrates a schematic of a system for droplet generation (also referred to herein as "encapsulation"), incubation, sorting, and dispensing in a microfluidic device, in accordance with embodiments. The dispensing unit is optional and can be eliminated for applications that only require bulk sorting and collection of intra-droplet cells and/or entities.

In the following detailed description, reference is made to the accompanying figures, which form a part hereof. The drawings illustrate embodiments of the present disclosure and, together with the detailed description, serve to explain the principles of the present disclosure. The drawings may not necessarily be in scale so as to better present certain features of the illustrated subject matter. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Provided herein are systems, modules, units, and methods to detect, sort, and dispense a plurality of water-in-oil droplets in a microfluidic device for various chemical and biological assays including immunotherapeutic screenings. In some embodiments, the droplets may comprise at least a cell, at least a particle, or at least a cell plus at least a particle. The at least one cell may be provided from a biological sample such as tissue cells, immune cells, and/or engineered cell libraries. Those cells may comprise low-abundance target cells, generally of ≤1%, <0.1%, or even <0.01% of a provided total cell population.

The systems and methods provided herein may provide rapid, high-throughput, multiplexable genetic, protein, and other cellular analyses down to single-molecule or single-cell level and can be used for several applications including but not limited to the isolation and detection of immune cells, circulating tumor cells (CTCs), cell-free nucleic acids and exosomes, cancer initiating cells, cell drug interaction and resistance, cell-cell communication in tumor microenvironments, and the analysis of genomes and epigenomes using single-molecule next-generation sequencing technologies.

In one aspect, systems, module, units, and methods provided herein can be used for the discovery of immunotherapeutics, specifically, bispecific antibodies (BsABs). The BsABs are unnatural biologics that are engineered to recognize two different epitopes either on the same or different target antigens. One of the exemplary applications can be focusing on T cell activating BsABs (TABs), as they are currently the most represented sub-class of BsABs, though the provided system and method can be applied to almost any BsAB formats. The method may employ a droplet microfluidic-based system to compartmentalize and interrogate individual BsAB-producing cells (optionally also expressing target antigens) with co-encapsulated T cell reporters. Functional BsAB clones may be able to crosslink the T cell with antigen-expressing cell in the droplet and activate T cell reporter to produce fluorescence, which in turn may allow "positive" droplets to be detected and sorted from a heterogeneous population.

In one aspect, one, two, or more points of detection may be used, the points of detection comprising at least one point of optical detection that is based on at least one laser or at least one laser-like source. In some embodiments, the laser may be provided through a unique optical configuration that comprises a remote focusing module (e.g., a tunable acoustic gradient (TAG) index lens), and two objectives provided at an angle of about 60 to about 120 degree, or of about 90 degree, at two corners of a prism, to provide an optical focal plane that crosses passing droplets in a channel of a microfluidic device at a point of detection. In some embodiments, a channel of at least 35 µm, for example at least about 60 µm, in any cross-sectional inner dimension may be provided in a microfluidic device, to enable optical detection of passing droplets in the channel without constricting the droplets that may otherwise conventionally be constricted when using a channel generally narrower than about 35 µm or about 40 µm or about 50 µm. For example, the channel may be within a range of about 35 µm to about 200 µm in any cross-sectional inner dimension, preferentially from about 40 µm to about 120 µm. In some embodiments, the channel may be within a range of about 60 µm to about 200 µm in any cross-sectional inner dimension, preferentially from about 60 µm to about 150 µm. Alternatively, or in combination, the provided laser may be modulated to be a non-diffracting beam. A non-diffracting beam may be achieved by using an optical device such as an axicon lens, an annular aperture, a spatial light modulator, or the like, or any combination thereof. In some embodiments, the prism may be made of a material with a refractive index of about 1.28 to about 1.6, or of about 1.29 to about 1.57.

In some embodiments, a detector may comprise a sweeping mirror and/or repetitive short illumination such as stroboscopic illumination in order to effectively remove image blurring due to fast-moving objects such as a fast-flowing droplet and its entities contained therein. In some embodiments, a detector may comprise an optical detector that is coupled with a magnet or a source of magnetic force to improve the optical focusing of magnetic or paramagnetic particles comprised by a passing droplet at or prior to a point of detection in a channel of a microchip.

In another aspect, the provided system can deliver parallel detection of passing droplets, with a single multi-zone detection module comprising two or more parallel channels in a microfluidic device.

In yet another aspect, droplet tracking and/or indexing may be provided by at least one detector or by at least one sensor. Tracking and/or indexing may in part be based on optical signals and/or non-optical signals such as contact or contactless conductivity, impedance, and/or magnetic force. In some embodiments, at least one detector plus at least one sensor may be used to provide data to track or index a passing droplet, from an upstream point of detection to a downstream point of dispensing along the flow direction in a channel of a microfluidic device. In some embodiments, entities in the droplet, such as cells and particles, may be provided with a fluorescent tag to enable optical detection. In some embodiments, a point of droplet sorting may be implemented immediately following a point of detection. In some embodiments, at least one detector and at least one sensor may optionally be implemented in a tandem manner, immediately following a point of sorting but preceding a point of dispensing. In some embodiments, the at least one sensor may be an optical sensor, a non-optical sensor, or the combination or implementation of both.

In yet another aspect, a final point of detection may be implemented along a flow channel of a microfluidic device at about 1 to about 60 cm upstream of a dispensing nozzle of a dispensing module. In some embodiments, the sorted droplets may be dispensed by a dispensing module into collection tubes or plates, such as a 96-well plate, a 384-well plate, or a multi-well plate or platform, in a controlled manner. In some embodiments, a dispensed droplet may be provided with an index to match the dispensed droplet precisely with the collected data that reflects an optical signal of a droplet that is detected at an upstream point of optical detection.

Provided are methods and processes for detecting, sorting, and dispensing droplets, in part using systems, modules, and units described herein. In some embodiments, the process may comprise: providing in a microfluidic device a plurality of water-in-oil droplets, at least some droplets each comprising at least one cell, at least one particle, or at least one cell plus at least one particle; passing and detecting the droplets through a first point of laser-based optical detection along a channel of the microfluidic device to identify a first batch of target droplets; sorting a first batch of target droplets through a sorting actuator to obtain sorted droplets; detecting sorted droplets through a second point of detection along a channel of the microfluidic device to identify a second batch of target droplets; and dispensing a second batch of target droplets individually. Each dispensed droplet may be indexed in a manner such that each indexed dispensed droplet matches precisely with the collected data that reflects the optical signal of a droplet that is detected at an upstream point of detection.

In some embodiments, detecting droplets through a first point of laser-based optical detection may comprise: (1) either one or more lasers modulated by a remote focusing unit, an optical element generating a non-diffracting beam, or both; (2) a prism that is positioned either above, below, or next to a channel of a microfluidic device, the channel having a size of at least 35 µm, for example at least about 60 µm, in each cross-sectional inner dimension; (3) two objectives that are placed at an angle of about 60 to about 120 degree, or of about 90 degree to each other at two corners of the prism, wherein at least one of the objectives is used to provide a modulated laser to illuminate droplets that pass through the channel in the microfluidic device.

In some embodiments, particles provided in a droplet may be microparticle or nanoparticles of various shape or geometry, with a size ranging from about 30 nanometers (nm) to about 30 micrometers (µm), or from about 100 nm to about 15 µm. The particles can be made of different materials and can be labelled with molecules including proteins, antibodies, and functional chemical groups.

In some embodiments, droplet movement (also referred to herein as flow) in a microfluidic device may be driven by pressure generated by pumps or other pressure controllers. In some embodiment, droplet velocity may range from about 1 to about 900 mm/s, corresponding to a sorting frequency of about 30 Hz to about 2000 Hz or higher.

In some embodiments, a provided system may comprise optional units for droplet generation and/or incubation, which can be performed on a same or separate microfluidic device prior to a point of detection. In some embodiments, the droplets can be incubated off-chip in a separate container. In some embodiments, the system may provide dispensed droplets that are indexed so that the identity of the dispensed droplet can be correlated precisely with the corresponding data for that individual droplet. Those data may be collected at one or more points of detection prior to the dispensing step, in order to enable a more comprehensive downstream post-processing analysis.

In another aspect, a sorted batch of droplets from a sorting point can be provided to go through another step of sorting (i.e., serial sorting) to increase the purity of the final target droplets, which may be important for applications with a very complex biological starting sample comprising low abundance target events. In some embodiments, such serial sorting may be used for sorting droplets containing entities or assays with different properties in multiplex assays. In some embodiments, a second sorting unit can be configured in a manner that the first and second points of detection will be in a same field of view (about 0.5 mm-about 5 mm) of a detector that is based on a multi-channel detection module such as a multi-channel photo multiplier tubes (PMTs) or camera (or a camera-like device).

In some embodiments, in order to overcome motion blur of a fast moving target, the motion of a target (e.g., particle or cell) in a traveling droplet can be compensated for by moving the image of the target at the same speed during a longer camera exposure cycle, for example, by addition of a movable (sweeping) deflector into the detection path consisting of an objective lens and a tube lens. To trigger image deflection at the appropriate time, a particle detector/sensor may be also added upstream of the imaging device. Upstream particle detection can be achieved in several ways including but not limited to optical, electrical, and magnetic detection.

In some embodiments, a short (i.e., brief) illumination can be used to image a moving target to overcome motion blur. The illumination must be short enough in a way to ensure that the target moves less than the desired spatial resolution (e.g., less than 10 µs for 1 µm spatial resolution at 100 mm/second (mm/s) flow speed). In some embodiments, each duration of short illumination (e.g., stroboscopic illumination) for one imaging frame can last about 0.5 milliseconds (ms) to about 50 ms, of about 0.5 ms to about 10 ms, of about 5 ms to about 20 ms, about 10 ms to about 30 ms, or about 20 to about 50 ms. In some embodiments, the short illumination is provided as a modulated or pulsed light source. In some embodiments, the modulation can be a short single pulse or a burst of pulses (e.g., 1-1,000 pulses per camera exposure cycle), where each repetitive pulse has a duration lasting about 1 nanosecond (ns) to 1 ms, about 1 ns to 99 ns, about 50 ns to 500 ns, about 200 ns to about 999 ns, or about 400 ns to 1 ms. For example, one kind of repetitive short illumination, namely stroboscopic illumination may be generated by modulating a continuous-wave (CW) laser, either directly or with an acousto-optic or electro-optic modulator, or by using the pulses of a q-switched or mode-locked laser. The short illumination may be synchronized with a camera detector that detects moving droplets.

In some embodiments, motion blur of droplet image can be minimized or reduced by slowing down droplet moving in an image detection zone (i.e., a "buffer zone") in a device. The buffer zone may comprise of one or more bypass channels that are connected to a main microfluidic channel, such that the fluid in the main fluidic channel will partially enter the bypass channel(s) to effectively reduce the droplet moving speed, thereby reducing the motion blur of droplet imaging. In some embodiments, two or more pillars can be provided at the interface between the main fluidic channel and the bypass channels to constrain the droplets moving along the main channel. In some embodiments, the buffer zone may comprise a widened segment of a main fluidic channel. In some embodiments, the buffer zone may comprise one or more compartments or chambers that are connected to a main fluidic channel through a bypass channel. Creating a buffer zone may be combined with repetitive short illumination for enhanced suppression of motion blur.

In some embodiments, to capture multiple focal planes corresponding to different axial positions of a droplet at a point of detection with a camera detector, an optical device for remote focusing can be used and synchronized with the camera exposure cycle and optionally with an illumination source modulation. Examples of remote focusing devices are TAG (tunable acoustic gradient) lenses and electrically tunable lenses (ETLs; e.g., Optotune Switzerland AG). The remote focusing device may be synchronized to take multiple images of a same droplet at different focal depths within different images or at multiple focal depths overlaid within the same image. Based on these images, beads and cells occurring at different axial positions within the same droplet can be captured with a better focus.

Illustrative Embodiments

In some embodiments, a system 100 as shown in FIG. 1 may comprise a microchip (i.e., microfluidic device) 105 with encapsulation unit 101, incubation unit 102, sorting unit 103, and a downstream microfluidic tubing (capillary)-based dispensing unit 104. In the encapsulation unit 101, one or more analytes 106 may be injected into a first inlet, and the carrier oil, optionally mixed with surfactants, 107 may be injected into a second inlet with any types of pumps known to one of ordinary skill in the art based on the teachings herein, such as syringe pumps and pressure pumps, at a flow rate of about 1 to about 100 µL/min or higher. Cells and/or particles may co-encapsulated into droplets 108.

As used herein, the terms "microfluidic device", "microfluidic chip", and "microchip" are often used interchangeably, which in general refers to a set of micro-channels etched or molded into a material (e.g., glass, silicon, plastic, polymer, or polydimethylsiloxane), wherein the micro-channels forming the microfluidic chip are connected together in order to achieve the desired features (e.g., mix, pump, sort, control of biochemical environment, etc.). It is understood that a person skilled in the art may readily fabricate such microfluidic devices in a properly equipped mechanical or biomedical engineering lab or a micro-electro-mechanical systems (MEMS)/microfabrication core facility.

As used herein, the term "droplets" generally refers to a small amount of liquid surrounded by one or more immiscible or partially immiscible liquid(s), also known as "emulsion." Droplet volumes may range from about 0.01 nL to about 10 nL, and preferentially from about 0.02 to about 2 nL for biological and chemical assays such as single cell analysis. It is expected that a person skilled in the arts can readily produce the droplets with a syringe- or pressure-pump, a microfluidic chip with a flow-focus or T-junction feature, and/or a biocompatible oil such as 3M™ Novec-7500™ oil and fluorinert oil (FC-40), a stabilizing surfactant such as PEG-PFPE tri-block or di-block co-polymers with concentration ranging from about 0.5% w/w to about 3% w/w or higher, all of which are widely accessible in a properly equipped mechanical or biomedical engineering lab or a MEMS/microfabrication core facility.

As used herein, the term "cells" generally refers to mammalian cells such as human and mouse cells, cancer cells, primary cells derived from fresh tissues, immune cells such as B and T cells, non-mammalian vertebrate cells such as insect cells, yeast or fungal cells, bacterial cells, bacterial phages, hybrid cells, and any derivative or engineered form of the cells thereof. It is understood that the cells can be labelled with a fluorescent dye such as FAM (carboxyfluorescein), Calcein AM, Green CMFDA, DRAQ7, Alexa Fluor series of dyes, and DyLight series, and a fluorescent protein such as GFP (Green Fluorescent Protein), YFP (Yellow Fluorescent Protein), EGFP, ZsGreen, mRFP (Red Fluorescent Protein), and mCherry, and a fluorogenic enzyme substrate.

As used herein, the term "particles" is often used interchangeably with "bead" or "particulate objects" or "particulate entities", which in general refer to solid or soft-solid objects with a dimension scale ranging from nanometer ("nanoparticle") to micrometer ("microparticle"), which may exhibit a shape or geometry reflecting a sphere, a cylinder, a tube, a rod, an ellipsoid, and/or a branched configuration. The particles can be selected from a group consisting of organic and inorganic microbeads, polystyrene or plastic or glass beads, microspheres, silicon beads, nanoparticles, quantum dots, magnetic or paramagnetic beads, agarose gel, alginate microgel, and hydrogel, which have an equivalent diameter ranging from 10 nm to 50 µm, preferentially from 20 nm to 20 µm, and more preferentially from about 50 nm to about 15 µm.

It is understood that particles are commonly available from a plurality of commercial vendors such as Thermo Fisher, BD Biosciences, Bio-Rad, R&D Systems, BioLegend, Spherotech, and Abcam. Alternatively, these particulate objects can be made in a chemistry or material-science lab by a person skilled in the art. It is further understood that particles may come as is, or pre-labelled with or functionalized for labeling with: (1) fluorophores such as Alexa Fluor 405, FITC, GFP, and Alexa Fluor 647; (2) affinity reagents such as a secondary antibody and Protein A; (3) an assay enzyme that may produce fluorescence or luminescence; (4) a chemical group; and/or (5) adaptor molecules such as Biotin and Streptavidin.

In some embodiments, as shown in FIG. 1, collected droplets may be incubated on-chip at Module 111 or off-chip for a predetermined duration of time depending on a specific assay. In some embodiments, the incubation Module 111 may comprise one or more environmental control units selected from a temperature control unit (with a preferred temperature range of about 4° C.–98° C.), an oxygen control unit (with a preferred O2 level of about 0.01%-30%), a carbon dioxide control unit (with a preferred $CO_2$ level of about 0.1%-20%), and/or a humidity control unit (with a preferred humidity level of about 50% to 99%). After incubation, the droplets may be reinjected into a microchip for detection and sorting. Optionally, particles within the droplets may be focused for detection using a permanent or tunable electric magnet (single, pair, and/or array), or a combination of both (e.g., with Module 112), for enhanced focusing before a first point of detection 113. In some embodiments, a first point of detection 113 can be based on optical detection with an optical detector and a single-color laser beam or multi-color laser beams 114 in a case where a laser induced fluorescence (LIF) method of detection is used.

As used herein, a point of detection generally refers to a location within a channel of the microfluidic device corresponding to the focus or within the range of a detection module comprising a detector and optional accessory components. The detection module may be capable of detecting a cell, a particle, and/or an assay readout signal within a droplet confined in a certain space (e.g., a fragment of a channel or reservoir) of a microfluidic device. Detection may be quantitative or semi-quantitative. In some embodiments, the detection module may be an optical detector, and the accessory components can be selected from an objective, a mirror, a reflector, a lens, and a light source such as a laser, a xenon light, and/or a light-emitting diode (LED). Exemplary optical detectors include photo multiplier tubes (PMTs), camera-like devices, charge coupled device (CCD) cameras, photodiodes, complementary metal-oxide semiconductor (CMOS) cameras, and/or avalanche photodiode detectors (APDs). In some embodiments, the detection module may be based on a non-optical detector.

In general, a first point of detection 113 located immediately upstream of, (i.e., preceding) a sorting junction along the flow direction, may comprise a fast-response detector. Example fast-response detectors include optical detectors such as a PMT, a photodiode, and/or an APD.

In some embodiments, detection signals may be sent to a data acquisition & processing unit 126 for signal processing. Upon detecting a signal indicative of a positive droplet (i.e., "target droplet"), the acquisition and processing unit 126 may deliver a trigger signal to a sorting controller 125. The sorting controller 125 may then activate the sorting actuator 115 to redirect a moving target droplet 117 to a target collection channel in the microfluidic device. When the sorting actuator 115 is not triggered, the moving droplets in the channel may continue their motion and enter the waste channel 116. In the meantime, the data collected at an acquisition and processing unit 126 may optionally be sent to a computer 127 for storage and further analysis.

As used herein, the term "data acquisition and processing unit" is often used interchangeably with "processor", "processing unit", or "processing chip", which generally refers to an electronic circuitry and/or device that may carry out the instructions of a computer program by performing the basic arithmetic, logic, controlling, and input/output operations specified by the instructions. The basic operations of a processor may include, but are not limited to, the processing of collected sample signals and converting the resulting signals into digital numeric values that can be manipulated by a computer. A processor may send instructions to other system units and interfaces (e.g., a sorting controller unit) to initiate a process (e.g., to activate sorting actuator). Exemplary processors are Central Processing Units (CPUs), Field Programmable Gate Arrays (FPGAs), microprocessor (a central processing units contained on a single integrated circuit (IC)), Application Specific Instruction Set Processor (ASIP; a component used in system-on-a-chip design), and digital signal processor (DSP; a specialized microprocessor designed specifically for digital signal processing).

In some embodiments, droplet sorting may be performed at a sorting junction, or a point of sorting on a microfluidic device by a sorting module; such a sorting module can be based on a dielectrophoretic (DEP), an acoustic, a piezoelectric, a microvalve-based, a dynamic stream deflection based, and/or an electrical capacitance-based mechanism, in a manner that may be synchronized with an immediate upstream point of detection, which may be generally controlled by a data acquisition & processing unit.

In some embodiments, the sorted target droplets may be directed into a microfluidic tubing (or channel or capillary tube) 119 through an adapter 118. The adapter can be plastic tubing or any other adaptive connectors known to one of ordinary skill in the art based on the teachings herein with an outer diameter (OD) ranging from about 0.1 to about 5 mm. The microfluidic tubing (e.g., capillary), which is made of glass, polymers, or any other materials with an inner diameter (ID) of about 0.02 to 1.5 mm, preferentially from 0.05 to 0.15 mm, can be pristine or coated.

In some embodiments, a second point of detection 121 may be used to verify that the target droplet has been sorted. Alternatively, or in combination, in some applications the second point of detection 121 may be used to extract and/or to provide additional information from sorted droplets, such as spatial fluorescence distribution within a cell. Additionally, the second point of detection 121 may also work in conjunction with data acquisition and processing unit 126 to precisely trigger the dispensing Module 122 to dispense the sorted droplets. Similar to the first point of detection 113, a laser or light source 120 can be used for illuminating the second point of detection to generate the signal detected by the detector associated with the second point of detection 121. The dispensing Module 122 with nozzle 123 can comprise an x-y-z moving stage or a rotating moving stage configured to move nozzle 123 to dispensing collector 124 (e.g., to a specific well of a multi-well plate collector 124). The dispensing collector 124 can be a 96-well plate, 384-well plate, 1536-well plate, or any other multi-well plates, PCR tubes, PCR strips, or any array of interest.

Figure 2:
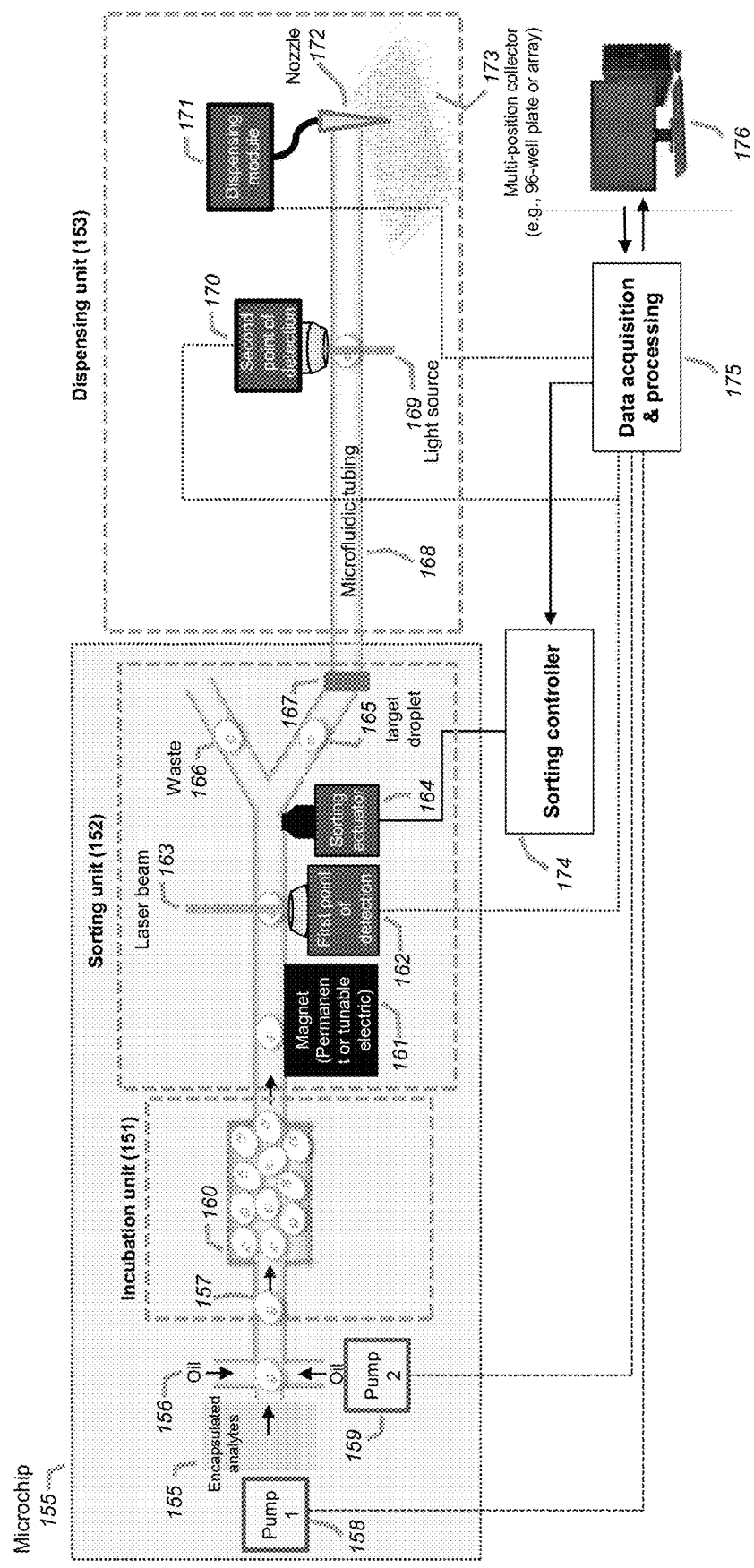
FIG. 2 shows a schematic of a similar system to that shown in FIG. 1, except that the encapsulation unit is removed, in accordance with embodiments. A separate microfluidic chip or capillary-based platform may be used for encapsulation.

FIG. 2 depicts a system 150 which has a similar setup as in system 100 of FIG. 1, except that the droplets are generated off chip. The system 150 may comprise a microchip 154 comprising an incubation unit 151, a sorting unit 152 downstream of the incubation unit 151, and a dispensing unit 153 downstream of the sorting unit 152, which may be substantially similar to those described herein, e.g., including first and second points of detection 162 and 170, respectively, a sorting actuator 164, first and second channels connected to one another by a sorting junction, etc. The droplets may be generated on a separate microfluidic encapsulation chip that, in principle, will function similar to the encapsulation unit 101 described in FIG. 1. The droplets may then be provided into a channel of a microchip 154, e.g., through a pressurized mechanism, for subsequent on-chip incubation, detection, sorting, and/or dispensing as described herein. In some instances, it may be beneficial to generate the droplets off-chip (e.g., on a separate microfluidic encapsulation chip). Depending on assay types and applications, different settings and operation conditions may be required for optimal droplet generation to enable efficient downstream processes such as droplet sorting, which may not be achievable or practical on a fully integrated multi-functional microfluidic chip.

Figure 3:
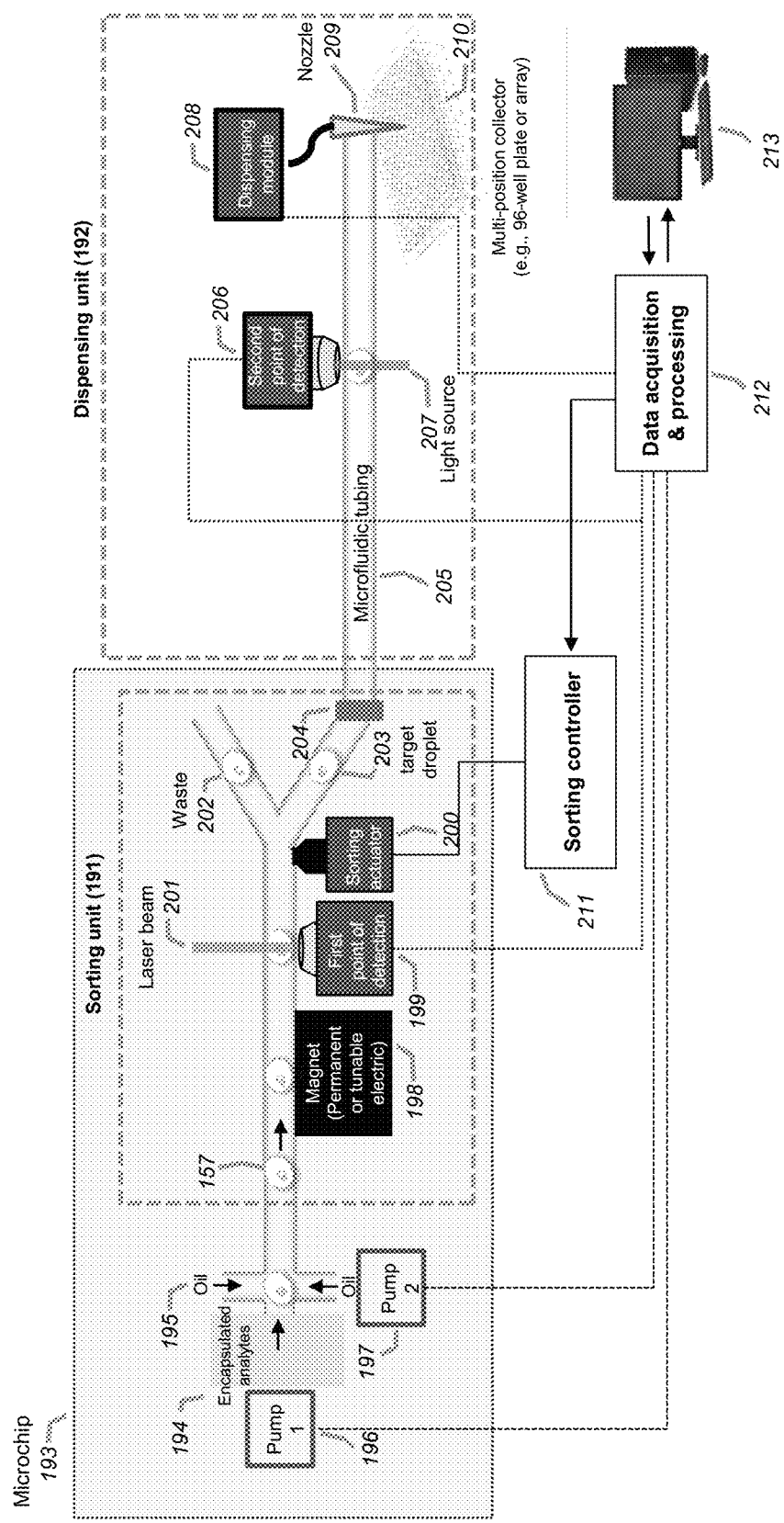
FIG. 3 shows a schematic of a similar system to those shown in FIGS. 1 and 2, except that the encapsulation and incubation units are removed, which can be done in combination or alone on separate microfluidic chips or with microfluidic tubing (e.g., capillary)-based platform(s), in accordance with embodiments. As an alternative configuration, a microfluidic chip similar to FIG. 1 in which only the incubation unit is removed can be used, for example for assay chemistries that are instantaneous so the droplets can be sorted directly downstream without the need of a separate incubation unit.

FIG. 3 shows a system 190 which has a similar setup as in system 150, except that the droplets are also incubated (or not) off-chip. The system 190 may comprise a microchip 193 comprising a sorting unit 191 downstream of the channel inlet and a dispensing unit 192 downstream of the sorting unit 191, which may be substantially similar to those described herein, e.g., including first and second points of detection 199 and 206, respectively, a sorting actuator 200, first and second channels connected to one another by a sorting junction, etc. The droplets may be incubated in a substantially similar manner to the on-chip incubation described herein. The droplets may then be provided (e.g., pipetted, injected, etc.) into a microchip 193, e.g., through a pressurized mechanism, for subsequent on-chip detection, sorting, and dispensing as described herein.

In some embodiments, as illustrated in the systems 100, 150, and 190 (FIGS. 1-3), particles encapsulated in droplets may optionally be focused by magnetic force exerted by a permanent or tunable electric magnet (e.g., a single magnet, a pair(s) or magnet, and/or an array of magnets) for enhanced focusing before the first point of detection (e.g., first point of detection 113, 163, or 119, respectively), in which case a single-color laser beam or multiple-color laser beams may be used as an excitation source for laser-induced fluorescence detection.

Many targets of interest (e.g., cells) are low abundance or rare events in complex biological samples. For instance, it is generally understood that antigen-specific primary B cells often account for <0.1% or <0.01% of a B cell immune repertoire, and an antigen-specific primary T cell can be present at lower than 0.01% or 0.001% of a T cell immune repertoire. As used herein, the term "low abundance" or low-abundance" generally refers to any incidence that is lower than about 1%. As used herein, the term "rare" generally refers to any incidence that is lower than about 0.1%.

Moreover, common biological samples such as those derived from blood or other tissues are often very complex, which may be associated with a high background signal, making any screening assay a daunting task. To effectively determine and isolate the low abundance or rare events by using droplet-based assays, the assay system should perform with both high sensitivity and specificity. An optical detection module, if included in the system, may provide high signal-to-noise (SNR) and signal-to-background (SBR) ratios. Therefore, a uniformly high spatial resolution may be required. At the same time, to be able to process a large amount of sample such as millions of B cells, T cells, or other types of cells, the temporal resolution (i.e., detection speed) should be high. However, to achieve both high temporal and high spatial resolution can be challenging.

A common approach to achieving high temporal resolution is the use of single point photo multiplier tubes (PMTs). PMTs are highly sensitive optical detectors that can provide photon count rates in excess of 10 million counts/second, thereby allowing for high sample rates in excess of 1 million samples/second. Meanwhile, a widely used method for illumination in a fluidic channel is to focus a laser beam with a cylindrical optical element in order to illuminate the channel with a thin sheet of light. Hence, the minimum object size that can be resolved corresponds to the thickness of the light sheet, which is in turn determined by the numerical aperture (NA) of the focusing lens. Besides the extension of the focal spot, the lens' NA value also controls the depth of focus/confocal parameter. The confocal parameter defines how rapidly defocusing occurs with increasing distance from the focal plane of the lens. Unfortunately, both parameters, the size of the focal spot and the depth of focus, are related to the NA such that with increasing NA value the focal spot gets smaller while defocusing occurs more rapidly. Particles passing the laser sheet at the focal plane may be detected with high spatial resolution while those passing at the periphery of the beam may have a broadened signal profile. Hence, conventional sheet illumination provides a compromise between the maximum achievable spatial resolution in the focal plane and the depth of field over which this resolution can be achieved.

Figure 4A:
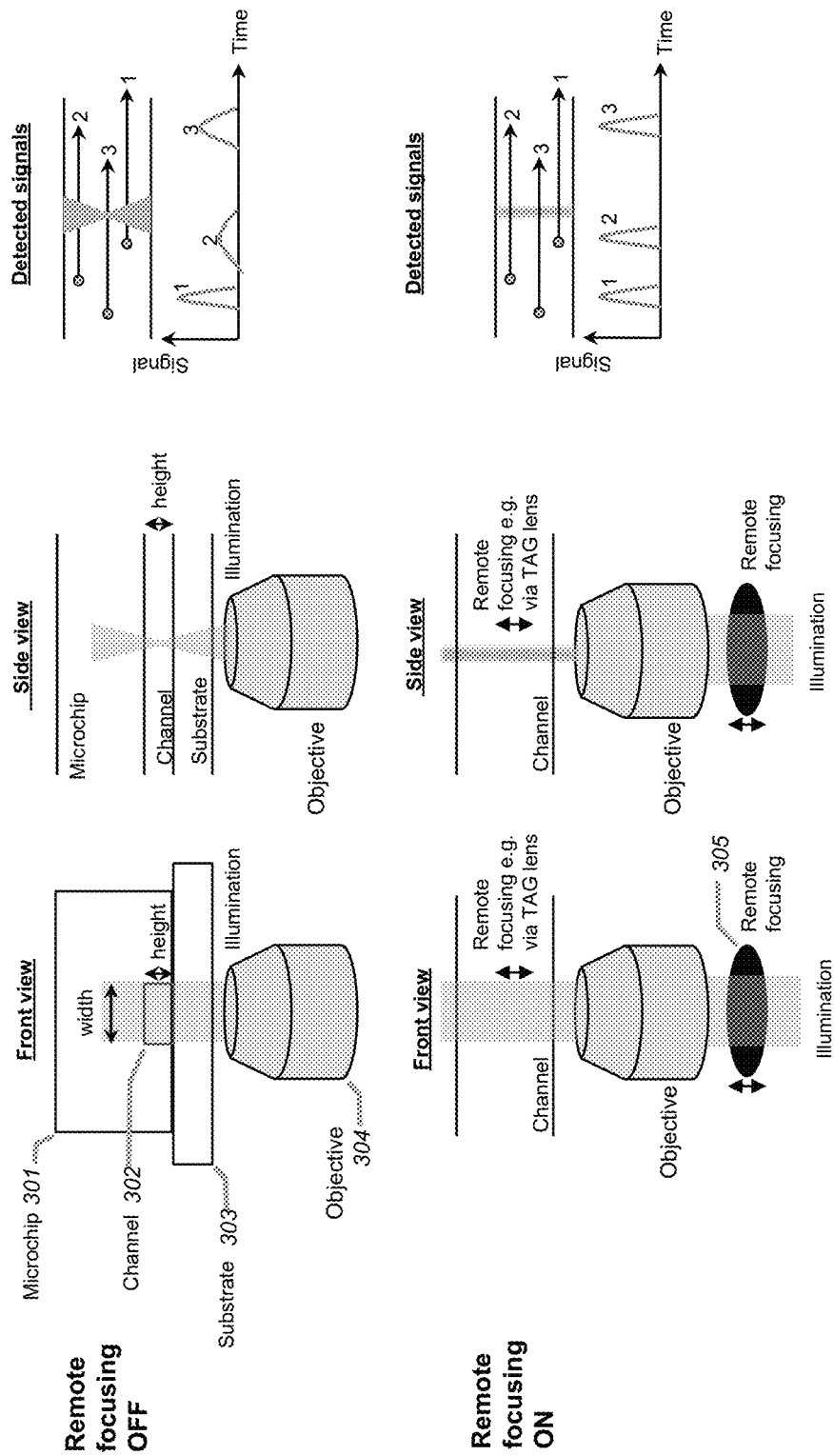
FIGS. 4A-4B shows schematics demonstrating the concept and advantages of including laser modulation in a droplet detection unit, in part by using remote focusing (RF), in accordance with embodiments. For example, a tunable acoustic gradient (TAG) index lens (FIG. 4A), an electrical lens, or other non-diffracting illumination schemes (FIG. 4B) such as Bessel beams or Airy beams, can be used in conjunction with the objective unit as a point(s) of detection of any of the systems described herein, in accordance with embodiments.
Figure 4B:
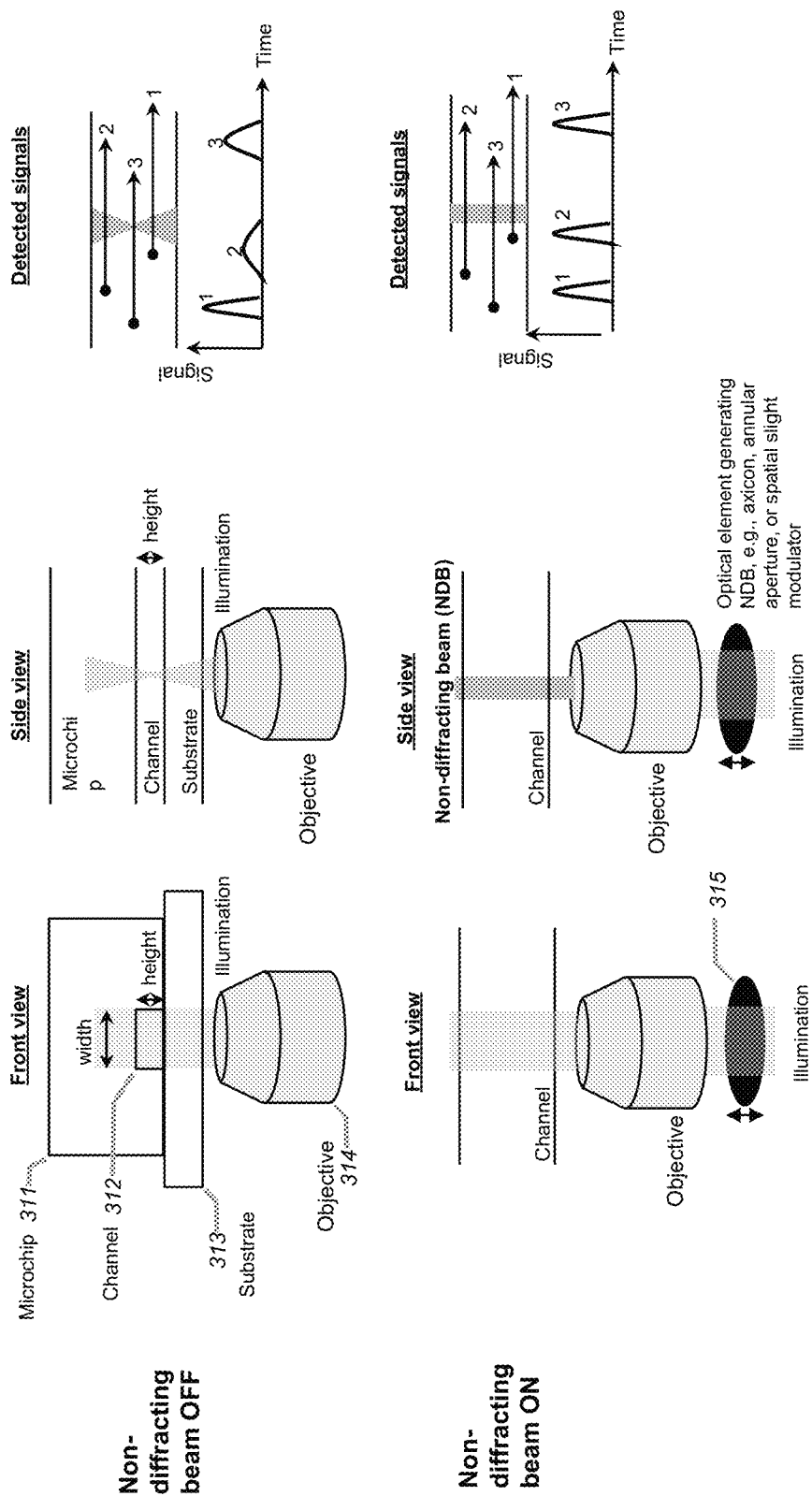

To overcome the issue described in the foregoing paragraph, the inventors have devised a novel strategy using remote focusing (i.e., "re-focusing" or "RF") of the illumination beam to effectively create a thin homogeneous illumination profile and provide a detection efficiency that is independent of the axial position, as illustrated in FIG. 4A (Module 300). The use of RF may be advantageous as it can increase the depth of field when compared to regular objectives and can provide a user-specified changeable focal length with sub-microsecond temporal resolution. Alternatively, or in combination, non-diffracting beams such as Bessel or Airy beams can be used as illustrated in FIG. 4B (Module 310).

Achieving a homogeneous high spatial resolution without any compromises in temporal resolution is highly desired for applications that involve detecting and sorting low-abundance events from a large amount of heterogeneous or complex starting samples. In the following description, an example is provided as a droplet-based cell sorting application. It shall be noted that the benefit of the methods, devices, and systems described herein are not meant to be limited to this particular application but instead may be universally applicable. This specific example is to help illustrate the basic principle of the system proposed herein.

For antibody discovery, antibody producing cells, such as primary B cells, can be prepared as single cell suspension from spleen or bone marrows of an immunized animal by following well-established protocols. These antibody producing cells can be encapsulated in droplets as described herein together with fluorescently-labelled antigens (i.e., "dyed antigen") that can bind to antigen-specific antibodies (i.e., "antibody of interest") that are secreted from an encapsulated B cell. However, in at least some instances the labeled antigen may be homogeneously distributed throughout the droplet such that the fluorescence signal will be the same independent of the presence or absence of the antibody of interest. This issue can be overcome by co-encapsulating a microsphere with a functionalized surface that can specifically anchor the antibodies released from a co-encapsulated cell, e.g., by an IgG affinity reagent such as Protein-A and anti-IgG antibodies. The microsphere may capture the antibodies of interest, which in turn may capture fluorescently-labeled antigens, thereby leading to fluorescent focus formation on the microsphere. The fluorescent focus can be optically detected as an assay readout of a positive droplet (i.e., "target droplet"), which can be sorted and dispensed in a real-time or near real-time fashion. Two factors may determine the accuracy and efficiency of detecting optical signal of such a fluorescent focus:

The spatial resolution should be sufficient to resolve a microsphere within a droplet, for example a 5-µm microsphere within a 100-µm droplet;

Out-of-focus signal should be sufficiently suppressed to separate the signal localized to the microsphere from signal that can be attributed to unbound fluorescently-labelled antigens in the droplet.

Therefore, the illumination beam may be focused into a thin sheet to generate sufficient spatial resolution to distinguish small features such as a particle or a cell. Tight focusing, however, may lead to greater beam divergence, which in turn may cause a loss of spatial resolution above and below the focal plane. The detected signal may be the sum of the unbound dyed antigen within the droplet and the dyed antigen bound to the microparticle via the anchored antibody of interest. If the droplet passes the point of detection with the particle near the focal plane, the particle signal can be clearly resolved. However, if the particle within the droplet passes near the edge of the focal point, the particle signal will be broad and of lower amplitude, which can be indistinguishable from the signal of the free dyed antibody within the droplet. Hence, a large number of false negative events may be produced. To overcome this problem, extended depth of field illumination and detection can be used as described herein (e.g., in FIGS. 4A and 4B).

FIG. 4A illustrates the use of RF to modulate a beam of laser energy at a detection point of any of the systems described herein. FIG. 4B illustrates the use of NBD beams to modulate a beam of laser energy at a detection point of any of the systems described herein. In both embodiments, a beam of light may be passed through a cylindrical optical element focusing the light into the back aperture of the objective lens (304/314) aimed at the sample, in this case delivered through a point of detection along a channel (302/312) of a microchip (301/311) comprising supporting substrate (303/313). In an exemplary embodiment, the microchip 301/311 can be made of PDMS on a glass substrate 303/313.

Along the focusing axis of the cylinder lens, the initial beam may be de-magnified by the magnification factor of the objective lens given the appropriate focal length of the cylinder element. The initial beam diameter, focal length of the cylinder lens, and/or magnification factor of the objective lens may be adjusted for the illumination to span the width of the fluidic channel at the sample plane. Along the non-focusing axis of the cylinder lens, the parallel illumination beam may be unaltered until it passes the objective lens focusing the light into a sheet at the sample.

The minimum sheet width and confocal parameter may be defined by the NA of the objective lens and the incident beam diameter, i.e., the effective NA of the objective lens. Light from the focal plane of the objective lens may be collected and separated from the illumination via a beamsplitter and focused onto an aperture. The purpose of the aperture is to reject light from out-of-focus planes at the sample in order to reduce background noise. A rectangular aperture may be preferred over a circular one to better match the shape of the illumination profile which is extended across the channel and focused along the channel. Without the addition of further optical elements, several compromises must be made in order to make this configuration work:

1. If a highly effective illumination NA is used, the light sheet may be thin in the center of the fluidic channel, but broad towards the edges of the channel;
2. By instead lowering the effective illumination NA, a more homogeneous illumination profile may be created at the expense of reduced spatial resolution;
3. A confocal aperture matching the light sheet's xy dimensions after objective lens magnification may most effectively suppresses background light from xy positions not directly illuminated by the sheet. It may also suppress signal from axial positions not near the focal plane of the objective lens resulting in a loss of sensitivity in those regions; and
4. A larger confocal aperture may allow for the detection of signals from the entire height of the channel but may result in increased background.

The use of remote focusing (305 & 315), as shown in FIGS. 4A-4B, can overcome some or all of these compromises. By the introduction of a lens with variable focal length before the objective lens interfacing with the sample, the sample focal plane can be moved in axial direction, as shown in FIG. 4A. Hence, even if the illumination/detection is highly confined in axial direction, a large axial range such as the entire channel height may be accessible via optical translation of the focus. Alternatively, non-diffracting beams can be used to generate a sheet-like illumination with minimal divergence (315) as shown in FIG. 4B. With either remote focusing setup, the previously contradicting parameter optimization scheme can work to maximize spatial resolution, depth of field, and high background noise suppression in the following manner:

1. A high effective illumination NA may be used to tightly focus the illumination beam along the direction of the channel, resulting in improved (e.g., maximum) spatial resolution at the focal plane of the objective lens interfacing with the sample;
2. A confocal aperture matching the xy dimensions of the sheet illumination may be used before the detector to suppress background noise as well as low resolution signal from out-of-focus planes where the sheet thickness is large;
3. With measures 1 and 2 above, we effectively confine our detection to a small portion of the channel height. To detect particles with the same spatial resolution and sensitivity, the excitation/effective detection volume may be translated along the optical axis via remote focusing; and
4. The translation may occur fast enough to not compromise sampling speed. In a preferred embodiment, the channel should be scanned at least once along its entire axial extension during the time it takes one sample.

While many methods and optical modules are available for remote focusing in support of our proposed system and method, without limitation we focus on the use of a TAG lens for its high speed to avoid compromises in sampling rate, i.e., temporal resolution. At least two remote focusing designs are described herein:

1. Module 300 shown in FIG. 4A: Remote focusing may be used to extend the depth of the field of the optical detection for homogeneous resolution and detection efficiency within the entire channel height;
2. Module 310 shown in FIG. 4B: The use of non-diffracting beams for a homogeneous illumination of the entire channel height for homogeneous resolution and detection efficiency.

To screen for droplets (327, 347, 376, 399, 419, & 438) comprising relevant cells/molecules (328, 348, 349, 377, 378, 400, 420, 421, 439, & 440) with high sensitivity and specificity, the optical detection set up should provide high SNR and SBR ratios while maintaining a high temporal resolution for high throughput. Hence, uniformly high spatial resolution in combination with high detection efficiency is desired. Besides the presence of a particle or cell, the spatial position of a particle or cell within the screened volume may be of interest as well. In a high-throughput microfluidic assay system, this can be challenging.

As described herein, spatial modulation can be used to extract information about the size, shape, and/or position of a cell or particle. The sample may be illuminated and/or light may be detected with a spatially modulated pattern. Depending on the particle or cell's size, shape, and/or position, an additional modulation is added to the signal. By appropriate "de-modulation", the size, shape, and/or position of particle or cell, can be inferred. However, with this approach spatial information is encoded into the time domain, resulting in a loss of temporal resolution.

Figure 5A:
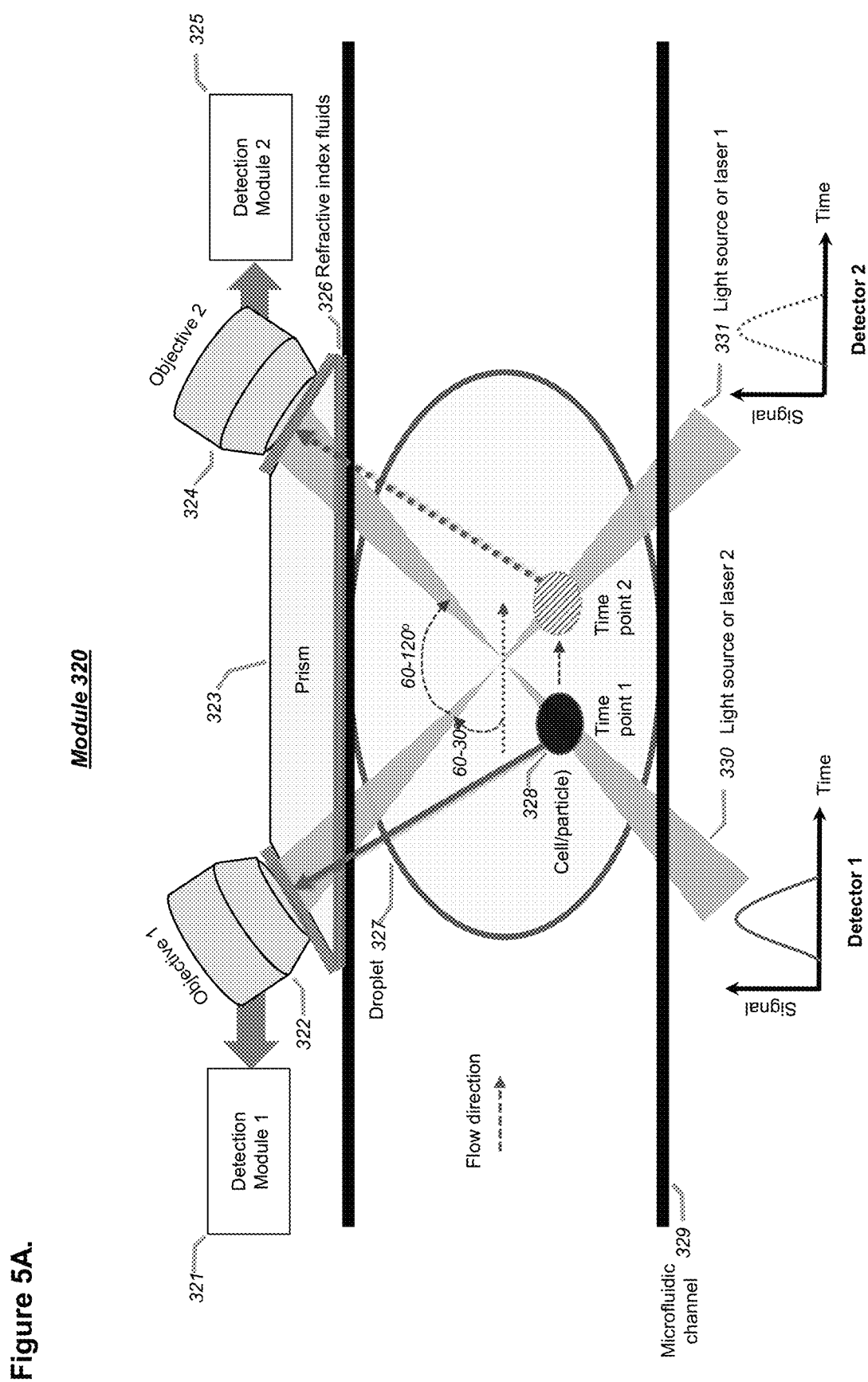
FIGS. 5A-5C shows an advanced optical configuration as part of a point of detection, using two objectives positioned at an about 60 to about 120-degree angle to each other at two corners of a prism, in accordance with embodiments.
Figure 5B:
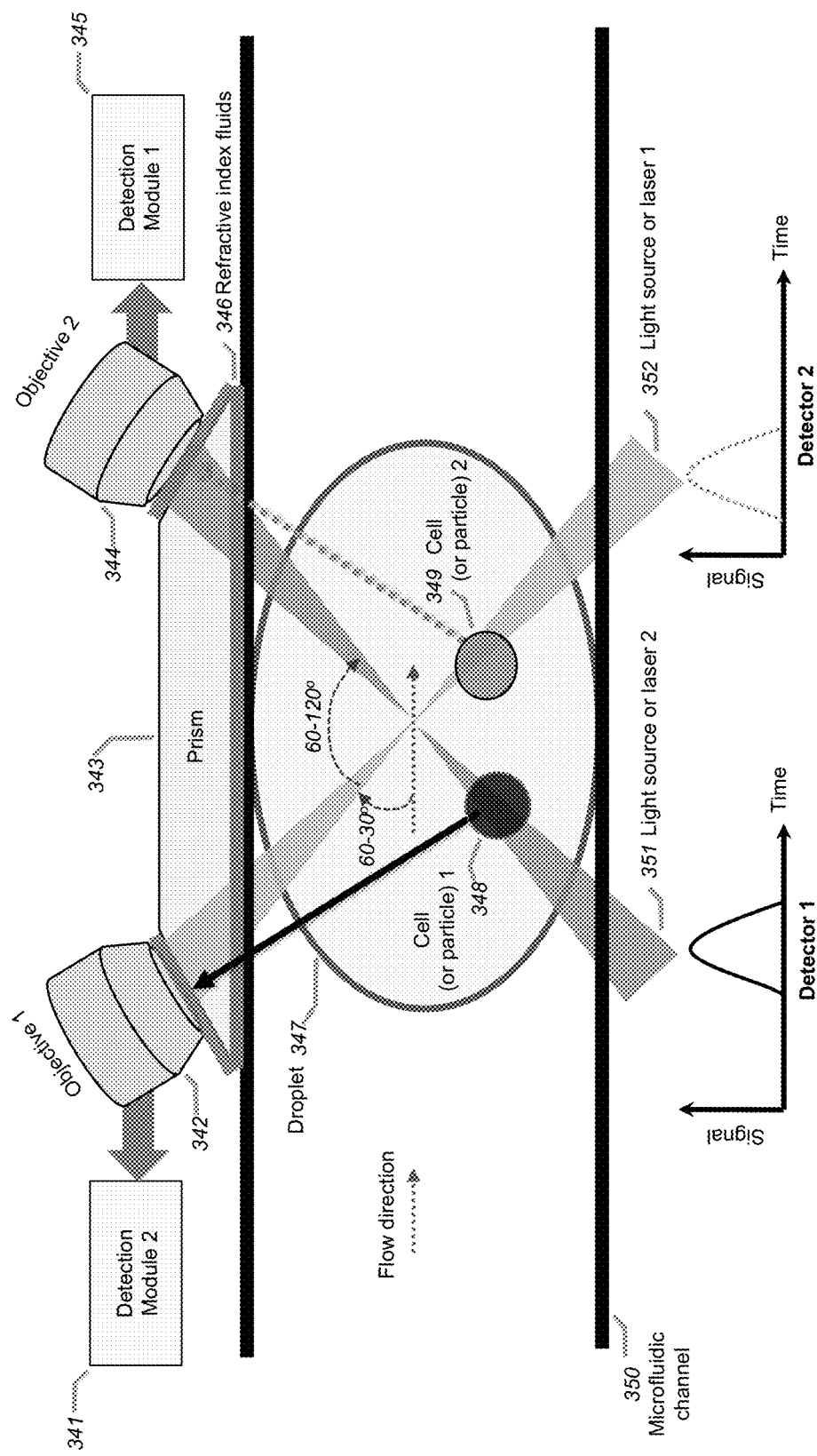
Figure 5C:
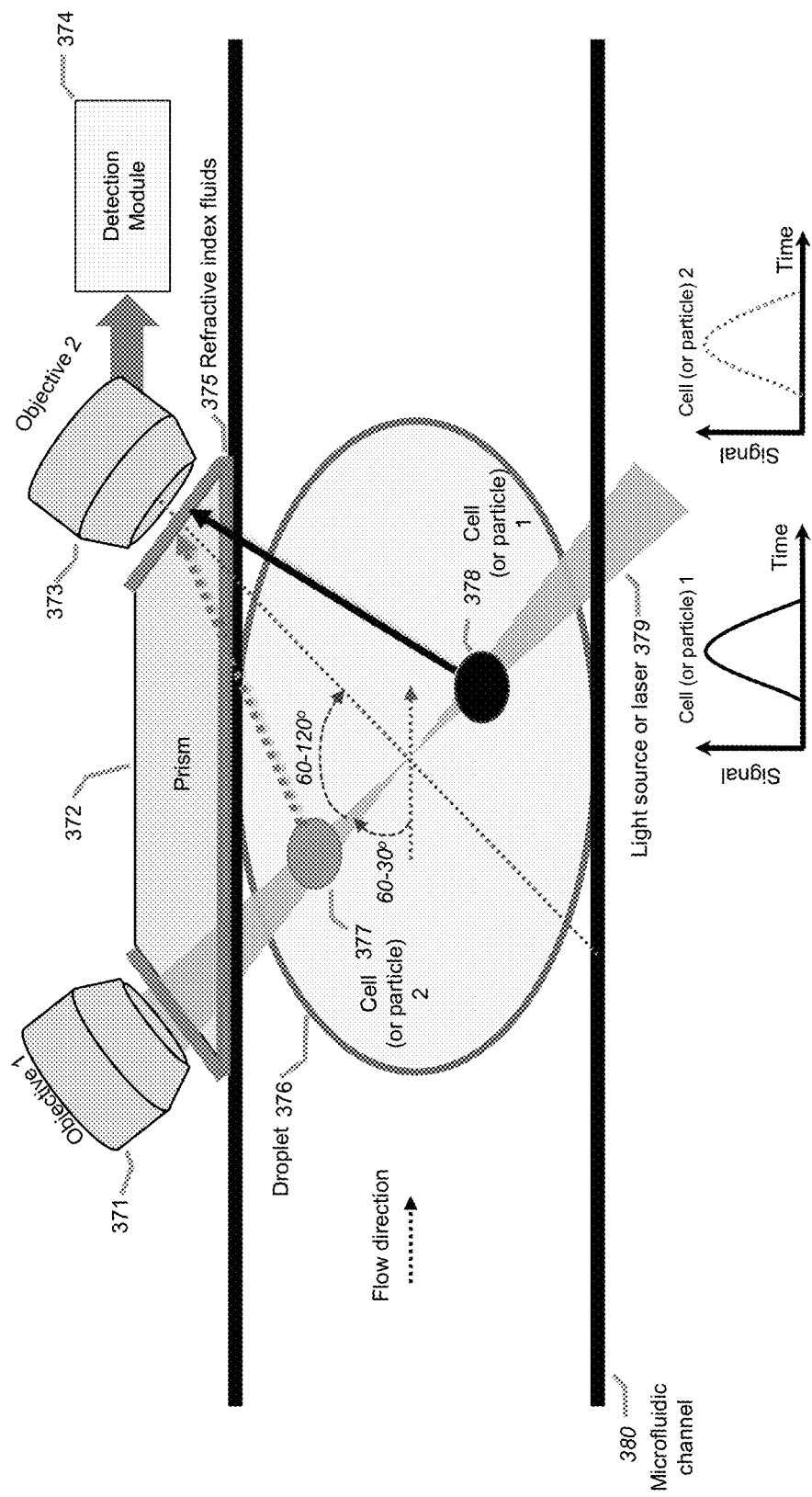

In an alternative embodiment to overcome this challenge, the modules illustrated in FIGS. 5A-5C, with decoupled, perpendicular illumination and detection to extract spatial information about the sample at high speeds with the use of single-point detectors or cameras, may be utilized in any of the systems described herein. The illustrated schemes may allow for detection of twice the signal intensity as the same cell/particle passing by two perpendicular optical planes as described in other embodiments herein. By orienting the illumination/detection planes at about 45 degrees with respect to the channel direction, we may overcome the limited focal depth which may be problematic in some instances when illuminating/detecting perpendicular to the channel. Therefore, the modules may allow for the use of lenses of high NAs while also maintaining isotropic detection efficiency independent of the channel height. The modules shown in FIGS. 5A-5C may also allow for collection of more photons, and therefore detection of lower strength signals as well as identification of finer spatial features, when used in combination with any of the systems described herein. The proposed new designs can be used for detecting one, two, or more cells and/or particles inside a droplet (FIGS. 5A-5C). The new designs may further allow for detection of twice a given cell or particle inside a droplet that crosses the two perpendicular optical planes (i.e., detection at two different locations within the droplet and/or channel). Further, by orienting the illumination/detection planes at about 45 degrees with respect to the channel direction, the limitation in the focal depth in a conventional optical setup, where the coupled illumination/detection light path is perpendicular to the channel direction, may be overcome. Therefore, the modules described in FIGS. 5A-5C may allow for use of lenses with a high NA while maintaining isotropic detection efficiency independent of the channel height, resulting in collecting more photons and therefore detecting weaker signals as well as finer spatial features.

Achieving a high and homogeneous spatial resolution without any compromises in temporal resolution or detection efficiency is highly demanded in applications that require detecting and sorting single cells or particles. In addition, it is of utmost importance to collect as many signal photons as possible to maximize signal strength and enhance the ability to detect weak signals. For example, in antibody discovery, the presence or absence of certain cellular or subcellular structures of an antibody producing cell can be a deciding factor on whether a cell is positive or not. To get significant resolution on these structures, a high and isotropic spatial resolution is required.

The problem with the conventional, single objective lens-based approaches are:

To maximize spatial resolution as well as detection efficiency, a high NA lens is demanded;

1. High NA lenses have a limited depth of focus. While objects near the focal plane will be clearly resolved, spatial features of objects distant from the focal plane will appear blurred;
2. Cameras are of limited usefulness as detectors if the imaging plane is parallel to the channel direction. To image the entire channel's cross-section, the imaging plane needs to be oriented at a certain angle.

Signals from out-of-focus planes are blurred, hence, spatial features of objects at those out-of-focus locations cannot be resolved.

In some embodiments as exemplified in FIGS. 5A-6C, a system is provided to overcome this problem and improve the sensitivity and accuracy of detecting intra-droplet cells and/or particles, the system comprising decoupled yet perpendicular excitation and detection that is positioned at an angle to the channel direction can be used as described in the following paragraphs.

In the system, two objective lenses (322/324, 342/344, 371/373, 393/395, 413/415 & 433/435) may be positioned perpendicularly or near-perpendicularly to each other, wherein the excitation laser beams passing through the objectives interface with a microfluidic channel at an angle of about 30-60 degrees, of about 40-50 degrees, or of about 45 degrees. In the excitation path, a cylinder optical element may be used to generate a sheet of light (330/331, 351/352, 379, 402/403, 423/424 & 442) illuminating a cross-section of a microfluidic channel (329, 350, 380, 401, 422 & 441). This cross-section may be imaged via an objective lens onto a detector which can be a single-point detector such as a PMT or a multi-channel detector such as a camera. Hence, in the plane of observation, the spatial resolution may be defined by the NA of the detection lens. Perpendicular to the observation plane, the spatial resolution may be determined by the thickness of the light sheet used for illumination, which in turn may depend on the NA of the excitation lens.

To minimize optical aberrations introduced by illuminating/detecting through materials with different refractive indexes, a prism (323, 343, 372, 394, 414 & 434) may be used to rotate the interface. As a replacement for or in addition to the prism, refractive index matching fluids (326, 346, 375, 398, 418 & 437) may be used to improve signal quality. Since the arrangement of the first and second objectives can be symmetric, either objective lens can serve for illumination or detection. Hence, by introducing a beam splitter, a detector and a light source can be fitted to each arm, respectively. Particles and/or cells inside a droplet passing the channel can be detected twice (321/325, 341/345, 391/397, 411/417 & 431/436) in two perpendicular planes, respectively. If a particle or cell passes in the center of the channel, it may be detected in both arms at the same time. If it passes below or above the center, it may be detected in the two arms at different times. Hence, from the time delay between the two detection arms, the spatial position of the particle within the channel can be inferred with two distinct single-point detectors. If a camera is used, images can be directly taken from the cross-section of the channel. Therefore, not only the spatial position, but also an image of the particle passing the observation plane can be obtained.

FIG. 5A shows detection of the same particle or cell as it moves through the channel at two different locations and at two different times. Both the excitation and detection paths may use the same excitation wavelength and emission filter. FIG. 5B shows detection of different particles or cells with matching fluorophores at two different locations within the droplet. The two excitation/detection paths may use different excitation wavelengths and emission filters. FIG. 5C shows detection of different particles or cell with only a single excitation/detection path in order to increase light throughput.

Figure 6A:
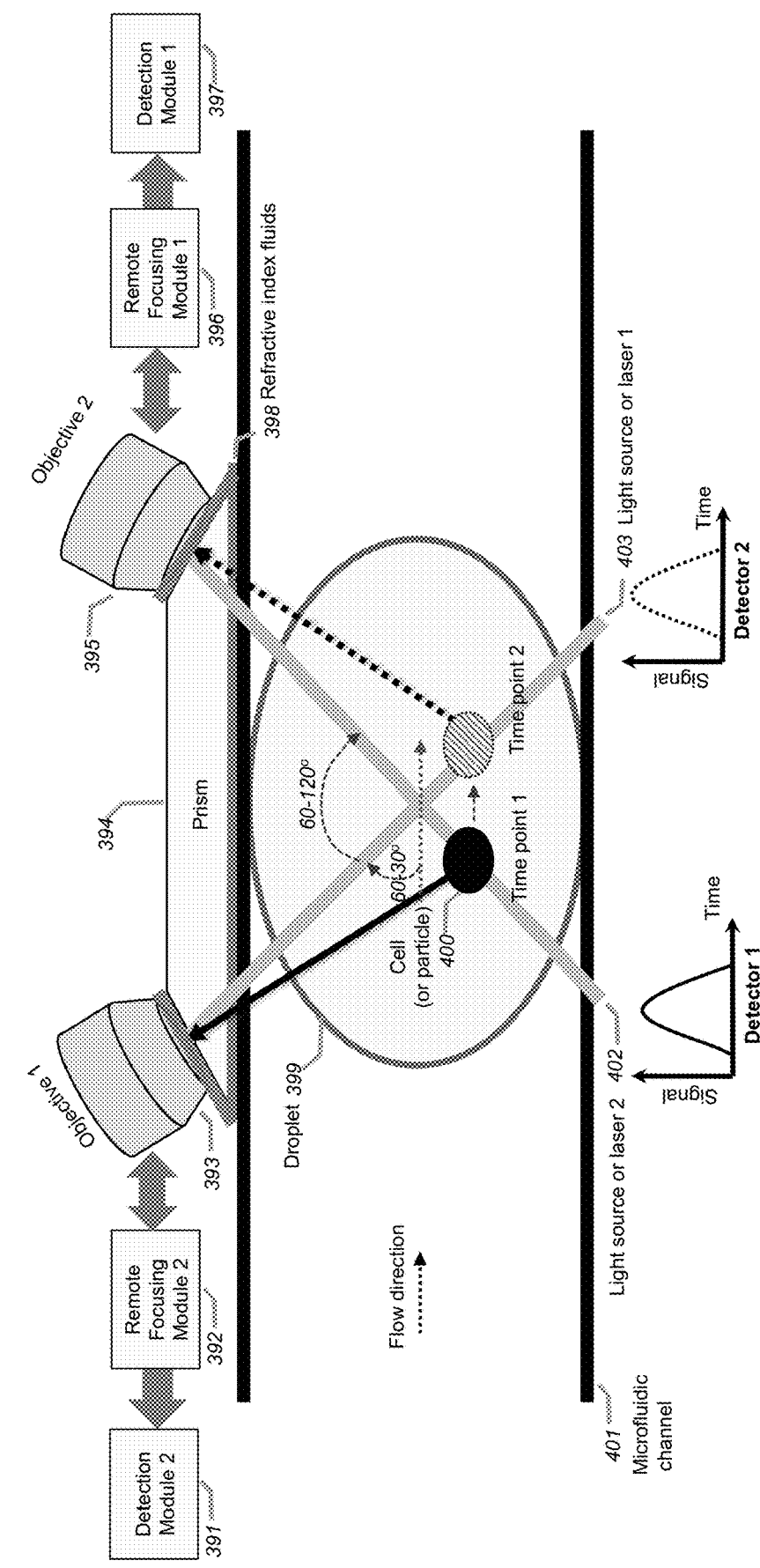
FIGS. 6A-6C illustrates an advanced optical configuration as part of a point of detection, using two objectives positioned at an angel of about 60 to about 120-degree to each other at two corners of a prism, in a way similar to that in FIGS. 5A-5C but further integrated with a remote focusing device as illustrated in FIG. 4, in accordance with embodiments.
Figure 6B:
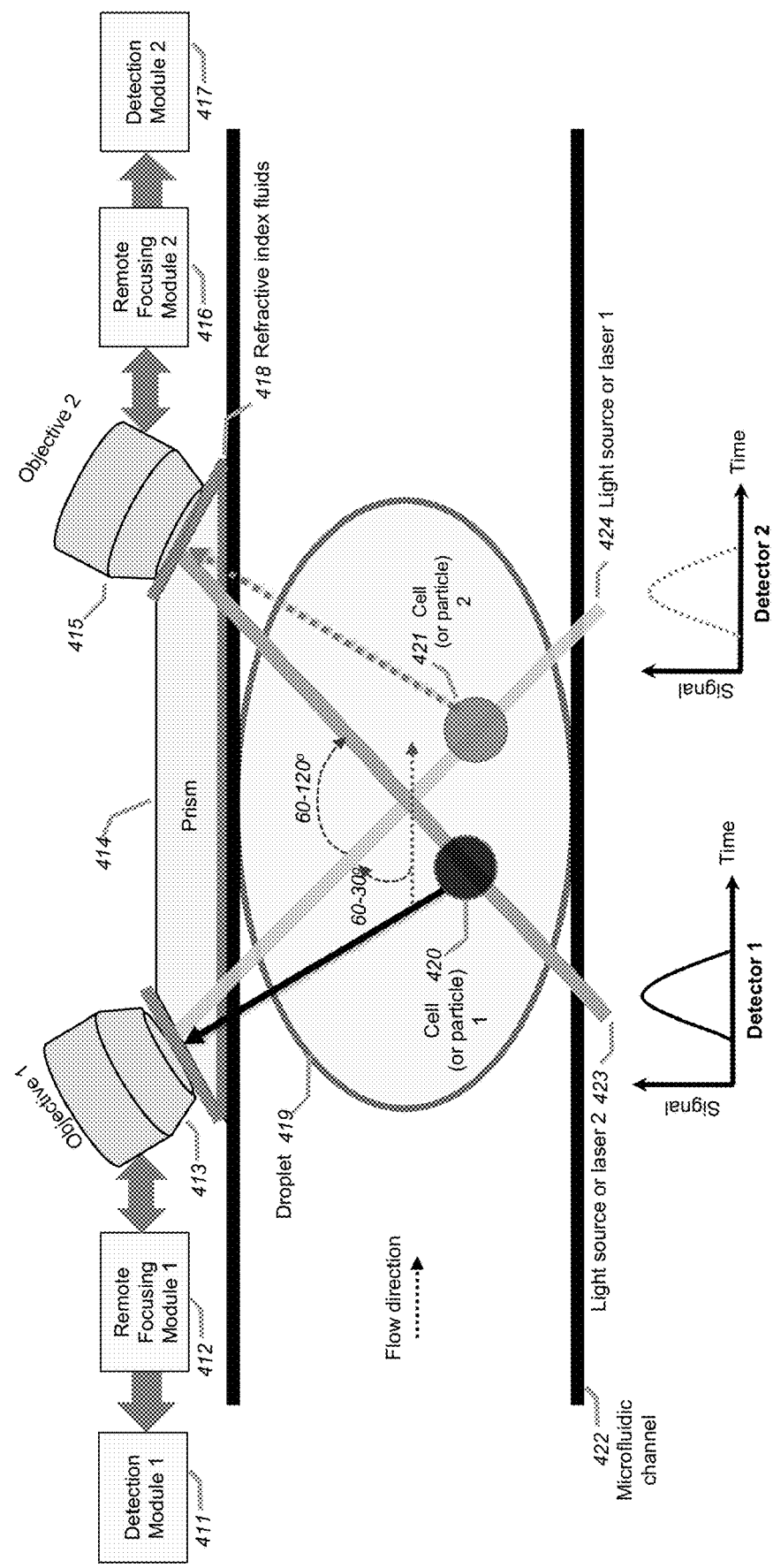
Figure 6C:
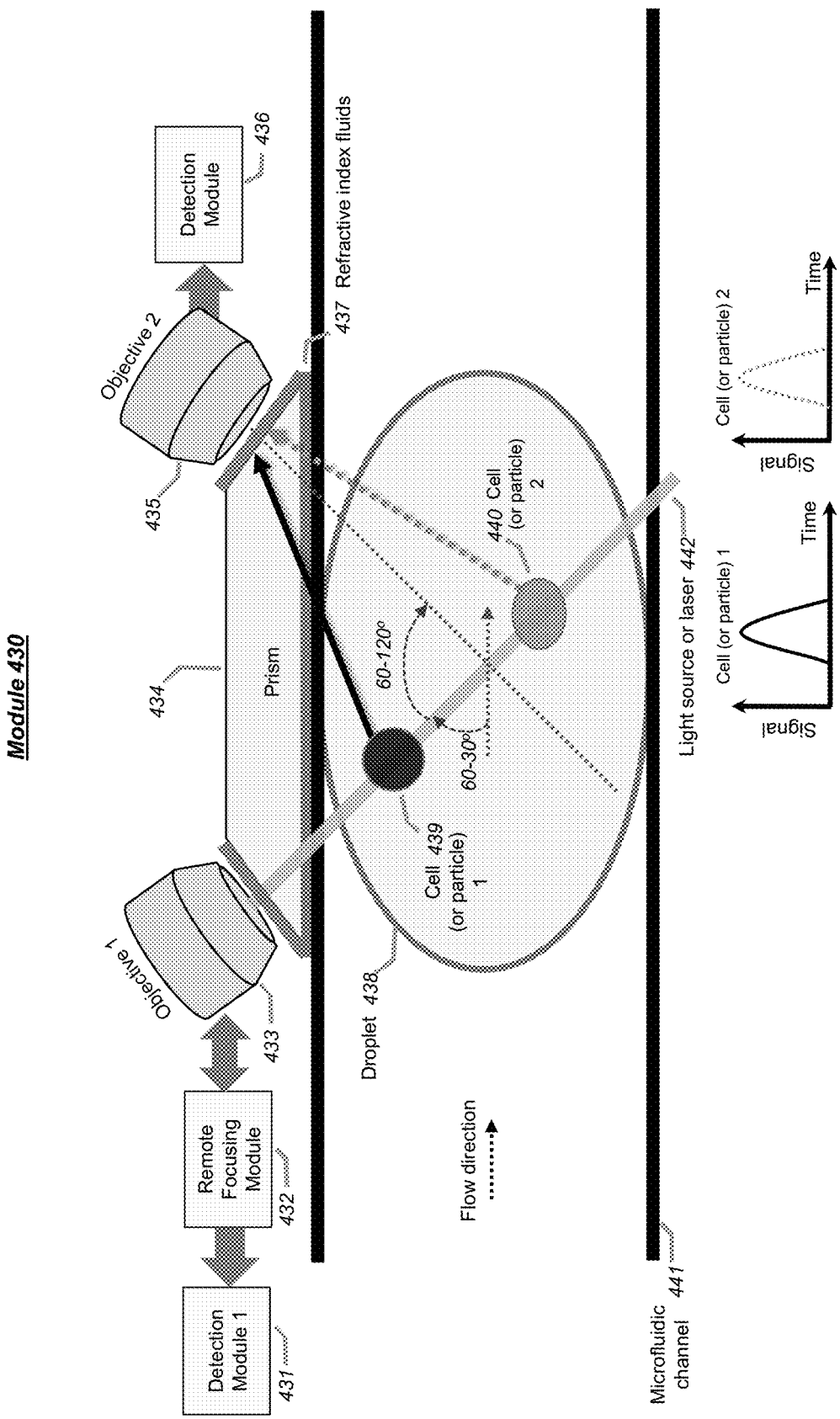

The proposed scheme can be used for applications with a droplet comprising a single cell or a single particle as shown in FIG. 6A, or for a droplet comprising two and more cells or particles as shown in FIGS. 6B and 6C. The prism may be used to optically interface with a microfluidic chip to minimize optical aberrations at this angle. Index matching fluid can be used to maintain a constant refractive index. The spatial position of cells and/or particles within the microfluidic channel can be determined by the timing of the signal detected in both illumination/detection arms. Achieving a high and homogeneous spatial resolution with minimal compromise in temporal resolution or detection efficiency is in high demand in any given particle-counting or sorting-application based on optical detections. In addition, it may be important to collect as many signal photons as possible to maximize signal strength, enhance the ability to detect weak signals, and ultimately improve sensitivity and also provide a quantitative system.

In summary, the exemplary modules shown in FIGS. 5A-6C may provide one or more of the following benefits, which can be integrated in any of the systems described herein:

1. High NA lenses can be used without compromising the depth of field, resulting in higher spatial resolution and higher detection efficiency;
2. The detection efficiency along the observation plane may be isotropic;
3. Light throughput may be improved (e.g., maximized) because no aperture is used to suppress out-of-focus signals;
4. By using both objective lenses for illumination as well as detection, the sample may be observed at two different planes and the spatial position of the sample within the channel can be calculated from the time delay between the two detection events;
5. Cameras can be used as detectors capturing images of a cross-section of the channel. Hence, fine details of the sample can be spatially resolved.

While the spatial resolution may already relatively uniform with the above-described approaches, it can be further improved by providing remote focusing (392/396, 412/416 & 432) of the excitation beam in the setup illustrated in FIGS. 5A-5C. To summarize, in a preferred embodiment we propose the integration and use of one or more of the following modules in our systems:

Module 320: Each objective may generate a light sheet in the detection plane of the opposing lens. By the delay of the detected signal in both detection modules, the axial particle position may be obtained;

Module 370: Multiple color channels may be used with the same objective lens;

Module 340: Optionally, multiple detection channels may be split between the two lenses to avoid crosstalk between or among different color channels;

Module 390: Remote focusing or non-diffracting beams may be used as described herein for a more efficient and more quantitative particle detection;

Module 410: Optionally, with remote focusing or non-diffracting beams, multiple detection channels may be split between the two lenses to avoid crosstalk between or among different color channels;

Module 430: Alternatively, with remote focusing or non-diffracting beams, multiple color channels can be used with the same objective lens.

Figure 20B:
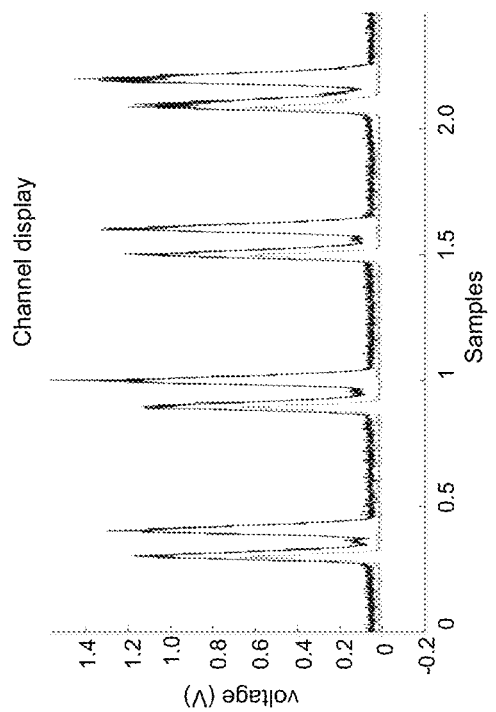
FIGS. 20A-20B show an exemplary implementation of a dual focusing feature at a point of detection, in accordance with embodiments.
Figure 20A:
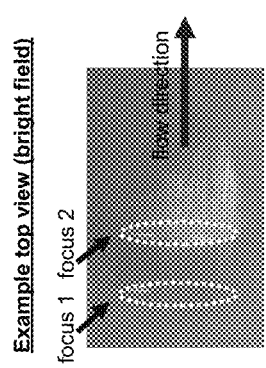

For high-throughput droplet detection and sorting applications, the droplets can comprise intra-droplet objects (e.g., cells and/or beads) that move within the droplets. The relative position of these objects to the optic focal plane at a point of detection can be random and as a result may lead to poor focusing (i.e., poor signal/noise ratios), such that the detection efficiency for these moving objects may be suboptimal, particularly if the droplet diameter or the fluidic channel width is significantly larger than the focal plane height. In some embodiments, two laser beams can be used to provide dual focusing as part of a point of detection to improve the detection efficiency of intra-droplet moving objects. In some embodiments, a single laser beam can be split into two laser beams using a fiber optical splitter or optical element to provide dual focusing at a point of detection. For instance, a laser modulator comprising an optical device with a birefringent element can be used to efficiently provide a line-shaped laser illumination through splitting the laser light into two separate laser beams, thereby leading to dual focusing (e.g., Module 730 shown in FIG. 18). Such a birefringent element (i.e. birefringent polarizer) can split unpolarized light or light polarized at a 45-degree angle, by refraction into two beams of linearly polarized light with orthogonal or near orthogonal polarization. Given dual focusing, each droplet can travel through two foci that are closely positioned one after another along the droplet flow direction, thereby improving the probability that at least one focus can yield optical signals representing intra-droplet objects with improved signal-versus-noise profile. The distance between the two foci can be tuned by adjusting the distance between the objective and the optical device. Suitable birefringent polarizers are represented by Nicol prisms, Glan-Thompson prisms, Glan-Foucault prisms, Glan-Taylor prisms. Rochon prims, Senarmont prisms, and Wollaston prisms are other examples of birefringent polarizers consisting of two triangular calcite prisms that are cemented together. Exemplary implementations of dual focusing by using an optical device comprising a Wollaston prism, as part of a point of detection, are shown in FIGS. 20A-20B.

Figure 7A:
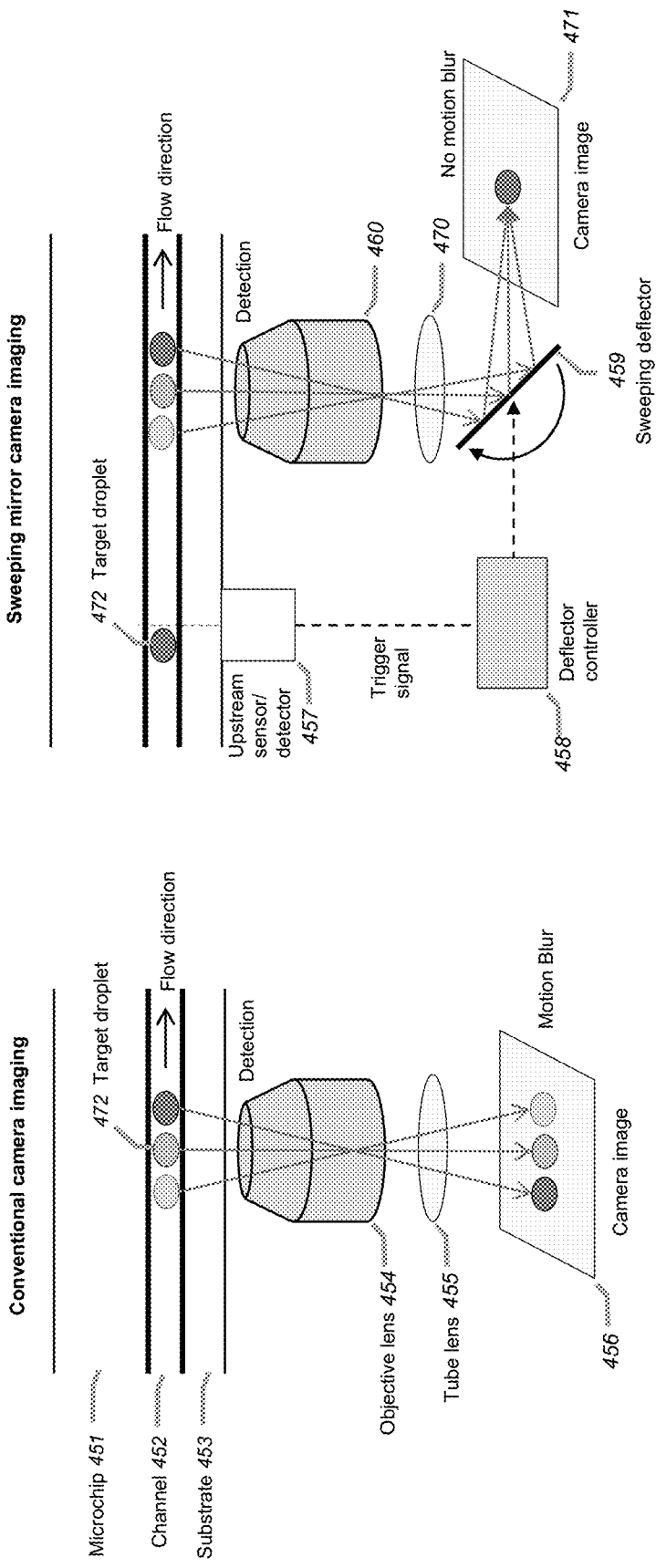
FIGS. 7A-7B illustrates an optical configuration for imaging fast moving targets in a microfluidic system without motion blur, in accordance with embodiments.

For high-throughput droplet sorting and dispensing applications, the typical flow rate can be as high as 100 mm/s, or in some cases, up to about 900 mm/s. While it may be desirable to take an image of a fast-moving target, camera frame rates are often too slow to capture the targets (472 & 490) flowing through a channel (452 & 483) of a microchip (451 & 482) on a substrate (453 & 484) without motion blur. For example, a target spatial resolution of 1 μm would require an exposure time of less than 10 μs at a flow rate of 100 mm/s to avoid motion blur. Otherwise, a particle (472 & 490) passing a camera's field of view (456, 471, 487 & 494) during a single exposure cycle would appear as a streak (456 & 487). However, the motion of a particle, if known, can be compensated by moving the image of the target at the same speed during a longer camera exposure cycle. This can be achieved, for example, by addition of a movable ("sweeping") deflector (459) into the detection path comprising an objective lens (454, 460, 485 & 492) and a tube lens (455, 470, 486 & 493), as shown in FIG. 7A (Module 450). Suitable devices include sweeping mirrors, acousto-optic deflectors, and spatial light modulators.

For droplet detection in a microfluidic system, the speed of a target droplet can be determined through measuring the flow rate. To trigger image deflection at the appropriate time, a sensor that senses or counts droplets (457 & 491) may be added upstream of the imaging device. Upstream droplet sensing/counting by the sensor can be achieved in several ways as disclosed herein, which include but are not limited to an optical, an electrical, and a magnetic detection method. Spatial and temporal resolution of the sensor should be sufficient to sense the presence of droplets flowing at a speed of up to 900 mm/s.

As used herein, the term sensor generally refers to a module or device that detects and converts the physical parameter of a passing droplet into a signal which can be measured electrically. The sensor can be non-optical, optical, or a combination of both, which senses or counts a droplet, droplet size, droplet, and/or relative position of the droplet when passing through the sensor's sensing area, regardless of whether it is a target or non-target droplet, i.e., the sensor is non-discriminative for a target droplet versus a non-target droplet. In comparison, the signal detected by a detector at a point of detection is discriminative in terms of the detector's ability to quantitatively or semi-quantitatively detect a cell and/or a particle within a droplet. Exemplary sensors are described herein, which includes those illustrated in FIG. 7 and other exemplary systems disclosed herein, which has a component labelled as "sensor".

Figure 7B:
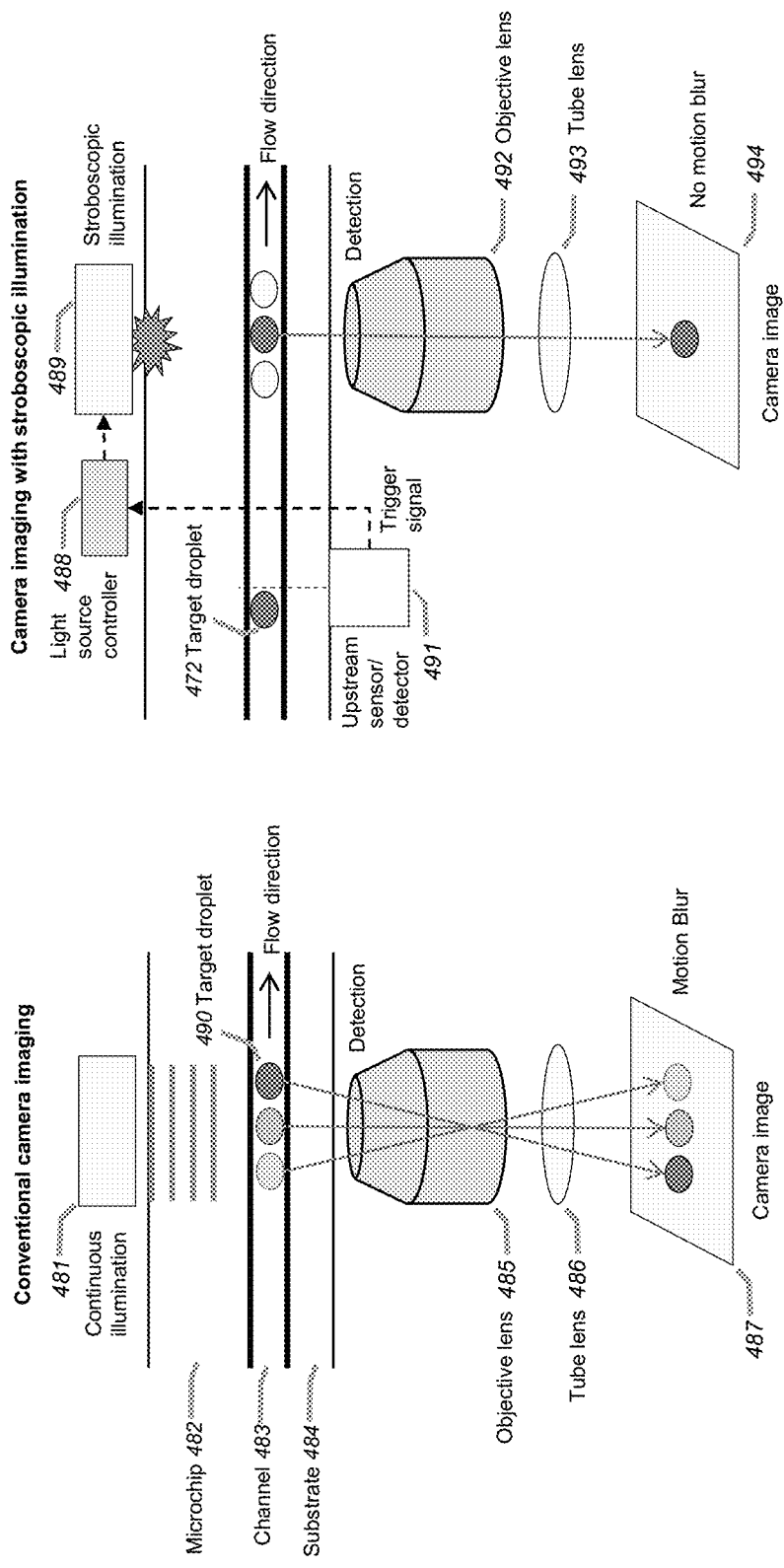

Alternatively, a short illumination pulse 489 can be used to image the moving target without motion blur as shown in FIG. 7B (Module 480). The pulse may be short enough that the target has moved less than the desired spatial resolution. For example, at a flow speed of 100 mm/s and a desired resolution of 1 μm, the illumination duration should be less than 10 μs. In some embodiments, the short illumination (e.g., stroboscopic illumination) for each imaging exposure cycle has a total duration of about 0.5 ms to about 50 ms, of about 0.5 ms to about 10 ms, of about 5 ms to about 20 ms, about 10 ms to about 30 ms, or about 20 ms to 50 ms. This can be achieved, for example, by using q-switched or mode-locked lasers (e.g., active q-switched lasers based on acousto-optic modulator (AOM) and/or electro-optic modulator (EOM)). High resolution images of targets may comprise valuable information, which can be used for subsequent sorting and dispensing, as well as tracking that may facilitate the sorting and dispensing. In summary, the following modules are proposed, which may optionally be integrated into any of the systems described herein:

Module 450: To obtain high resolution images of targets moving though a microfluidic device at high speeds, a sweeping deflector may be used in the detection path to compensate for the target movement and obtain a motion artifact free image;

Module 480: To obtain high resolution images of targets moving though a fluidic device at high speeds, stroboscopic illumination may be used in the excitation path to avoid motion artifacts.

In some embodiments, to obtain high resolution images of targets moving through a fluidic device at high speeds, the traveling targets (e.g. droplets) can be slowed by providing a "buffer zone" along a fluidic channel (e.g. a sorting channel) in a microfluidic device. The buffer zone may be provided with one or more bypass channels (e.g., side pores or side channels) that are connected to a main fluidic channel with travelling droplets, such that the fluid in the main fluidic channel can partially enter the bypass channels to effectively reduce the movement speed of droplets, thereby reducing the motion blur during droplet imaging as part of a point of detection. In some embodiments, one or two arrays of pillars may be provided at the interface between the main fluidic channel and the bypass channels to constrain the traveling droplets moving along the main fluidic channel (e.g., Modules 710 and 720 shown in FIGS. 17A-17B). In some embodiments, the buffer zone may comprise a widened fluidic channel (e.g., Module 710 shown in FIG. 17A). In some embodiments, the buffer zone may comprise one or more side chambers that are connected to a main fluidic channel through a bypass channel. In some embodiments, the bypass channels may be positioned downstream of a sorting junction. In some embodiments, the bypass channels may be positioned downstream of a sorting junction and upstream of a dispensing nozzle. In some embodiments, the buffer zone with bypass channels can be implemented at a point of detection, which are exemplified in FIGS. 17A-17B and FIG. 22. Creation of a buffer zone may be combined with repetitive short illumination for enhanced results.

In some instances, it may be of great interest to have fast moving particles inside microfluidic channels in the same plane for precise detection and increased sensitivity, which in turn may improve the overall sorting and dispensing efficiency. The improved sorting and dispensing may be critical for isolating low abundance or rare events in many real-world applications, which typically favor maximal recovery of all positive events and maximal removal of false positive ones.

In general, finding non-destructive methods to bring fast-moving droplets in the field of view of the objectives have significant values in droplet microfluidics, where limitations exist in selecting shape, material, and dimension of a microchannel, as well as the selecting the size of droplets. Magnetic forces are one solution to address this need, which can be implemented in any of the systems described herein.

In some embodiments, one, a pair, or array(s) of magnet(s) can be used before a point of detection in combination with magnetic particle(s) that may be provided together with a cell in a droplet, as shown in FIGS. 8A-8F. Magnets can be permanent, tunable electric, or a combination of both, which can be made of different material with various shapes, geometries, dimensions, and powers. Also, magnetic-microparticles or nanoparticles are widely available for molecular and cell biology applications. Magnetic particles may be available in a form that is coated with various functional groups such as carboxyl groups, proteins, and oligonucleotides, which may enable the specific capture of desired target molecules, cell types, or organelles available in a given droplet. Various combinations of magnets can be implemented into our systems, as exemplified in FIGS. 8A-8F.

Figure 8A:
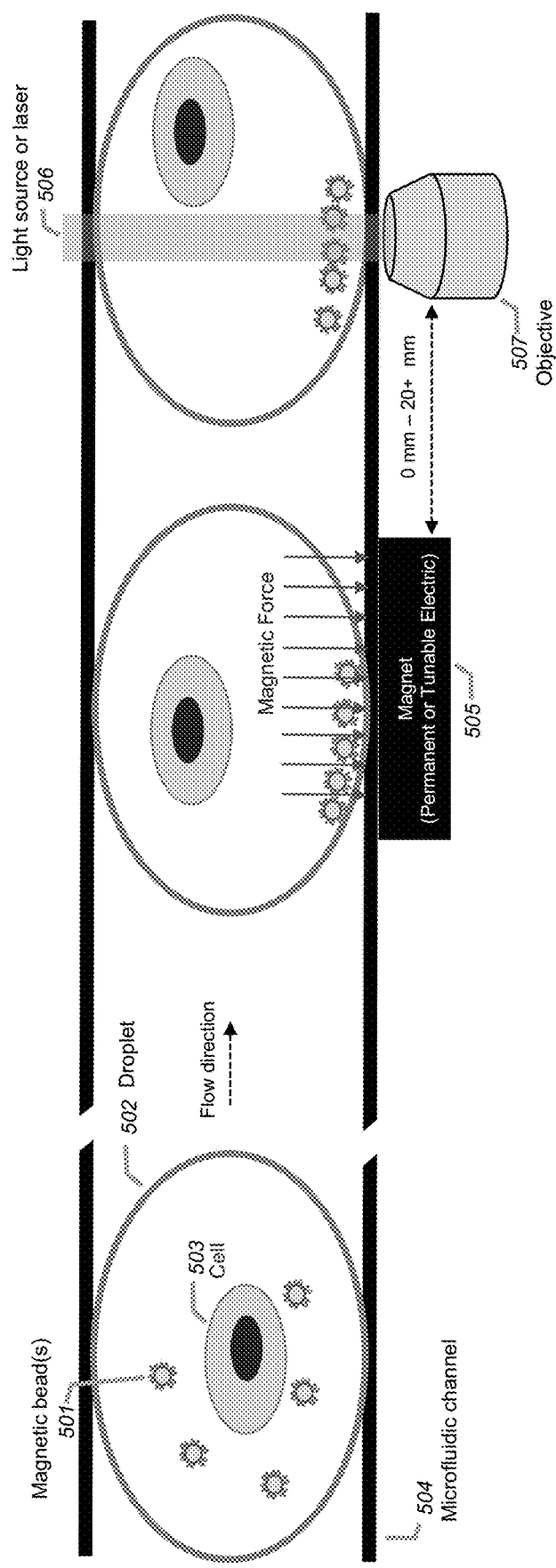
FIGS. 8A-8F illustrate a channel comprising a single, pair(s), or array(s) of permanent and/or tunable magnets with different shape, size, geometry, power, or arrangement at or before a point of detection for applications where magnetic particles are encapsulated with one or more cells in droplets for assays, in accordance with embodiments. Different designs can be implemented as illustrated in FIGS. 8A-8F.

In one embodiment shown in FIG. 8A, a magnet 505 may be placed at a distance of about 0 mm to about 20 mm from a nearest downstream detection point. Magnetic forces generated by magnet 505 may gradually alter the path of magnetic particle(s) 401 provided in a droplet 502 as they move toward the magnetic field in the microfluidic channel 504. By adjusting the flow rate and/or magnetic forces per defined application, one should be able to concentrate magnetic particles (e.g., forming clusters) next to each other and near the detection side of the microfluidic channel 504 within the field of view of the objective 507. The concentrated magnetic particles in turn may generate near-homogeneous and strong signals. It should be noted that a donut-shaped magnet 505 can also be integrated into the objective 507, making the distance from a nearest downstream point of detection 0 mm or almost 0 mm.

Figure 8B:
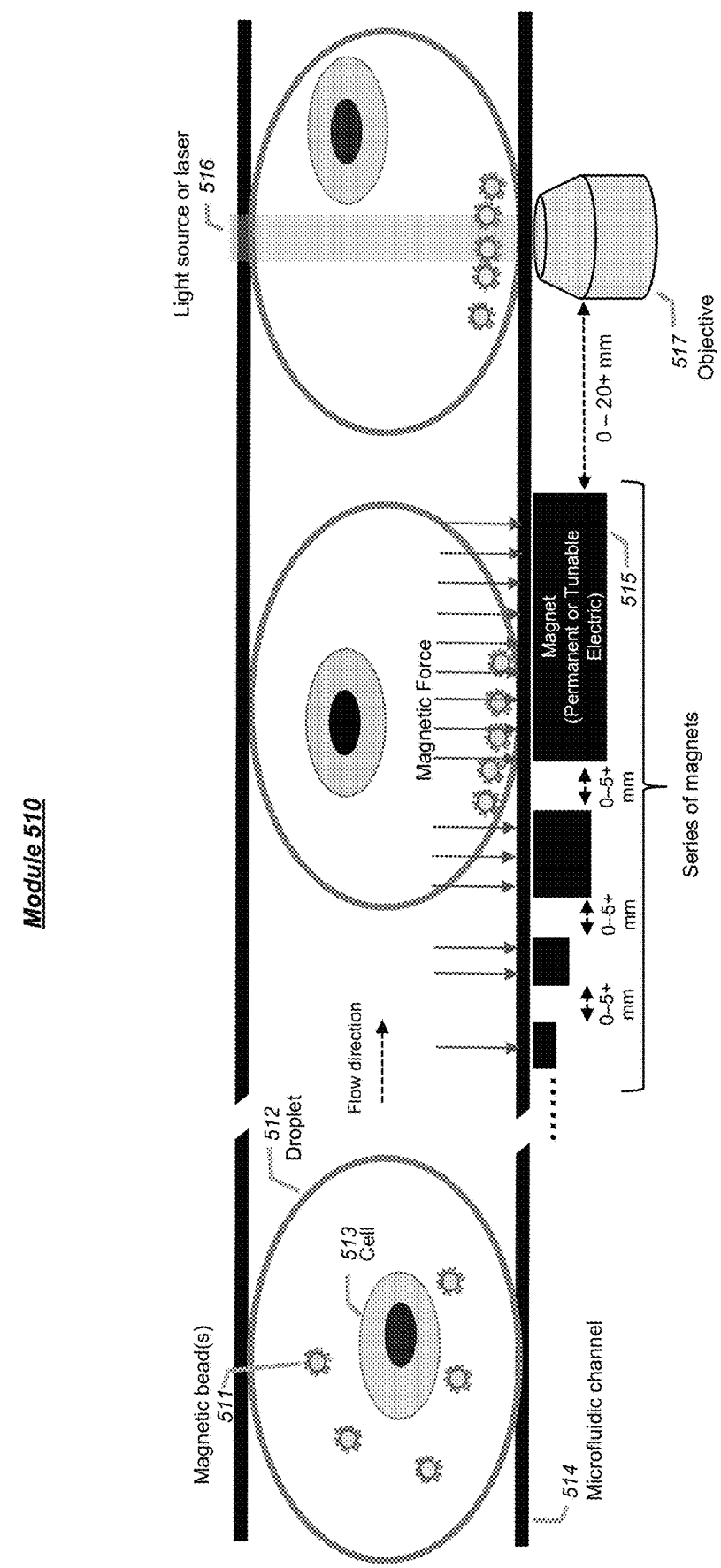

In the embodiment shown in FIG. 8B, an array of magnets 515 may be placed at a distance of about 0 mm to about 20 mm from a nearest downstream detection point. Magnetic forces generated by this array of magnets 515 may alter the path of magnetic particle(s) 511 inside the droplet 512 as they move toward magnet area in the microfluidic channel 514. This array design may be particularly useful for applications where there are multiple, larger, and/or high-density magnetic particles 511 inside droplets 512, which otherwise may lead to particles exiting the droplets if only one magnet is used. By optimizing the flow rate, magnetic forces, and/or array size, one should be able to concentrate magnetic particles (e.g., clustered) next to each other and near the detection side of the microfluidic channel 514 within the field of view of the objective, 517 which in turn may generate more homogeneous and strong signals.

Figure 8C:
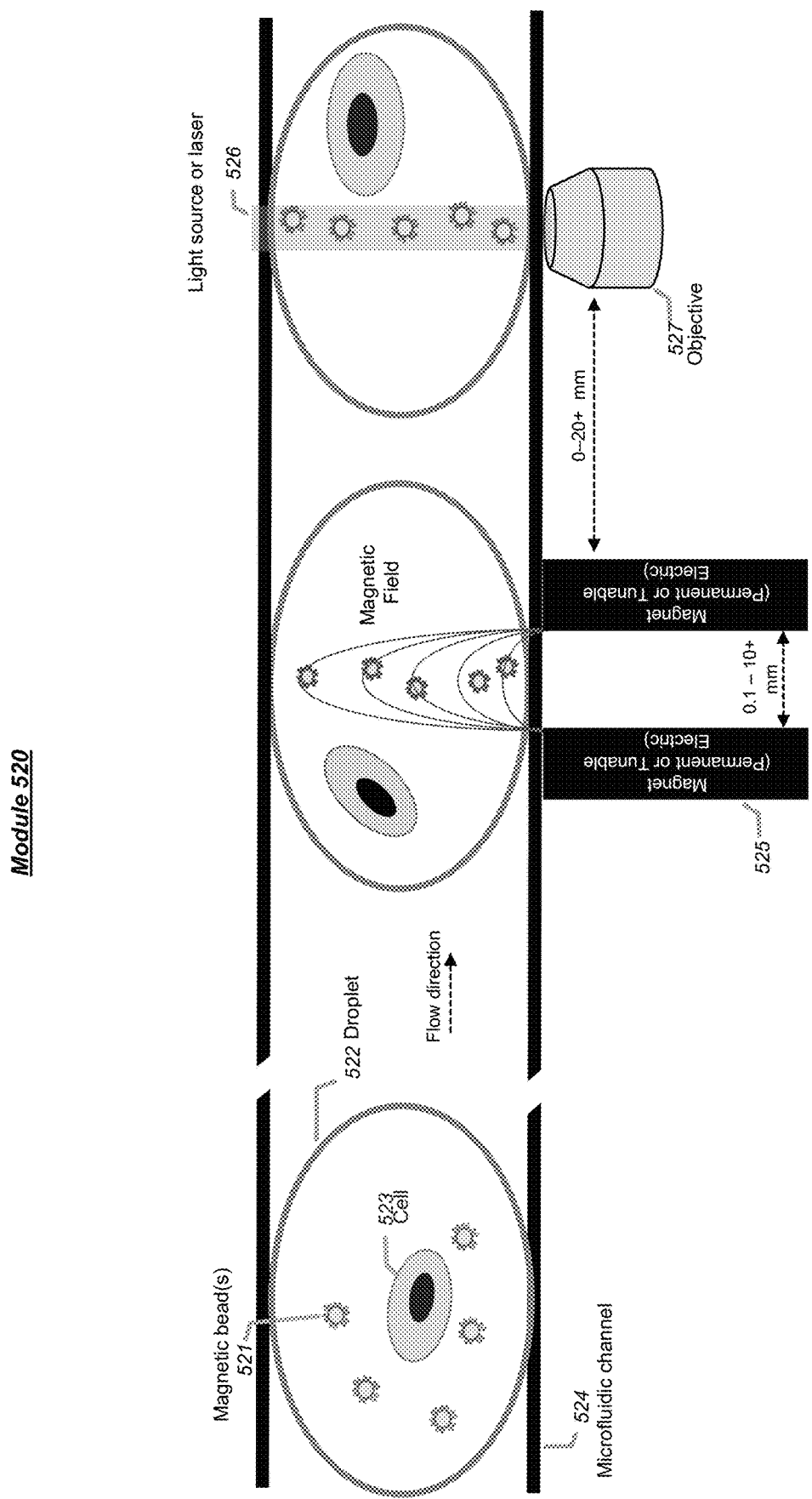

In yet another embodiment as shown in FIG. 8C, a pair of magnets 525 may be placed at a distance of about 0 mm to about 20 mm from a nearest downstream detection point. The gap between magnets may vary from about 0.1 to 10 mm. Magnetic forces generated by this pair of magnets 525 may gradually alter the path of the magnetic particle(s) 521 inside the droplet 522 as they move toward magnet area in the microfluidic channel 524. The magnetic field generated by pair of magnets may force particles 521 to position themselves next to each other, preferably in a line perpendicular to droplet flow and microfluidic channel 524. This design may be particularly useful for applications where for example an RF-(e.g., TAG) integrated objective is used for signal collection, in which particle alignment is in agreement with shape of the light source passing through droplet. By optimizing the flow rate and magnetic forces, one should be able to bring magnetic particles to well defined and linear positions to achieve maximum detection efficiency through objective 527 per given applications.

Figure 8D:
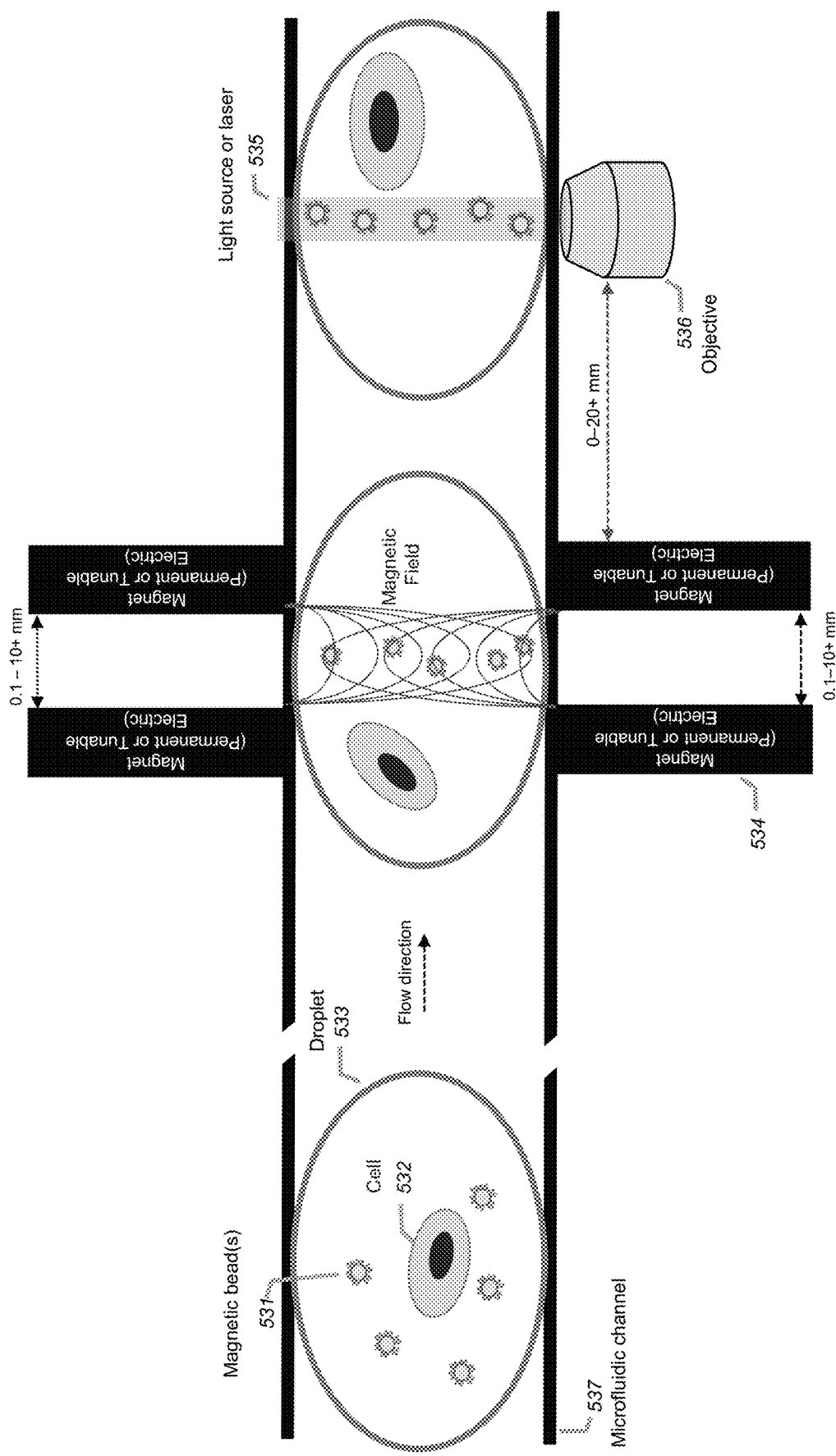

In yet another embodiment, as shown in FIG. 8D, two pairs of magnets 534 may be placed from two sides of microfluidic channel 537 at a minimum distance of about 0 mm to about 20 mm from a nearest downstream detection point. The gap between magnets may vary from about 0.1 to about 10 mm. Magnetic forces generated by these two pairs of magnets 534 may have more strength and uniformity across the microfluidic channel 537,537, thereby leading to more efficient alignment of magnetic particle(s) 531 inside the droplet 533 in a line perpendicular to the droplet flow in the microfluidic channel 537. This type of alignment may be useful for applications where, for example, an RF-(e.g., TAG) objective is used for signal collection, in which particles alignment is in agreement with shape of the light source passing through a droplet. By optimizing the flow rate and magnetic forces per defined application, one should be able to bring magnetic particles well defined and linear to get maximum detection efficiency through objective 536 per given applications.

Figure 8E:
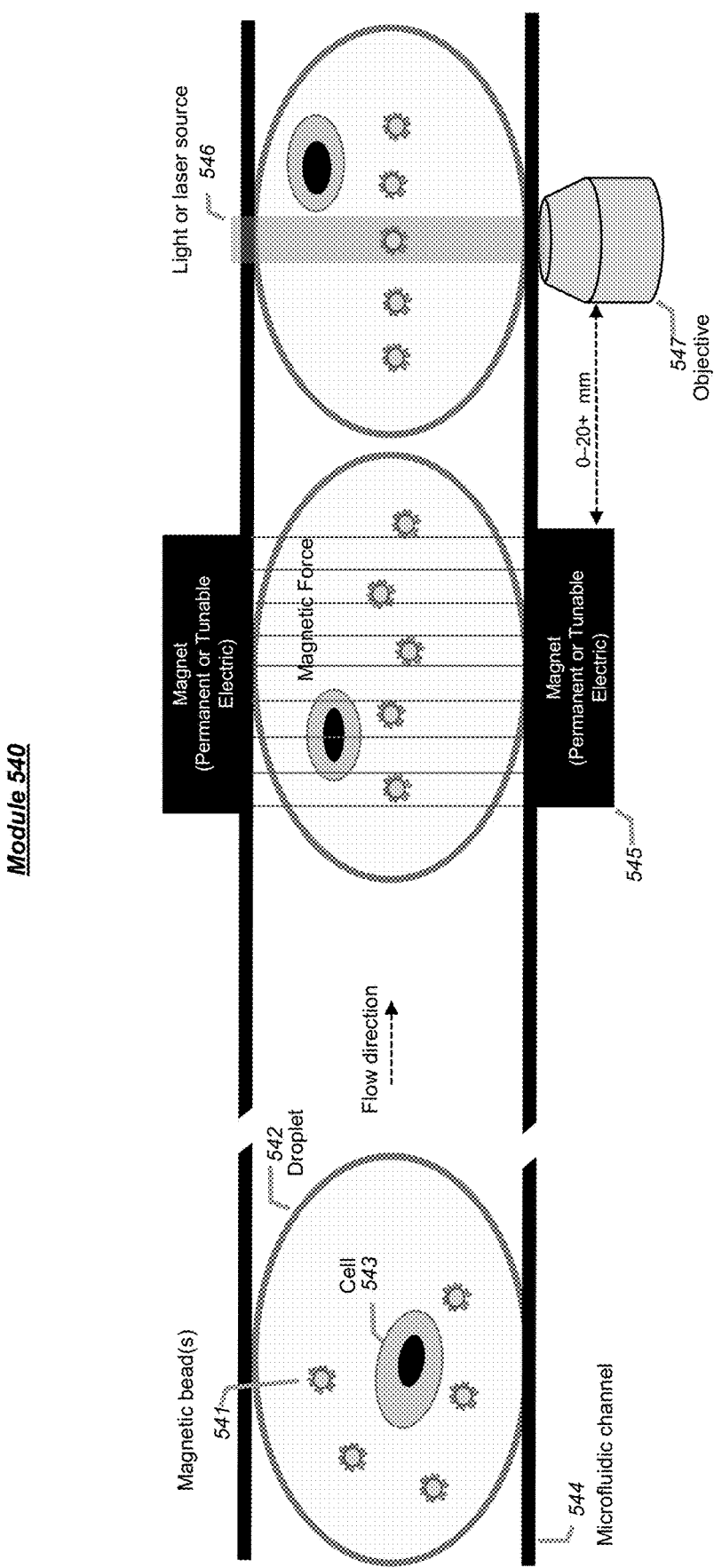

In some embodiments, as shown in FIG. 8E, two magnets 545 may be placed on the top and bottom sides of the microfluidic channel 544 at a distance of about 0 mm to about 20 mm from a nearest downstream detection point, one at each side of microfluidic channel 544. Magnetic forces generated by these magnets 545 may alter the path of magnetic particle(s) 541 inside the droplet 542 as they move toward magnet area in the microfluidic channel 544. By optimizing the flow rate and magnetic forces per defined application, one should be able to bring magnetic particles aligned in a linear shape at center of droplet 542 well in focus of the objective 547 for applications which require detailed analysis of fluorescent signals with minimum destruction from microchip or droplet interfaces.

Figure 8F:
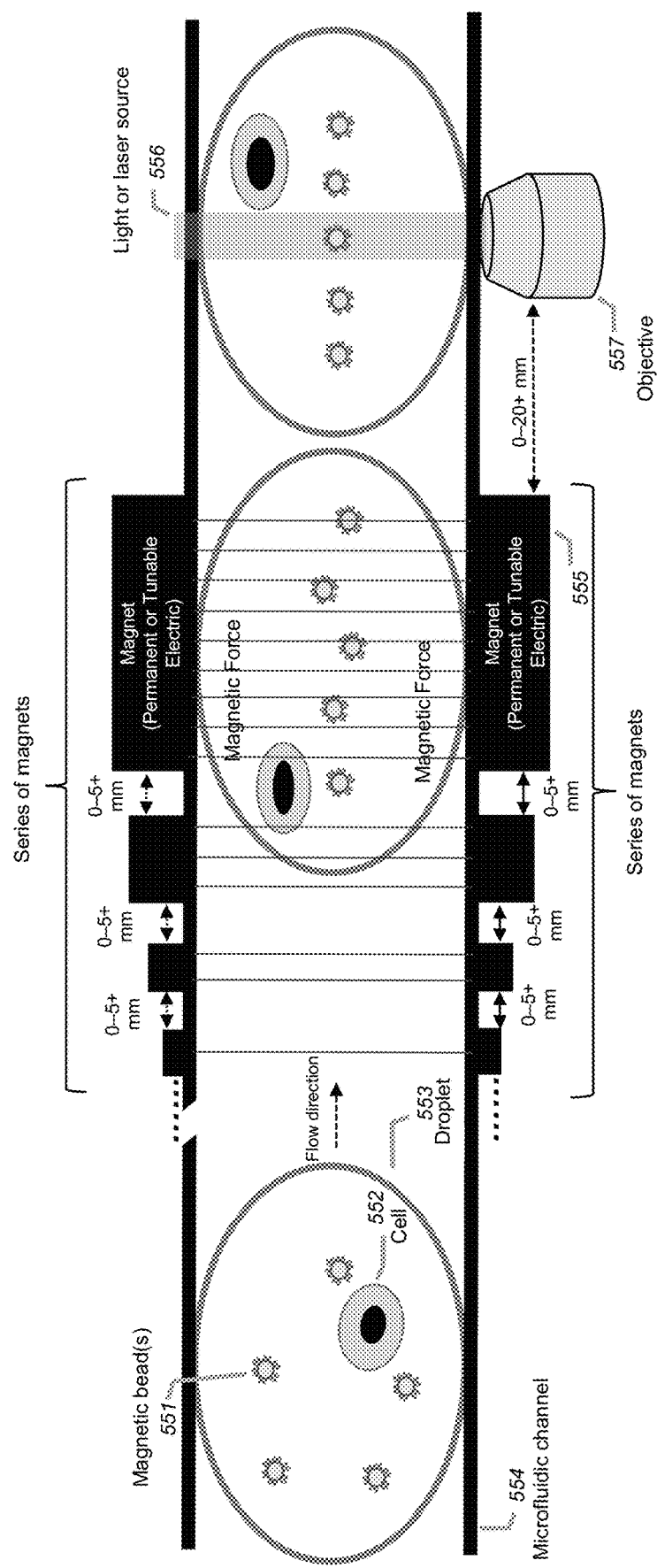

In yet another embodiment as shown in FIG. 8F, two arrays of magnets 555 are placed at a distance of about 0 mm to about 20 mm from a nearest downstream detection point, with one array at each side of microfluidic channel 554. Magnetic forces generated by these arrays of magnets 555 will alter the path of magnetic particles 551 inside a droplet 553 as they travel toward magnet area in the microfluidic channel 554. By optimizing the flow rate and magnetic forces per defined application, one should be able to gradually align the particles in a near-linear shape at the center of the droplet 553 where the particles will be in the focus of the objective 557 for applications which require detailed analysis of fluorescent signals with minimum destruction from microchip or droplet interfaces. This design may be preferable when dealing with a large number of particles or a varying number of high-density particles inside each droplet 553 in which the use of one magnet on each side may not provide enough force or uniformity to align particles at the nearest detection point.

It will be understood by one of ordinary skill in the art that any number, size, and/or configuration of magnets (or pairs or magnets or arrays of magnets) may be used as desired based on the teachings described herein. It should be noted that, in addition to magnetic particle-focusing methods, the concept of focusing intra-droplet particles can be achieved by using acoustophoresis methods. The acoustophoresis method for intra-droplet acoustic focusing can be based on the interaction of sound waves with intra-droplet entities (e.g., cells, particles) such that the positions of cells or particles inside a droplet can be confined to enable accurate detection by detectors (e.g., an optical detector). Such acoustophoresis methods may provide several advantages over other focusing methods (e.g., conventional hydrodynamic focusing method), the advantages include (1) the cells or particles may be label-free or metal-free, and (2) the acoustic operation conditions may be tuned to be gentle, contactless with and minimally harmful to cells.

In many applications with complex biological samples, the purity of sorted droplets may be critical, i.e., a minimal false positive rate among sorted droplets may be favored. In some applications, particularly those involving a long droplet-incubation period and those involving the usage of larger droplets (e.g., with a volume ≥500 µL), some droplets may become coalesced between one another (i.e., merged or fused) at a step before the droplets are sorted at a sorting junction, which can be caused by a variety of random or non-random factors such as mechanical stress, surfactant impurity, and electrical forces. The merged droplets may readily break into two or more "daughter" droplets of various sizes right at the bifurcation of a sorting channel, and one of the resulting daughter droplets may automatically enter the target droplet collection channel without any active sorting force, thereby generating false positive droplets in the target channel (these false positive events are considered "passive sorting"). In applications involving low abundance events in a complex sample, these passive sorting events may even outnumber the number of true positive. The resulting contamination from passive sorting may make the post-screening processes very tedious, inefficient, and/or costly. To eliminate or reduce passive sorting events while maintaining a high sorting rate, a second sorting point can be added to the same microfluidic chip downstream of a first sorting point. In some embodiments, two or more extra-steps of sorting may be used in a serial or tandem manner on the same microfluidic chip.

Figure 9:
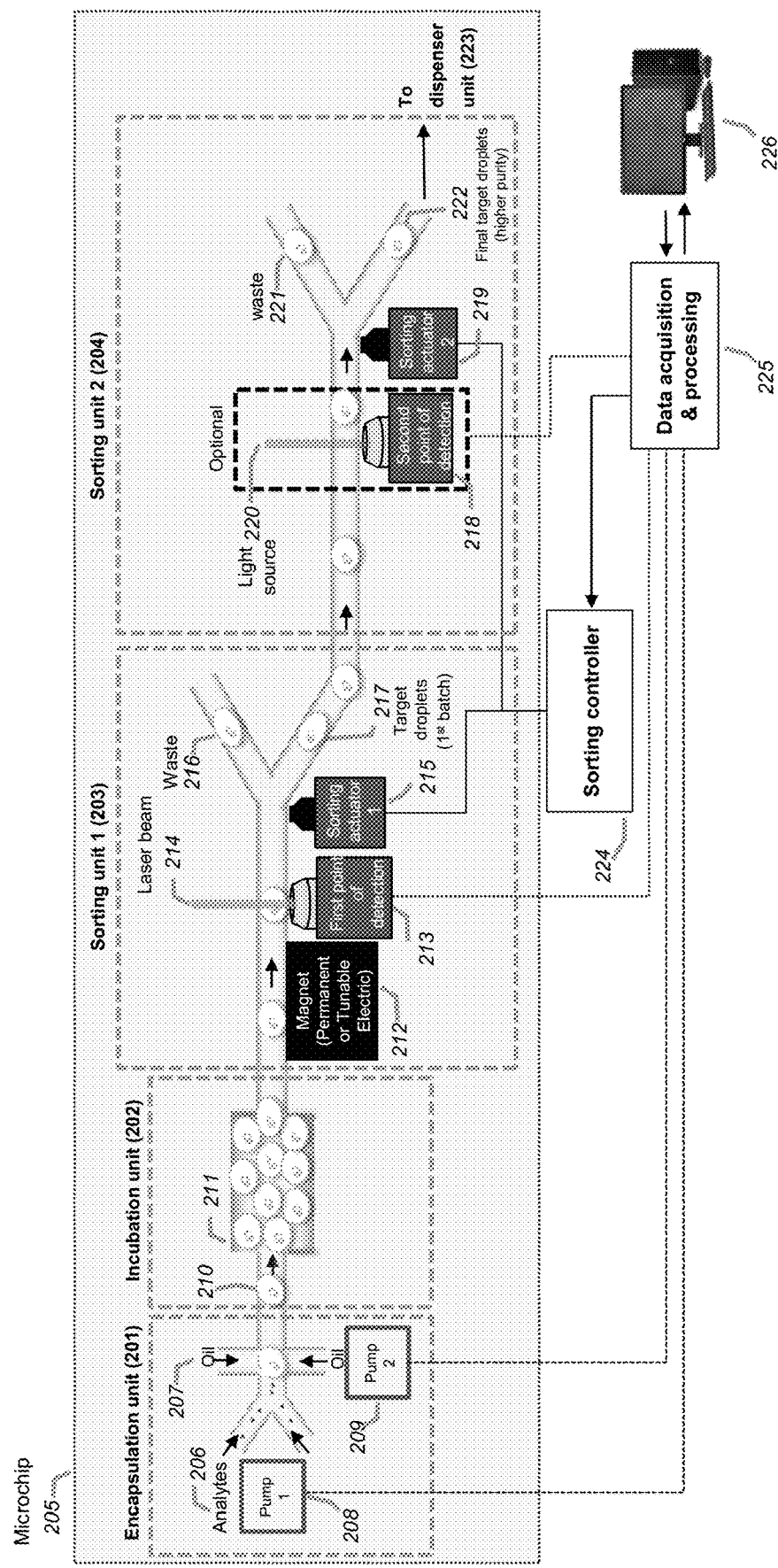
FIG. 9 shows a schematic of a system for performing a two-step serial sorting on a microfluidic device, in accordance with embodiments.

FIG. 9 shows a system 200 which may comprise an encapsulation unit 201, an incubation unit 202, and two downstream sorting units 203 and 204 while coupled in serial. The encapsulation unit, incubation unit, and sorting units may be substantially similar to those described herein. A dispensing unit 223 may optionally be disposed downstream of the second sorting unit 204, for example in cases where a single cell dispensing is desired. Similar to what has been described previously for system 100, one or more analytes 206 may be injected into a first inlet of a first channel of the microfluidic device 205 and the carrier oil 207 may be injected from the second inlet with one or more pumps 208 and 209. Cells and/or particles may be co-encapsulated into droplets 210. Droplets 210 may then be collected and incubated in an incubation chamber 211 for a predetermined period of time depending on a specific assay. After incubation, droplets 210 may be moved through the microchip for sorting. Optionally, cells/particles may be focused by a permanent or tunable electric magnet 212 as described herein for enhanced focusing before the first point of detection 213, which may use a single-color or multiple-color laser beams 214 in LIF detection. The detection signals may be sent to the data acquisition & processing unit 225 (also referred to herein as a processor) for data analysis. When a droplet is identified as positive, the data acquisition & processing unit 225 may deliver a trigger signal to the sorting controller 224 to activate a first sorting actuator 215 to redirect the droplet to a collection channel. For droplets that do not meet the criteria, no trigger signal will be sent and the sorting actuator 215 will remain off, allowing the fluidic pressure to drive the unwanted droplets into a waste channel 216.

The sorted droplets from a first sorting unit 203 are then guided to a second point of detection 218, which can be based on an optical or non-optical module. The second sorting actuator 219 can either be triggered by a time-delay based on the droplet traveling time (i.e., the time for a droplet to migrate from a first to a second point of detection), or directly through a sorting controller 224. The final target droplets 222 can be directed to an optional downstream dispensing unit 223 for further analysis.

Figure 10:
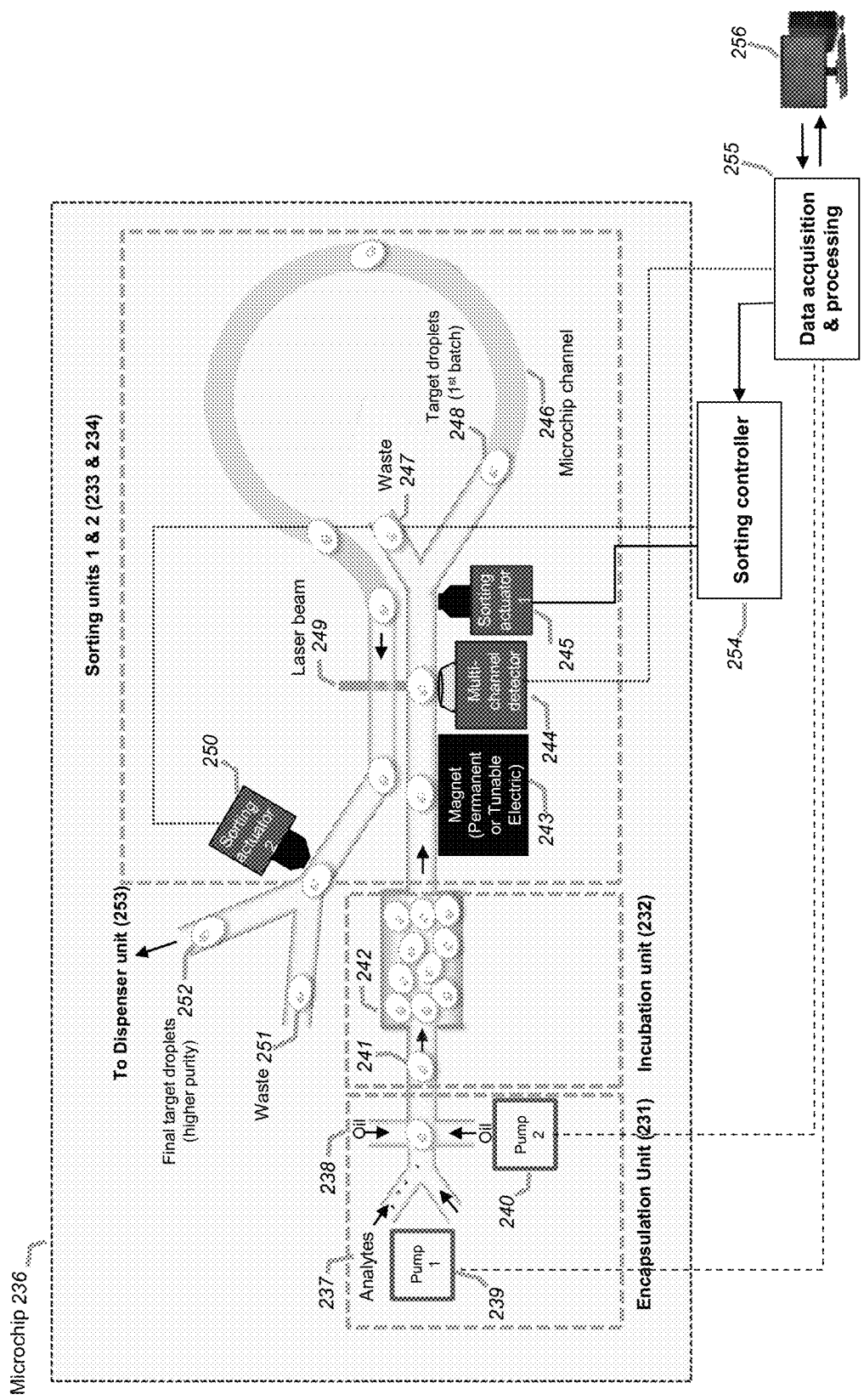
FIG. 10 shows a schematic of a system for serial sorting as shown in FIG. 9 while a parallel detection design is implemented using a detection module with two or more zones, in accordance with embodiments. A dispensing unit can be added as an optional downstream unit, in accordance with embodiments.

In another embodiment, the system 230 as shown in FIG. 10 may comprise an encapsulation unit 231, an incubation unit 232, two serial sorting units 233 and 234, and an optional dispensing unit 253. In the encapsulation unit 231, one or more analytes 237 are injected into one inlet and the carrier oil 238 is injected from the other inlet with pumps 239 and 240. Cells and/or particles are co-encapsulated into droplets 241 which are then collected and parked at an incubation Module 242 for a period of time determined by a specific assay. After incubation, droplets are driven to the first point of detection 244. Optionally, magnetic particles, when provided in the droplets, can be focused by a magnet unit 243 for optimal focusing before the first point of detection 244. Unlike the detection module setup described in FIG. 9, the first point of detection 244 is configured as a multi-channel detection module that also serves as a second point of detection at the downstream of channel direction. The same laser or light source 249 is used for both first and second points of detection, which share a same detection Module 244. The detection signals are sent to the data acquisition and processing unit 255 for data analysis. Upon detecting a target droplet by the detection Module 244, the acquisition and processing unit 255 will deliver a trigger signal to the sorting controller 254 to activate the first sorting actuator 245, directing the target droplet into a collection channel 248. The acquisition and processing unit 255 will ignore undesired droplets and the non-target droplets will enter a waste channel 247. To perform a serial sorting, the sorted droplets from sorting unit 1 (233) are guided to the second point of detection, which is comprised by the same multi-zone detector 244 with a single objective. This setup with a multi-zone single detector eliminates one extra separate detection point thus makes the device more compact. Subsequently, a second sorting actuator 250 can be triggered by a sorting controller 254. The final target droplet 252 can be directed to an optional downstream dispensing unit 253 for collection and further analysis. In some embodiments, the emission light in the detection Module 244 can be split into two downstream detectors (e.g. PMTs). In some embodiments, the emission light in the detection Module 244 is detected by a PMT with integrated multi-detection chips (i.e., multi-channel detector).

For applications involving the screening of millions of droplets, such as candidate screenings in the content of antibody discovery or synthetic biology, a screening device with high sample throughput is demanded to be able to complete the screening process within a reasonable time frame, typically on the order of a few hours. However, if the sample is screened by flowing it through a microfluidic channel, throughput, i.e., the flow rate is limited by friction as a laminar flow is preferred. In a brute force approach, the throughput can be increased by splitting the sample and running it through multiple microfluidic chambers on multiple particle detection/sorting devices in parallel. Yet, this approach is not affordable as operational and consumable costs multiply with the number of parallel runs. Therefore, it is highly desired to implement parallel processing in a more streamlined, single system design.

If optical detection is used for sample screening, the field of view available typically exceeds the channel width, e.g., 1 mm field of view with a 10×, NA 0.3 objective lens corresponds to a typical channel width of 0.1 mm. To take advantage of this difference, systems for simultaneous optical detection in two or multiple microfluidic channels with a single optical path may be designed as further illustrated herein (e.g., Module 600 shown in FIG. 11 or Module 700 shown in FIG. 16).

Figure 11:
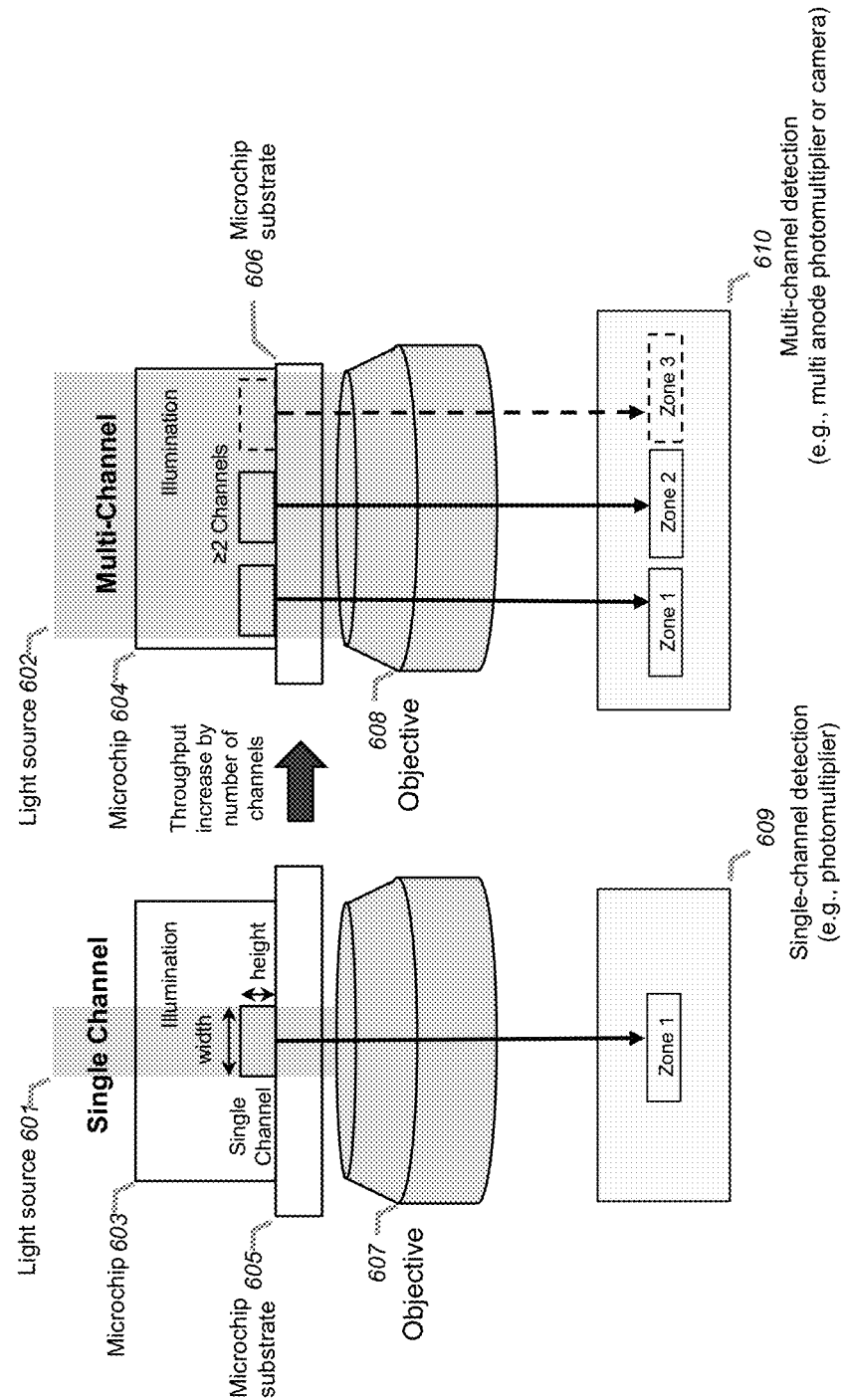
FIG. 11 illustrates an optical configuration with multi-channel detectors such as multi-anode photomultiplier tubes (PMTs) or a camera for simultaneous detection of droplets in two or more parallel microfluidic channels, like the one shown in FIG. 10, in accordance with embodiments.

With such an approach described in FIG. 11, the assay throughput can be massively increased (by about 2-20 times). This is highly relevant because fast sample screening not only reduces time and cost, but also increases the success of screening applications in part because shorter run times can reduce the incidence of droplet coalesce and meanwhile improve intra-droplet cell viability.

For example, in antibody discovery it is common to have only a small number of cells within the entire starting sample to produce an antibody of interest (e.g., <100 positive cells in millions of starting cells). Therefore, it is favorable to process a large sample size within a short period of time (a few hours or less). To ensure successful isolation of positive droplets with reasonable cost and efficiency, the following criteria must be met:
 1. High sample flow rate without subjecting the droplets and cells to unnecessary mechanical stress that could compromise sample integrity;
 2. Sample screening within a single device in order to keep cost and complexity as low as possible.

Figure 16:
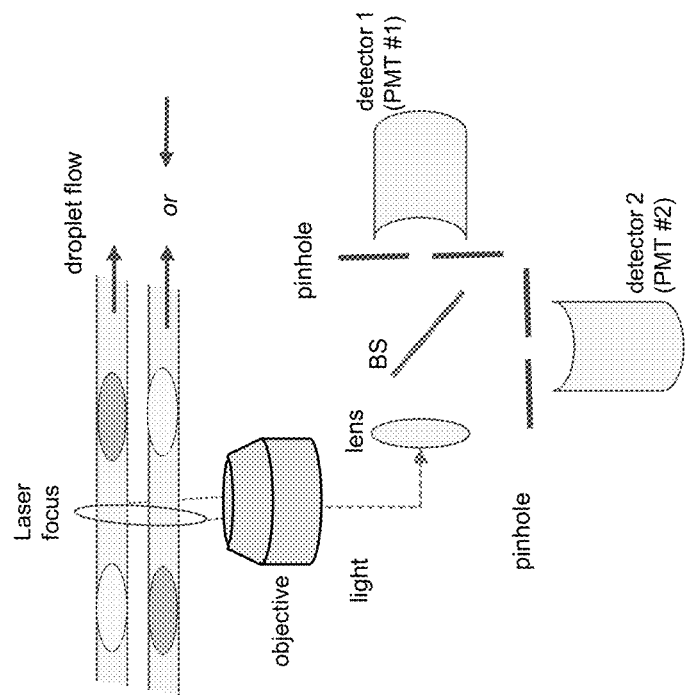
FIG. 16 shows a schematic of an optical configuration for multi-point detection where the first and second points of detection are integrated into a single field of view and the emission light is split and sent to two downstream detectors, respectively, in accordance with embodiments.

To meet these requirements on a proposed cell sorting and dispensing system such as the one illustrated in FIG. 10, multiple microfluidic channels can be arranged in parallel on a same chip for simultaneous optical detection within a single field of view. As shown in FIG. 11, Module 600 enables us to detect optical signals from multiple microfluidic channels at the same time. FIG. 16 shows an optical configuration including a beam splitter which similarly enables parallel detection of optical signals from multiple microfluidic channels at the same time.

In some embodiments, as exemplified in FIG. 11, the system 230 may comprise a multi-point detection module 600 configured to detect optical signals from two or more channels arranged in parallel (e.g., as described in FIG. 10). The module on the left side of FIG. 11 shows an exemplary single-point detection set up with a single channel (as may be used in any of the systems described herein without parallel detection). In contrast, the module on the right side of FIG. 11 shows a multi-point detection set up with two or more parallel channels disposed on/in a microchip substrate 606 of a microchip 604. The parallel channels may be illuminated by a light source 602 and signals from the channels may be directed onto a multi-channel detection unit 610 (e.g., a multi-anode photomultiplier or camera) by a single objective 608.

In some aspects, signals collected from a point of detection in any one of the disclosed systems may provide informative details for each target droplet, such as cell (or particle) number and size, cell viability, spatial distribution of fluorescent intensity, ratios of fluorescent signals, and other assay readout parameters. While only a small portion of the detailed information is briefly used as real-time sorting criteria due to time constraint between a detection time point and the following sorting actuation upon a positive event, a significant portion of the collected information are not utilized.

In some embodiments, a comprehensive data analysis can be performed post a sorting and dispensing process without the sorting-associated time-constraint. Such a post-processing data analysis may provide additional information about the sorted droplets to help prioritize the target list, for example, by using advanced signal-processing algorithms on the collected data from a point of detection. The ability to further profile or prioritize the sorted and dispensed droplets can be very useful for isolating low abundance events. On one hand, one may set "looser" criteria to recover as many targets as possible, which will increase the false positive rate. On the other hand, one may perform post-processing data analysis and establish additional criteria to effectively reduce or remove low-quality hits, while retaining the high-quality ones. Nonetheless, in order to enable effective post-processing data analyses for the target droplets, precise tracking and indexing of individual target droplets during the sorting and dispensing is critical. Such precise tracking and indexing feature can be achieved or improved by implementing new designs illustrated in the next few paragraphs.

Figure 12:
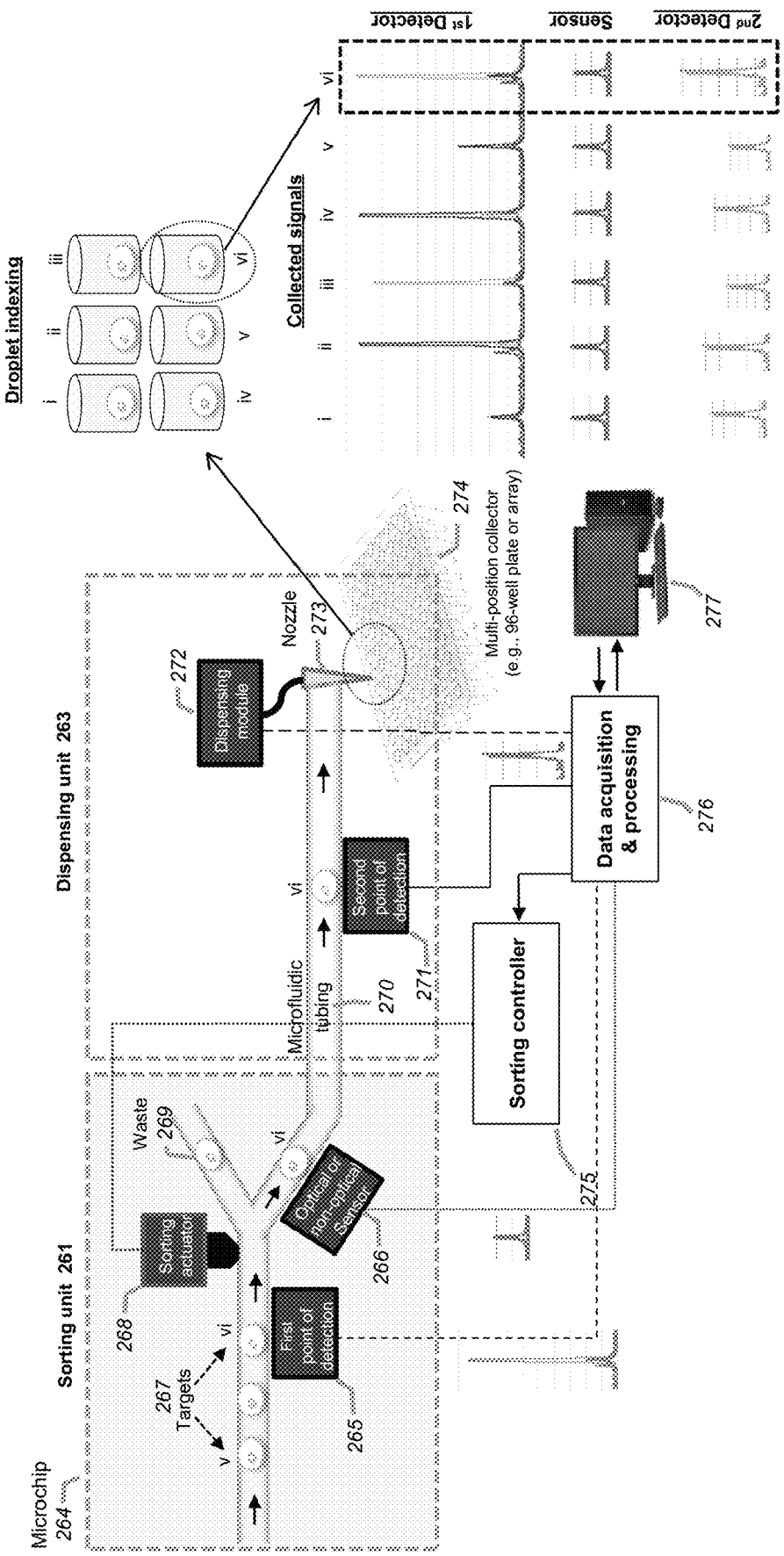
FIG. 12 shows a schematic of a system having multiple points of detection (e.g., two, three, or more) such as PMTs or cameras for droplet migration time determination and subsequent synchronization from droplet detection to dispensing, in accordance with embodiments. Each dispensed droplet may be tracked and indexed to match the signal data that are collected at one or more optical detection points, in accordance with embodiments.

In some embodiments as exemplified in FIG. 12, the system 260 not only comprises a first point of detection 265 and an optional second point of detection 271, but also at least one sensor 266 that is used to facilitate the target droplet tracking and indexing. The at least one sensor 266 will provide precise timing of any passing droplet. The precise timing can be effectively synchronized with the timing of detecting a target droplet at an upstream point of detection and the timing of a downstream dispensing of the target droplet. This synchronization control can be performed by a data acquisition and processing unit 276. In some embodiments, the synchronization control is further facilitated by measuring the flow rate of carrier fluid in a channel of a microfluidic chip. In some embodiments, an acceptable deviation from expected timing is established, such that any unexpected droplet that reaches a dispensing point will be simply ignored and not collected, as long as the droplet arrives at a timing that is beyond an established deviation threshold. In some embodiments, a deviation threshold is based on a statistical model. In some embodiments, a deviation threshold is set as at least one standard deviation of a normal distribution that reflects flow rate fluctuations.

In some embodiments as illustrated in the system 260 (FIG. 12), sorting criteria (i.e., the thresholds to determine a droplet as a target droplet) can be determined and set by a user at the beginning of each run based on factors such as signal peak height, area, shape, width and/or their position in reference to each other within a same droplet. Upon detecting a target droplet at a first point of detection 265, a data acquisition & processing unit 276 will control a sorting actuator 268 to redirect the target droplet into a target-collection channel to obtain a sorted droplet. Each target droplet detected at the first point of detection 265 is tracked and indexed by the data acquisition & processing unit 276, wherein the corresponding processed signal data is communicated to and recorded at computer 277. Meanwhile, the sorted target droplet will continue its motion to pass through a sensing area of sensor 266, in which the sensor 266 detects the presence of a passing target droplet, such presence or absence information will also be processed by the data acquisition & processing unit 276 to provide a precise timing control to synchronize an upstream sorting step and a downstream dispensing step, as well as any optional point of detection before the eventual dispensing. Following the detection by the sensor, the target droplet will be driven through a microfluidic tubing (e.g., a capillary) 270, where an optional second point of detection 271 can be implemented with a similar or different laser beam(s) as the first point of detection; data collected at this step will be also processed by data acquisition & processing unit 276 and subsequently communicated to computer 277. The dispensing Module 272 is triggered in a synchronized manner based on the signal data collected from the earlier steps at 265, 266 and 271 per user defined settings, which is controlled by data acquisition & processing unit 276. At the end, a dispensed droplet can be matched with its corresponding data collected at the first point, and optionally the second point of detection for the dispensed droplet with the assistance of computer 277. The collected data can be analyzed to extract useful information for each dispensed droplet in a post-processing manner. This post-processing data-matching capability adds significant value to a screening application because it initiates a feedback loop between downstream analysis and screening criteria.

In some embodiments, the at least one sensor is implemented between an upstream point of sorting and a downstream point of dispensing. In some embodiments, the response of a sensor is used as complementary and extra droplet monitoring tool. The sorting and dispense events will mainly rely on threshold settings used on the first and second points of detection, in which it is intended to provide discriminative information on droplets, with a main focus in the encapsulated cells and/or particles.

In some embodiments, at least one sensor is positioned at a location after a point of sorting but before a point of dispensing along the flow direction of a microfluidic chip. In some embodiments, the at least one sensor is implemented at a position that is about 3 mm to about 100 mm downstream of a sorting point, or about 5 mm to about 400 mm before a dispensing nozzle of a dispensing point. In some embodiments, the at least one sensor is integrated into a microfluidic chip. In alternative embodiments, the at least one sensor is implemented along a microfluidic tubing that connects the microfluidic chip to a dispensing nozzle of a dispensing module. In further alternative embodiments, at least one sensor is implemented on a microfluidic chip and at least another one implemented along a microfluidic tubing that connects the microfluidic chip to a dispensing nozzle of a dispensing module.

In some embodiments, at least one sensor is an optical sensor. In some embodiments, at least one sensor is a non-optical sensor. In some embodiments, both an optical sensor and a non-optical sensor is used. Exemplary non-optical sensors are sensors based on impedance, capacitance, conductivity, microwave, and/or acoustic wave. Examples optical sensors include those that are based on transmission or reflection.

Figure 13A:
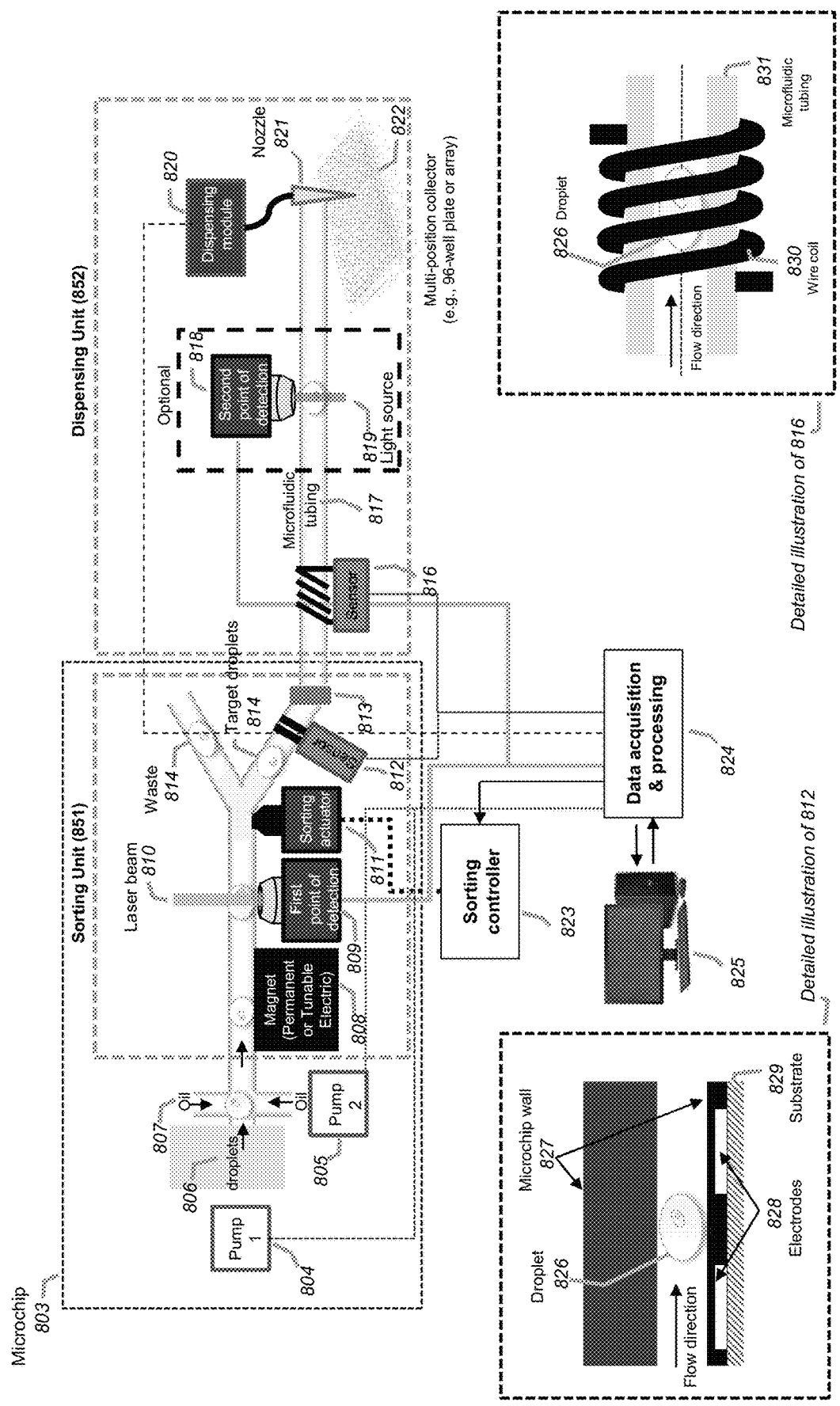
FIGS. 13A-13B shown exemplary design schematics of systems having one or more non-optical (FIG. 13A) and/or optical (FIG. 13B) sensors for more precise tracking of droplets during sorting and dispensing, in accordance with embodiments.
Figure 13B:
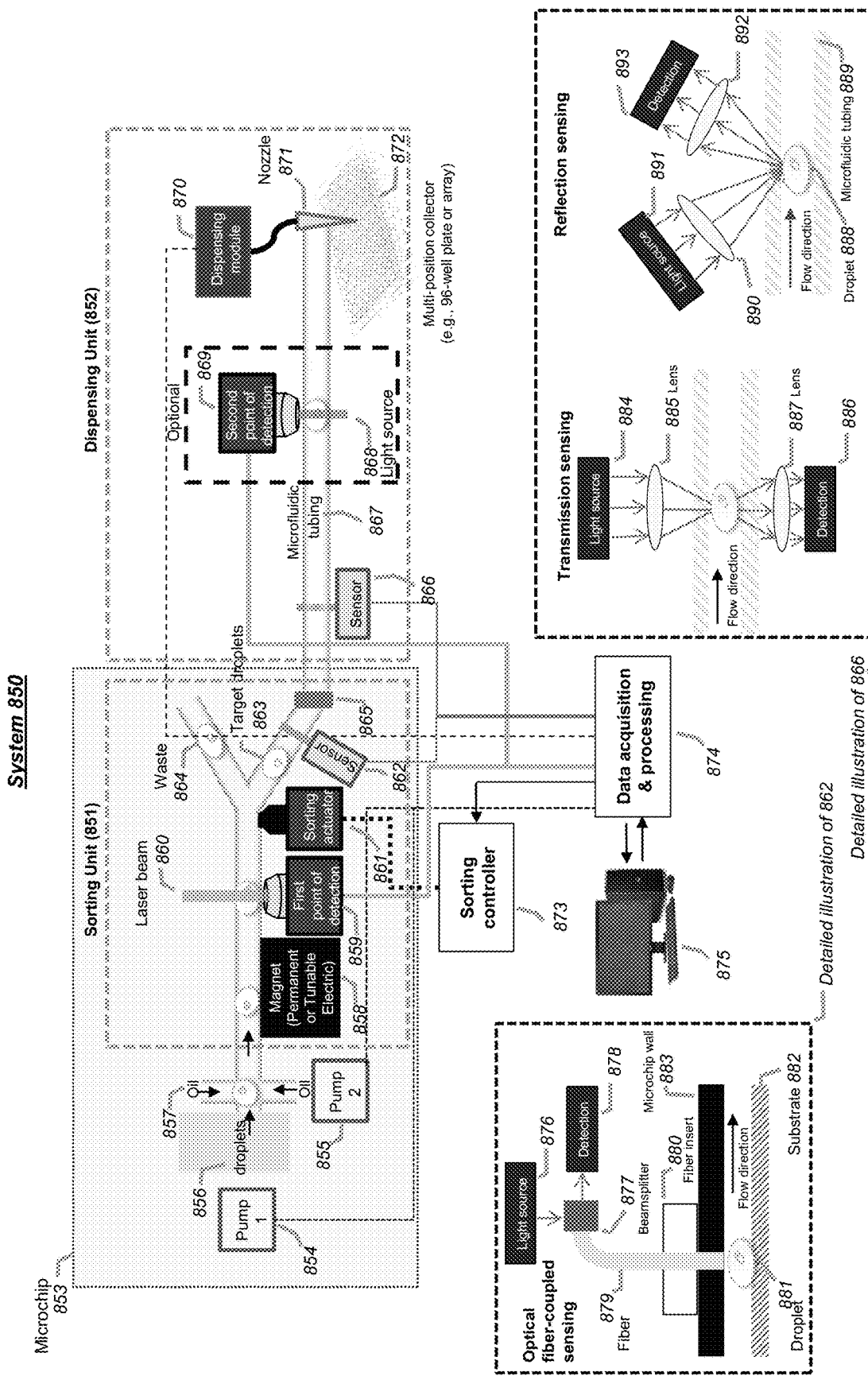

In one embodiment, as exemplified in FIG. 13A, two sensors are implemented in a system 800, wherein at least one of the two said sensors is a non-optical sensor. The at least one non-optical sensor is implemented on a microfluidic chip, on a microfluidic tubing (e.g., capillary), or both (FIG. 13B). In some embodiments, to be used on a device (e.g., microchip 803; FIG. 13A), a pair of conductive electrodes (828), which are made of, for example, Au, Ag, Cu, Ni or Pt with about 5 μm to 150 μm gap and width, are integrated into the microchip substrate (829). In some embodiments, the electrodes can be coated with a thin layer of microchip material, for example, PDMS, to minimize droplet flow interruption when the droplet passes a sensor's sensing area. In some embodiments, to be used on a microfluidic tubing (817) that connects a microfluidic chip to a dispensing nozzle of a dispensing module, a wire coil unit (830) around a stretch of the microfluidic tubing (e.g., capillary) is used as a sensor to sense a passing droplet (826) that travels from an upstream point of sorting to a downstream point of dispensing. The coil diameter, size, length and loop number of the wire coil-based sensor can vary. In some embodiments, the wire coil is made of one or more types of material selected from Ni, Cu, Fe, Ag, and Au.

In another embodiment, as exemplified in FIG. 13B, wherein at least one of the two said sensors is an optical sensor. The at least one optical sensor is implemented on a microfluidic chip, on a microfluidic tubing (e.g., capillary), or both (FIG. 13B). In some embodiments (e.g., Module 862, FIG. 13B), a beam of light generated by a light source (876) such as a laser or LED is delivered to the microchip channel through the use of a fiber (879). The beam reflected by a passing droplet will be collected through the same said fiber, 879, passed through a beamsplitter (877), and detected by a sensor component 878, which is connected with a data acquisition and processing unit (874) for synchronization control. In some embodiments, to use a sensor on a microfluidic tubing (867) side in a transmission sensing mode, a light source (884) and detection (886) will be positioned at two sides of the microfluidic tubing where the light beam generated by a laser or LED will pass through a lens (885), a moving droplet in the microfluidic tubing then a second lens (887) and collected by Module 886, which will be connected with data acquisition and processing unit (874). To use on the microfluidic tubing (867) side in a reflection sensing mode, a light source (891) and a detection (893) will be positioned at the same side of the microfluidic tubing where the light beam generated by a laser or LED will pass through a lens (890), a moving droplet in the microfluidic tubing then a second lens (892) at about 60 to 120 degree angle, and collected by 893, which is connected with a data acquisition and processing unit (874) for synchronization control.

In some embodiments, similar to the usage described previously for a non-optical sensor, at least one optical sensor is used to provide precise timing of any passing droplet; the precise timing can be effectively synchronized with the timing of detecting a droplet at an upstream point of detection and the timing of a downstream dispensing of a droplet. Such synchronization control can be performed by a data acquisition and processing unit (e.g., 874 in FIG. 13B). In some embodiments, the synchronization control is further facilitated by measuring the flow rate of carrier fluid in a channel of a microfluidic chip.

In general, a droplet sensor is implemented along a flow channel, at the downstream of a sorting junction and before the nozzle of a dispensing module. In some embodiments, at least one sensor is implemented at the downstream of a sorting junction and before a second point of detection. In some embodiments, at least one sensor is implemented at the downstream of a second point of detection but before the nozzle of a dispensing module. In general, the sequence of implementing at least one sensor and at least one second point of detection along a flow direction of a microfluidic device may be varied or different and shall not be considered as limited to the illustrations provided in the Figures.

In some embodiments, any of the systems disclosed herein (e.g., the ones illustrated in FIGS. 1-3, FIGS. 9-10, and FIGS. 12-13B) may comprise an optional "pico-injector" (or nano-injector) module. The pico-injector module may provide injection of a new type of sample and/or reagents from a side channel to a collection channel disposed between an upstream sorting junction and a downstream point of detection (e.g., between a first sorting junction and a downstream second point of detection); the side channel is provided with a flow rate ranging from about 0.5% to about 20% of that for the target droplets 117 in the collection channel. When a target droplet passes through the collection channel to arrive at the channel segment with a side-opening to the side channel, the new type of sample and/or assay reagents can be injected from the side channel by the pico-injector module; the injected sample and/or reagents may become merged with the passing target droplet, wherein the amount of sample and/or assay reagents and the injection speed may be controlled by the pico-injector module. The sample and/or reagents can be introduced by the pico-injector to the flow of the target droplets either in a droplet format or as a direct liquid stream. The sample and/reagents can be injected by a pressure pump or other pressure controllers. The pico-injector can be integrated with a microfluidic device (e.g., the microchip 105) after a first sorting junction, or integrated with a microfluidic tubing (e.g., the microfluidic tubing 119) at a position prior to the second point of detection (e.g., the second point of detection 121). If a sensor is also used (e.g., in a system shown in FIGS. 13A-13B), the junction of fluid delivery from pico-injector to a microfluidic channel may be implemented after the sensor's sensing area of the channel to ensure that the pico-injector mainly or exclusively provides fluid delivery (i.e., new sample and/or reagents) to sensed/counted target droplets. The "pico-injected" new sample and/or reagents may react with the existing entities of a target droplet, thereby providing new information about the target droplets. The provided new information may facilitate the decision-making at the dispensing module, and/or improve the overall assay efficiency and/or accuracy.

In yet another embodiment, any of the systems disclosed herein (e.g., the ones illustrated in FIGS. 1-3, FIGS. 9-10, and FIGS. 12-13B) may comprise an optional droplet trapping chamber or reservoir to trap, park or delay the flow of a batch of sorted target droplets post a sorting step but before a downstream point of detection or before a dispensing nozzle. For example, the sorted droplets 117 shown in FIG. 1 can be parked temporarily in a droplet trapping chamber; the trapping chamber can be integrated as a component of the same microchip 105, at a location downstream of a collection channel and upstream of the second point of detection 121. If a sensor is also used (e.g., in an exemplary system shown in FIGS. 13A-13B), the droplet trapping chamber may be disposed after the sensor but before a downstream dispensing nozzle. The trapping chamber may provide the sorted target droplets 117 a time period to settle and/or pause before the second point of detection and/or the dispensing nozzle, which in turn may result in more precise detection at the second point of detection and more accurate dispensing of the target droplets. Parking the target droplets before the second point of detection and/or the dispensing nozzle may also provide useful kinetic and assay information as extra criteria to select target droplets for final dispensing. The shape, geometry and dimension of a trapping chamber may vary; for example, the chamber can be made by enlarging the inner dimension of a collection channel, adding trapping pillars and well arrays on a microfluidic device (e.g., microchip 105), and/or increasing the length of a microfluidic tubing (e.g., using a coil of microfluidic tubing). The droplet trapping chamber can optionally operate at the conditions described for an incubation unit 102 shown in FIG. 1.

In some embodiments, any of the systems described herein (e.g., the systems illustrated in FIGS. 1-3, FIGS. 9-10, and FIGS. 12-13B) may comprise both a pico-injector (or nano-injector) module and a droplet trapping chamber. The pico-injector and the droplet trapping chamber may be disposed in different sequences along the flow direction of a microfluidic device with respect to one another, but both of them may be implemented downstream of a sorting junction and upstream of a second point of detection, wherein the said sorting junction is right after a first point of detection.

Figure 14:
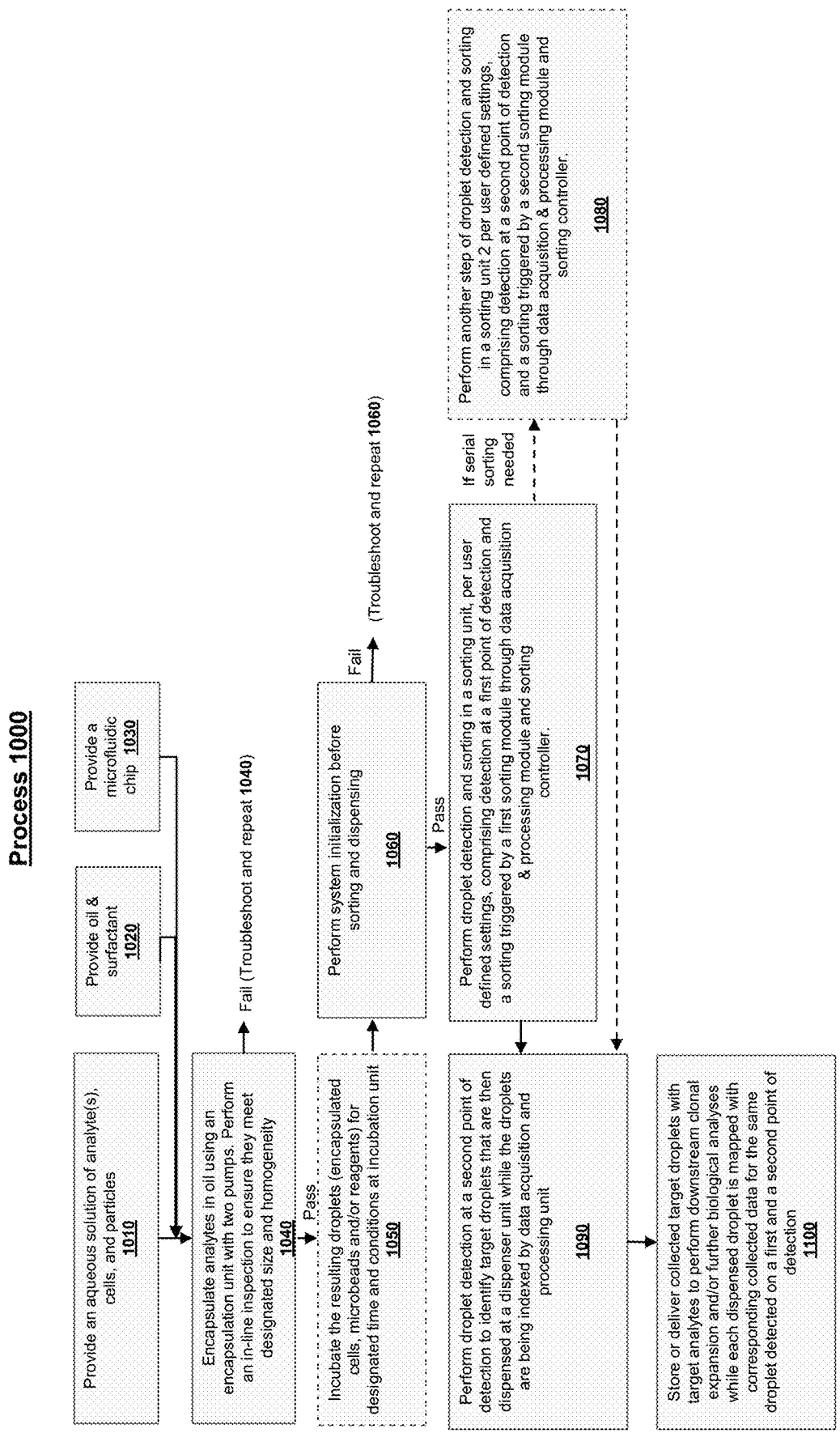
FIG. 14 shows a flow chart depicting a general exemplary workflow with processes to detect, sort, and dispense droplets by following one or more modules and concepts described herein, in accordance with embodiments.

Provided is an exemplary process used for implementing the systems, modules, and concepts presented in the current disclosure; this exemplary process is summarized in FIG. 14.

FIG. 14 illustrates an exemplary process 1000 in accordance with an implementation of the present disclosure. Process 1000 may represent an aspect of implementing the proposed concepts and schemes such as one or more of the various schemes, concepts and examples described above with respect to FIGS. 1-13B. More specifically, process 1000 may represent an aspect of the proposed concepts and schemes pertaining to sorting and dispensing single cells for different assay applications using a droplet based microfluidic system such as, but not limited, to systems 100, 150, 190, 200, 230, 260, 800, and 850 while the dispensed droplets will be indexed for precise tracking for downstream analyses.

Process 1000 may include one or more operations, actions, or functions as illustrated by one or more of blocks 1010 to 1100. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 14, or, alternatively in a different order. Furthermore, the blocks of process 1000 may be executed iteratively. Process 1000 may begin at blocks 1010, 1020, and 1030.

At blocks 1010 to 1040, process 1000 may involve introducing an aqueous solution of analytes for example, cells and/or particles (e.g., microbeads, nanoparticles) along with the biocompatible oil premixed with a surfactant, and injecting them into a microfluidic device using two precise pressure- or syringe-pumps. At 1040, a plurality of water-in-oil droplets that may include a plurality of cells and/or particles may be generated under a step called encapsulation or droplet generation. The "encapsulated" water-in-oil droplets may be inspected in-line immediately after the time point of generation for example, by using a high-speed camera to ensure they meet the requirement of size and homogeneity which may vary per assay applications. Failure to meet the required criteria may result in repeating step 1040 after re-inspection of system parts, consumables, sample, and reagents, and troubleshooting. When passed, process 1000 may proceed from block 1040 to 1050.

Block 1050 may be considered optional and, depending on the assay application, it may or may not be required. This step may be implemented as an extension part of the encapsulation chip, a separate microfluidic chip, or combined with the sorting microfluidic chip. In some embodiments, the 1050 step comprises one or more environmental control units, for example a temperature control unit, an oxygen control unit, a carbon dioxide control unit, and/or a humidity control unit. The incubation step may take several hours. After incubation, droplets are ready to be reinjected into a microchip for detection and sorting.

At block 1060, process 1000 may involve a quick system initialization in preparation for droplet sorting and dispensing. This may be done by collecting data from various units and modules on the system including but not limited, to pumps, lasers, detectors, sensors, data processing unit, controllers, electronics, etc. and may be performed automatically or manually. Failure to meet the required performance may result repeating the step 1060 after troubleshooting. When passed, process 1000 may proceed from 1060 to 1070.

At 1070, process 1000 may involve detection and sorting the selected droplets in the sorting unit per user defined settings. This may comprise detection at first point of detection where the signals will be sent to a data acquisition and processing unit for signal processing. Upon detecting a signal reflecting a positive droplet (i.e., "target droplet"), the acquisition and processing unit may deliver a trigger signal to a sorting controller which in turn enforces target droplets to migrate toward the collection channel while others will continue their movement per flow direction toward the waste channel.

In some embodiments, a remote focusing lens such as a TAG index lens with either a regular laser beam or non-diffracting laser beam may be used at this first point of detection to generate sufficient spatial resolution to distinguish small features such as a particle or a cell. In both said embodiments, a beam of light is passed through a cylindrical optical element focusing the light into the back aperture of the objective lens aimed at the sample, in this case delivered through a channel of a microchip.

In an alternative embodiment, by orienting the illumination/detection planes at about 45 degrees (about 60 to about 120 degrees may be used) with respect to the channel direction, we may overcome the limited focal depth when illuminating/detecting perpendicular to the channel allowing the of lenses of high NAs while maintaining isotropic detection efficiency independent of the channel height which in turn enable us to detect lower signals as well as to identify finer spatial features. In yet another embodiment, one or both objective(s) comprise remote focusing lenses.

In some embodiments, one, a pair, or array(s) of magnet(s) can be used before the first point of detection in combination with magnetic particles such as beads that are encapsulated together with a cell in a droplet. Magnets can be permanent, tunable electric or a combination of both, which can be made of different materials with various shapes, geometries, dimensions and powers. Also, magnetic particles such as but limited to, beads are widely available while also can be coated with functional groups. The magnet (s) may be used in various combinations as exemplified previously in FIGS. 8A-8F and may generate homogeneous and stronger signals when used close (i.e., from about 0 mm to 20+ mm) to a point of detection.

In yet another aspect, process 1000 may involve directing the sorted target droplets from 1070 to an optional second detection and sorting unit (i.e., serial sorting). This optional step 1080 may be critical for applications involving low abundance events in a complex sample with a high probability of getting passive sorting events when only one sorting unit is used (e.g., process 1070). In some embodiments, two or more extra-steps of sorting can be used in a serial or tandem manner on the same microfluidic chip. As described previously in FIGS. 9 and 10, step 1080 may comprise only one detector, two or more detectors, in which case it may also be utilized using a multi-channel detector to cover detection in both first and second steps of droplet detection in a serial sorting scheme.

The process 1000 may involve step 1090 after target droplets completed a single (1070) or serial (1080) sorting step. At 1090, the sorted target droplets are directed into a microfluidic tubing (e.g., capillary) through an adapter with an outer diameter ranging from about 0.1 to about 5 mm. The microfluidic tubing can be a capillary made of glass, polymers, or any other materials, pristine or coated, with an inner diameter preferentially from 0.05 to 0.15 mm. In some embodiments, a second point of detection is used to verify a sorted target droplet for precise triggering before dispensing and in some applications to provide additional information such as spatial fluorescence distribution from sorted droplets. Similar to the first point of detection, a laser or light source is used for the second point of detection while signal will be collected through an objective and detected by an optical detection, for example, a PMT. Similar to what is described above for the first point of detection, a magnet or an array of magnets and RF lenses with/without non-diffracting beams, either alone or in combination with a prism may also be used as options to enhance detection performance on this said second point of detection where required by any given assay. Additionally, in some embodiments, a sweeping deflector (as in FIG. 7A) or stroboscopic illumination (as in FIG. 7B) may be used as detection schemes to eliminate image blurriness and obtain high resolution images of targets moving though a microfluidic device at high speeds.

The detection signals from the second point of detection will also be sent to the data acquisition & processing for data analysis where a decision may be made on dispensing of target droplets based on analyzing all data received from both first and second points of detection, in comparison with the threshold values set by the operator per assay application. The sorting criteria can be based on various factors such as peak height, area, shape, width and/or their position in reference to each other within the same droplet based on signal received and collected via one, two, three, or more laser wavelengths. When a dispense requirement is met, the data acquisition and processing unit may trigger a dispensing unit while all collected data corresponding to each target droplet will be recorded by the computer for tracking and indexing of that said dispensed target droplet in each vial. The dispensing unit with a nozzle at the end of the capillary can be an x-y-z moving stage, or a rotating moving stage in which collect target droplets in a 96-well plate, 384-well plate, 1536-well plate or any other multi-well plates, PCR tubes, PCR strips, or any array of interest.

In some embodiments, the process 1000 may involve step 1100, the storage of collected target droplets (positive droplets) and delivering them to the associated labs for downstream analyses while at the same time each dispensed droplet will be escorted with the corresponding detection data at all points of detection along with the run log file.

In some embodiments, the process 1000 comprises using at least one sensor that serves to sense or count a moving droplet. At least one optical, non-optical, or a combination of both sensors, is implemented between an upstream point of sorting and a downstream point of dispensing to count a droplet passing through the sensor's sensing area in a non-discriminative manner as complimentary and extra droplet monitoring tool providing precise timing of any passing droplet. The precise timing can be effectively synchronized with the timing of detecting a droplet at an upstream point of detection and the timing of a downstream dispensing of a droplet. Such synchronization control can be performed by a data acquisition and processing unit which can be also facilitated by measuring the flow rate of carrier fluid in a channel of a microfluidic chip.

Although the steps above show a method 1000 of sorting and dispensing droplets using a microfluidic device in accordance with embodiments, a person of ordinary skill in the art will recognize many variations based on the teaching described herein. The steps may be completed in a different order. Steps may be added or deleted. Some of the steps may comprise sub-steps. Many of the steps may be repeated as often as necessary ensure detection, sorting, and dispensing of target droplets.

Figure 15:
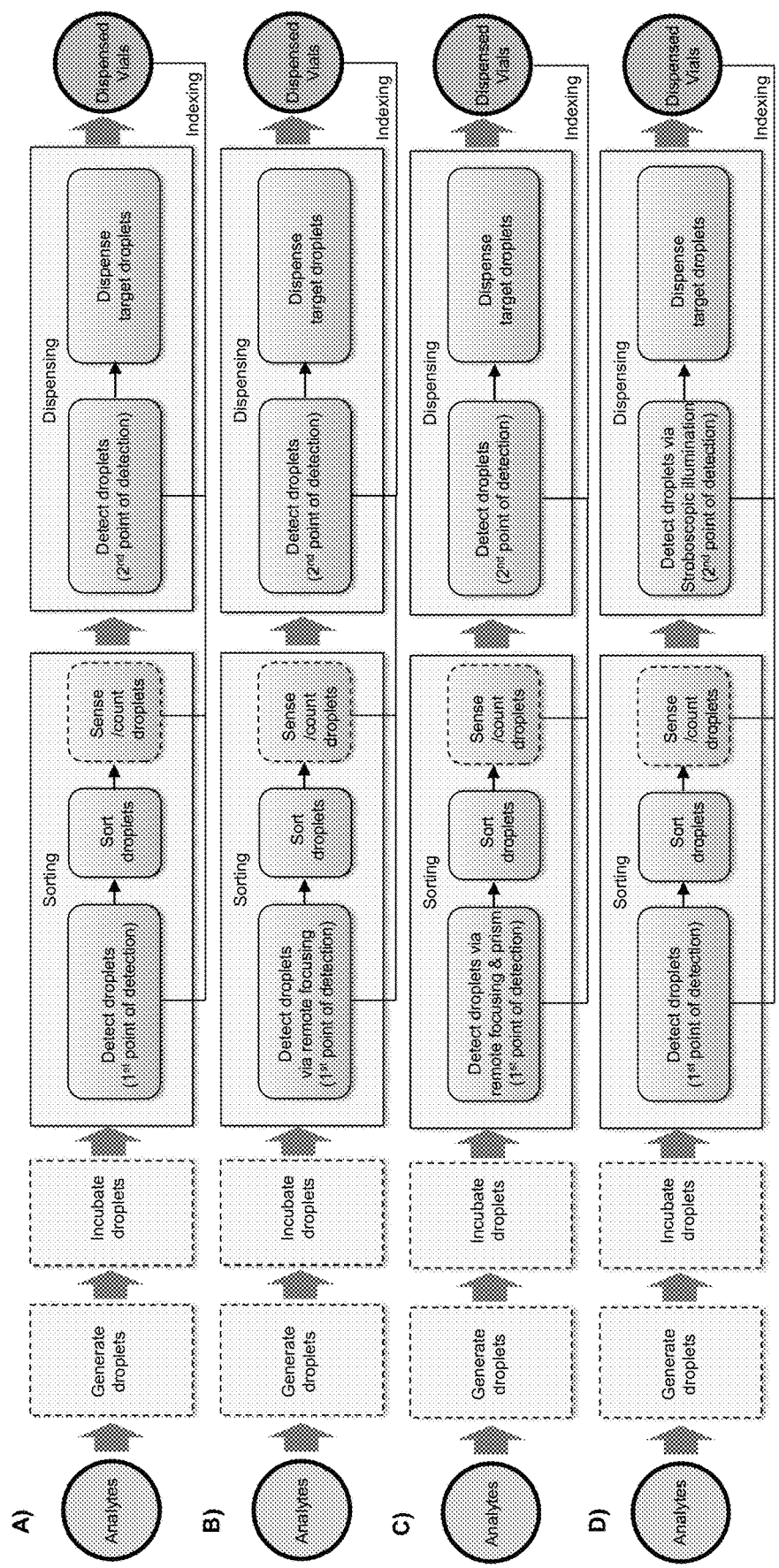
FIG. 15 shows various exemplary flow charts to methods for processing droplet sorting, dispensing, and indexing, in accordance with embodiments.

Provided are exemplary processes proposed for implementing the systems, modules and concepts presented in the current disclosure, such exemplary methods are summarized in FIG. 15.

FIG. 15 illustrates various exemplary approaches for implementing the systems, modules, and processes presented in the current disclosure in FIGS. 1-14. Provided herein is exemplary and FIG. 15 may include more schemes as shown in A to D. Although illustrated as discrete blocks, various blocks of each schemes of A to D may be extended and divided into additional blocks, combined into fewer blocks, or eliminated, depending on the desired implementation. Moreover, the blocks may be executed in the order shown in FIG. 15 or, alternatively in a different order, and also it may be executed iteratively.

In some embodiments, e.g., as shown in scheme A, the approach may comprise: generating droplets, incubating droplets, detecting droplets at a first point of detection on a microfluidic chip using a regular objective lens, sorting droplets per sorting criteria defined by the operator, counting droplets by using at least one non-discriminative optical or non-optical sensor, detecting droplets at a second point of detection on a microfluidic tubing such as a capillary, and finally dispensing droplets using for example an x-y-z dispensing module. The dispensed droplets in each vial may be delivered to end users for downstream and off-line analyses while accompanied by the corresponding data collected at the first and second points of detection, run log, as well as the supporting information from sensor(s).

In yet another embodiment, e.g., as shown in scheme B, the approach may comprise: generating droplets, incubating droplets, detecting droplets at first point of detection on a microfluidic chip using a remote focusing lens for example a TAG index lens, sorting droplets per sorting criteria defined by the operator, counting droplets by using at least one non-discriminate optical or non-optical sensor, detecting droplets at second point of detection on a microfluidic tubing such as a capillary, and finally dispensing droplets using for example an x-y-z dispensing module. The dispensed droplets in each vial may be delivered to end users for downstream and off-line analyses while accompanied by the corresponding data collected at first and second points of detection, run log, as well as the supporting information from sensor(s).

In yet another embodiment, e.g., as shown in scheme C, the approach may comprise: generating droplets, incubating droplets, detecting droplets at first point of detection on a microfluidic chip using a prism integrated with two objectives at about 45 degree at two corners while one or both can be a remote focusing lens for example a TAG index lens, sorting droplets per sorting criteria defined by the operator, counting droplets by using at least one non-discriminate optical or non-optical sensor, detecting droplets at second point of detection on a microfluidic tubing such as a capillary, and finally dispensing droplets using for example an x-y-z dispensing module. The dispensed droplets in each vial may be delivered to end users for downstream and off-line analyses while accompanied by the corresponding data collected at first and second points of detection, run log, as well as the supporting information from sensor(s).

In some embodiments, e.g., as shown in scheme D, the approach comprises: generating droplets, incubating droplets, detecting droplets at first point of detection on a microfluidic chip using a regular objective lens, sorting droplets per sorting criteria defined by the operator, counting droplets by using at least one non-discriminate optical or non-optical sensor, detecting droplets at second point of detection via sweeping deflector or stroboscopic illumination on a microfluidic tubing such as a capillary, and finally dispensing droplets using for example an x-y-z dispensing module. The dispensed droplets in each vial may be delivered to end users for downstream and off-line analyses while accompanied by the corresponding data collected at the first and second points of detection, run log, as well as the supporting information from sensor(s).

FIG. 16 shows a schematic of an optical configuration (Module 700) for multi-point detection where the first and second points of detection are integrated into a single field of view and the emission light is split and sent to two downstream detectors, respectively. The optical configuration shown in FIG. 16 may be implemented into system for parallel detection (e.g., system 230 illustrated in FIG. 10), e.g., as an alternative to the multi-point detection design illustrated in FIG. 11. The system 230 may comprise a multi-point detection module 600 configured to detect optical signals from two or more channels arranged in parallel (e.g., as described in FIG. 10). The first and second points of detection may be integrated/arranged along two parallel or anti-parallel segments of a microfluidic channel(s) under a single field of view as shown in FIG. 16. A single cylindrical laser beam (excitation light) can be provided to illuminate the field of view. Emission light may be collected and split by an optical element for detection by two downstream detectors (PMT 1 and PMT 2) that correspond to the emission light at the two points of detection, respectively. For example, emission light may be collected by a single objective, passed through a lens, then split by a beam splitter into a first beam and a second beam. The first beam may be directed through a pinhole to a first detector. The second beam may be directed through a pinhole to a second detector.

Figure 17:
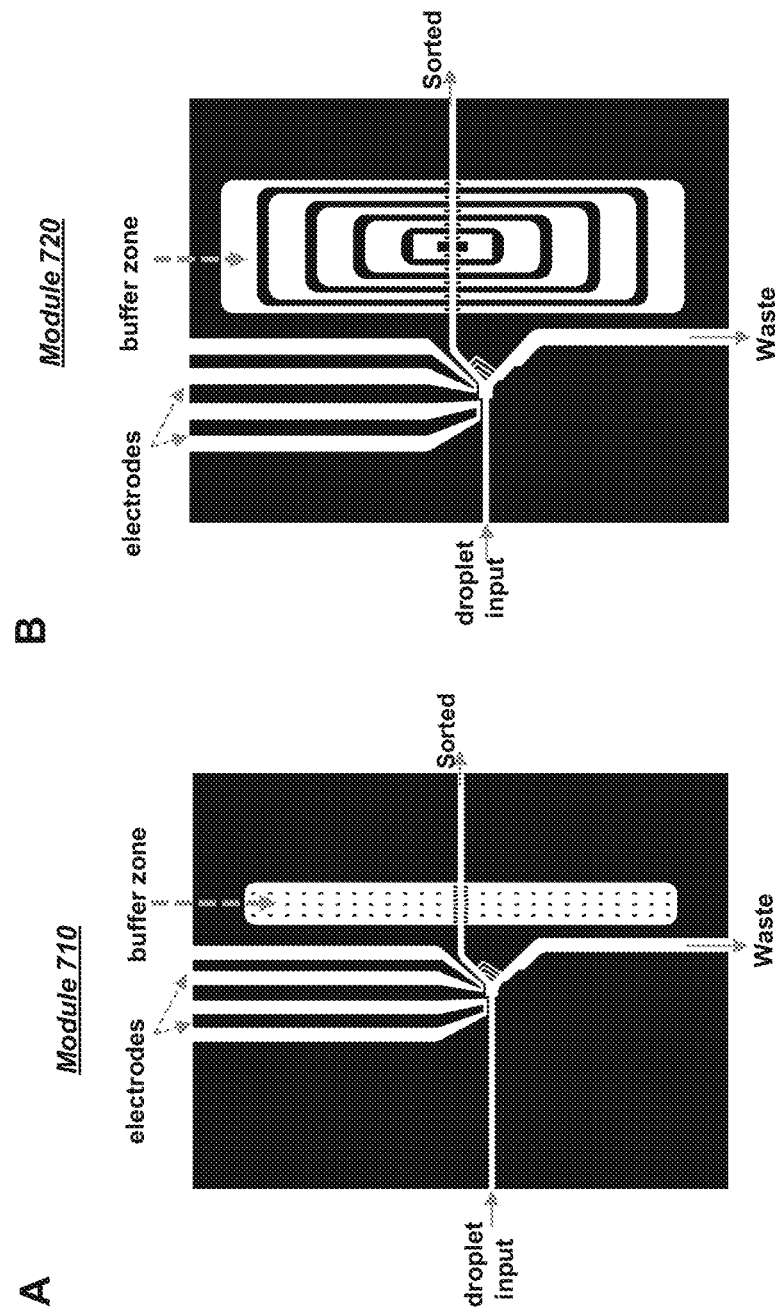
FIGS. 17A-17B show schematics of systems comprising a section with one or more bypass channels (i.e., "buffer zone") to reduce the speed of mobile droplets for imaging by using a camera, in accordance with embodiments.

FIGS. 17A-17B show schematics of systems comprising a section with one or more bypass channels (i.e., "buffer zones") to reduce the speed of mobile droplets for higher resolution imaging by using a camera or a camera-like detector. Any of the systems described herein may comprise a buffer zone to slow the droplets during imaging. For example, the system can comprise a widened sorting channel (e.g., buffer zone) to slow the droplet flow as shown in FIG. 17A. In some embodiments, a serial or an array of pillars may be provided at the widened channel interface to constrain the droplets moving along the sorting channel. In some embodiments, the buffer zone may be provided with one or more bypass channels (e.g., side pores or side channels) downstream of the sorting junction to reduce the speed of the traveling droplets as shown in FIG. 17B. Fluid in the main fluidic channel can partially enter the bypass channels to effectively reduce the movement speed of droplets, thereby reducing the motion blur during droplet imaging as part of a point of detection. In some embodiments, one or two arrays of pillars may be provided at the interface between the main fluidic channel and the bypass channels to constrain the traveling droplets moving along the main fluidic channel. Droplets with reduced speed in the buffer zone can be imaged multiple times using a camera or a camera-like detector, as part of a point of detection. Repetitive short illumination may be used to further reduce motion blur.

Figure 18:
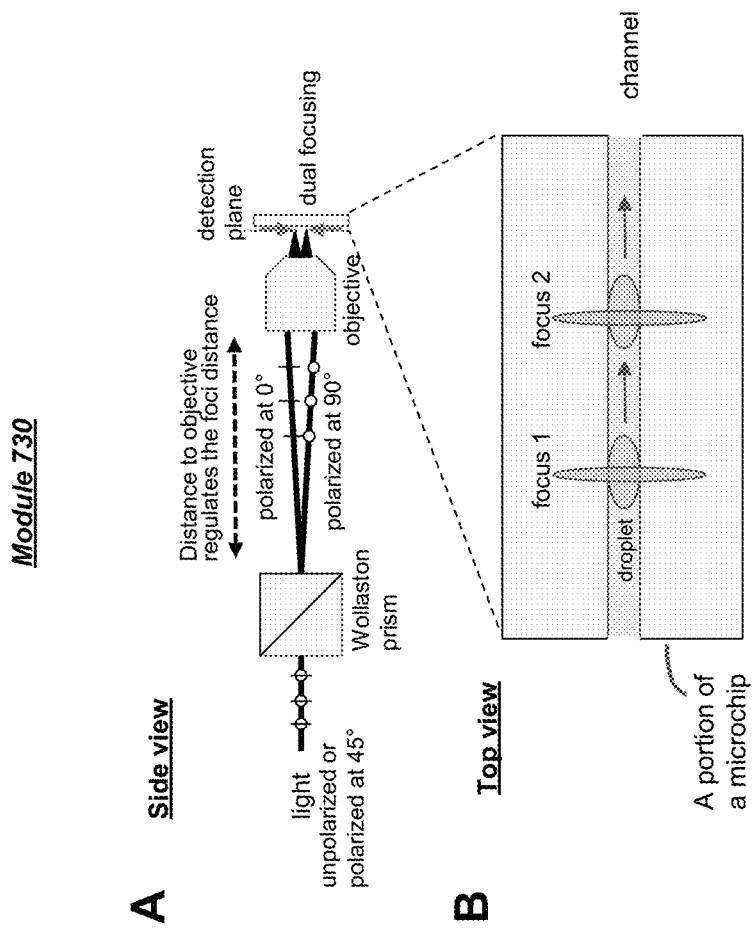
FIG. 18 shows a schematic of an exemplary optical detector with a dual focusing feature, as part of a point of detection, in accordance with embodiments.

FIG. 18 shows a schematic of an exemplary optical detector with a dual focusing feature (Module 730), as part of a point of detection. Any of the systems described herein may comprise a dual focusing feature. For high-throughput droplet detection and sorting applications, intra-droplet objects (e.g., cells and/or beads) may move within the droplets passing a detector or sensor and the relative position of these objects to the optic focal plane at a point of detection can be random. This may result in poor focusing (i.e., poor signal/noise ratios) and reduced detection efficiency. Dual focusing may provide improved detection efficiency of intra-droplet moving objects at a point of detection. As illustrated in FIG. 18, an optical element can be provided to modulate an excitation laser and achieve dual focusing at a point of detection. The optical element may focus on two locations (focus 1 and focus 2) at two timepoints (timepoint 1 and timepoint 2, respectively) of a traveling droplet inside a fluidic channel on a device. The optical element may split a single laser beam into a first beam and a second beam and then direct the first and second beams to the point of detection to provide dual focusing along the fluidic flow direction. Each droplet can travel through two foci that are closely positioned one after another along the droplet flow direction, thereby improving the probability that at least one focus can yield optical signals representing intra-droplet objects with improved signal-versus-noise profile. The distance between the two foci can be tuned by adjusting the distance between the objective and the optical device. In some embodiments, the optical element of the beam splitter may comprise a fiber optical splitter that can split light into two outgoing laser beams. In some embodiments, as shown in FIG. 18, the optical element of the beam splitter may comprise a birefringent polarizer such as a Wollaston prism, which can split light into two linearly polarized outgoing laser beams with orthogonal or near orthogonal polarization. To achieve dual focusing, line-shaped laser illumination for a single segment of a microfluidic channel can be provided through splitting the light with a Wollaston prism. The light may be unpolarized or polarized at a 45-degree angle before splitting. The distance between the Wollaston prism and the objective can be tuned to modify the distance between focus-1 and focus-2. Both the side view schematic (FIG. 18A) and a portion of a top view schematic (FIG. 18B) of the optical element are shown.

Additional exemplary embodiments will be further described with reference to the following examples; however, these exemplary embodiments are not limited to such examples.

Examples

Example 1: Implementation of an Advanced Optical Configuration with a 45-Degree-Angle Excitation and Emission Through a Prism, as Part of a Point of Detection FIGS. 19A-19D shows an exemplary implementation of an advanced optical configuration as part of a point of detection. The excitation/emission light was provided either at an about 45-degree angle relative to a microfluidic channel's direction, using two objectives positioned perpendicularly to each other at two corners of a prism (FIGS. 19A and 19C), or provided at a conventional 90-degree angle (FIGS. 19B and 19D). The implementation of a 45-degree versus a 90-degree angle are demonstrated in photographs of a section of a microfluidic device with an attached prism on top of the flow channel (FIG. 19A), or a device without the prism (FIG. 19B). Intra-droplet objects were fluorescent calibration beads of a diameter of about 6 μm and with FITC-fluorophores. The fluorescent signal from the beads was detected through a 535/50 nm band pass filter by using a PMT and was output as a voltage amplitude. Example histogram profiles of signal amplitude of detected intra-droplet fluorescent signals are shown in FIGS. 19C and 19D, where the 45-degree excitation/emission angle (FIG. 19C) yielded a more homogenous signal size (signal standard deviation ~0.14 volt), in comparison to a conventional 90-degree angle (FIG. 19D; signal standard deviation ~0.37 volt).

Example 2: Implementation of a Point of Detection with Dual Focusing

FIGS. 20A-20B show an exemplary implementation of a dual focusing feature at a point of detection. Dual focusing-based detection can be done with a single PMT, for instance, at the first point of detection before a sorting junction. FIG. 20A is an example photograph of a field of view, where the focus positions are highlighted with dotted lines and the relative droplet flow is are shown. The photograph was a snapshot taken based on background scattering light. Line-shaped laser illumination of the same microfluidic channel was generated by splitting the illumination with a Wollaston prism, as described in FIG. 18. FIG. 20B shows an example profile of PMT signals which were detected using a circular 200-μm pinhole (light gray line) and with a 200-μm-wide, 1-mm-long slit (dark gray line), respectively. With the long slit, signals for both focus-1 and focus-2 were able to be picked up.

Figure 21A:
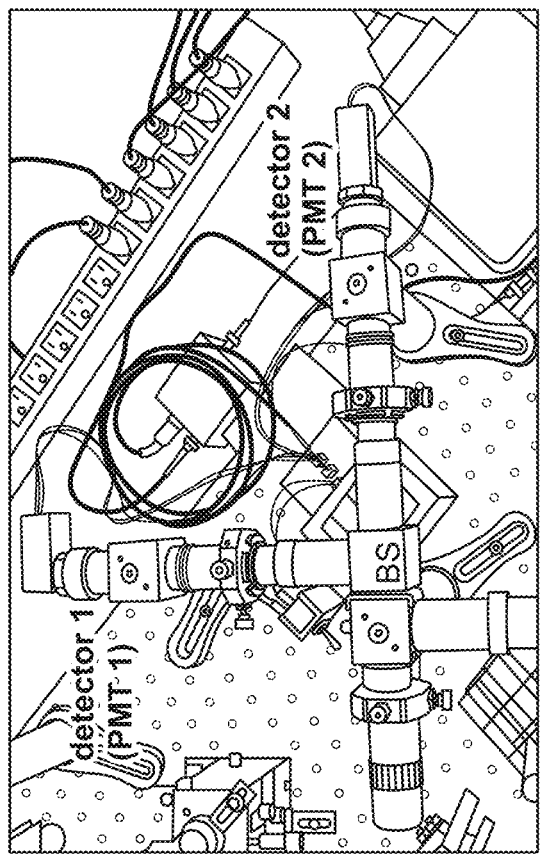
FIG. 21A shows an exemplary implementation of the design in FIG. 16 for a multi-point detection wherein the first and second points of detection are integrated into a single field of view, in accordance with embodiments.
Figure 21B:
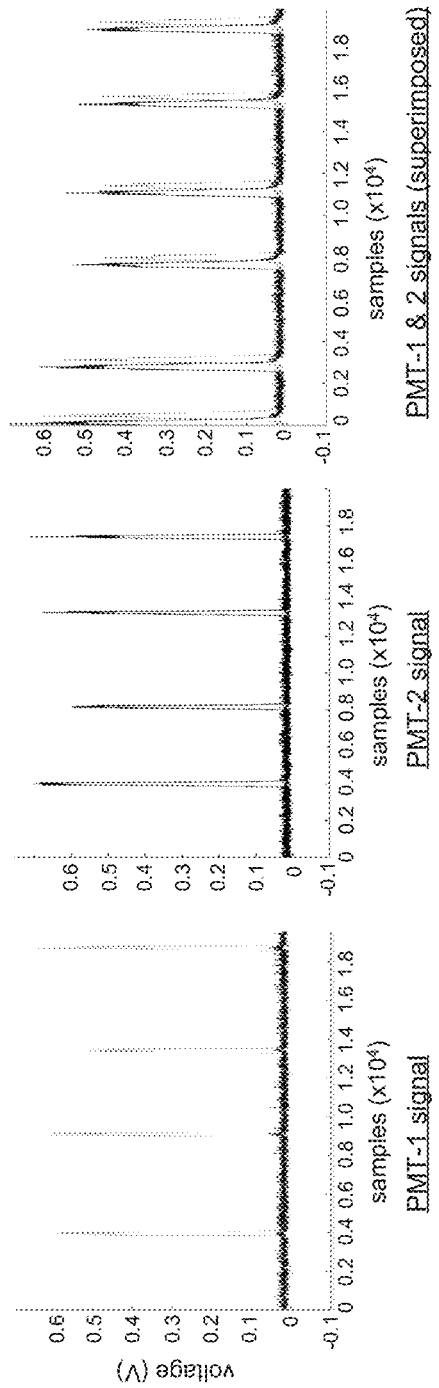
FIG. 21B shows exemplary signals detected using the system of FIG. 21A, in accordance with embodiments.

Example 3: Implementation of Multi-Point Detection with Integrated $1^{st}$ Point and $2^{nd}$ Point of Detection Under a Single Field of View Shown in FIG. 21A is a snapshot of an optic assembly implemented based on the multi-point detection schematics shown in FIG. 16. The first and second points of detection were integrated/arranged along two parallel or anti-parallel segments of a microfluidic channel(s) under a single field of view. A single cylindrical laser beam (excitation light) was provided to illuminate the field of view, but the emission light was split into two downstream detectors (PMT 1 and PMT 2) that correspond to the emission light from the two points of detection. FIG. 21B are example profiles of detected droplets' signals that were detected using the foregoing optic assembly.

Example 4: Droplet Imaging at a Point of Detection Inside a Buffer Zone

Figure 22:
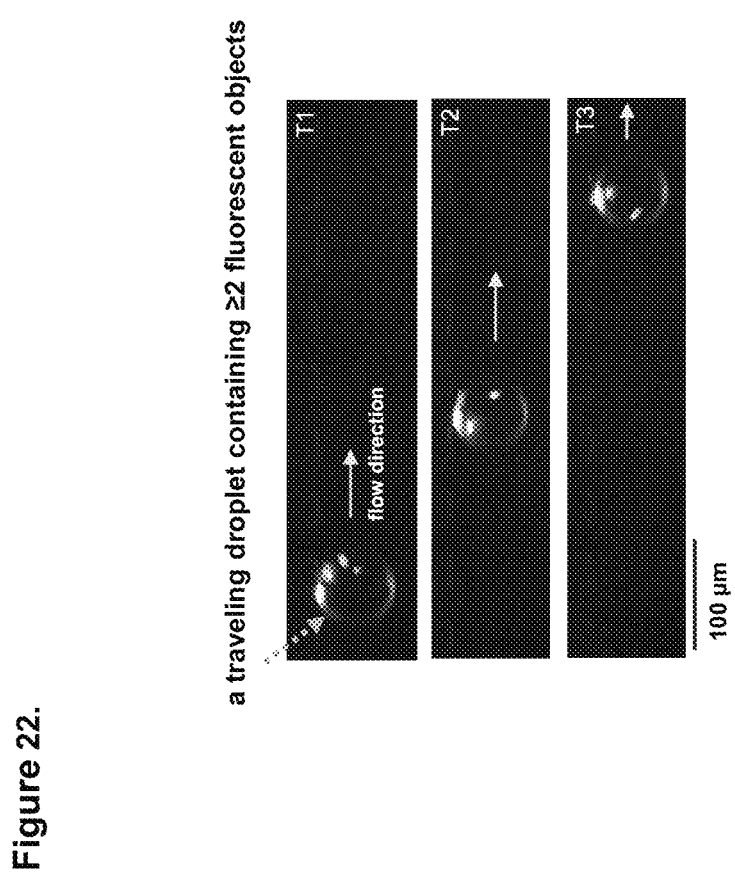
FIG. 22 shows an example of droplet imaging as part of a point of detection utilizing a buffer zone design as shown in FIG. 17B, in accordance with embodiments.

Using a microdevice with a buffer zone as depicted in FIG. 17B, droplets were slowed in the buffer zone to obtain improved image resolution. FIG. 22 shows example images of a single mobile droplet containing multiple fluorescent objects, at time point 1 (T1), time point 2 (T2), and time point 3 (T3), respectively. Images were taken at a point of detection in the buffer zone using a color-mode (RGB) CMOS camera, each with a 20 ms (millisecond) exposure.

Example 5: Multi-Point Droplet Detection and Indexing

Figure 23:
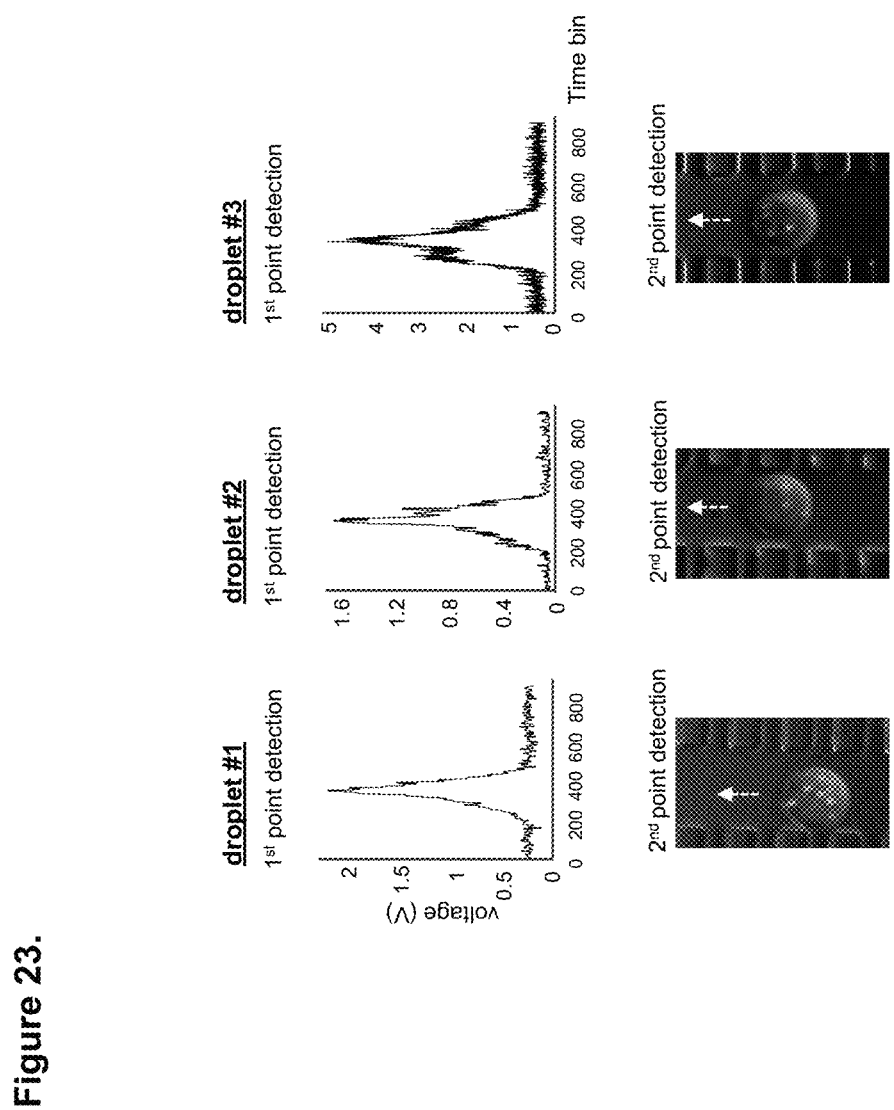
FIG. 23 shows an exemplary implementation of droplet detection and indexing, in accordance with embodiments.

As shown in FIG. 23, droplets were generated by encapsulating protein-A-coated microspheres that capture mouse anti-CD3 antibodies (Clone SP34) and fluorescently-labelled secondary antibodies (goat anti-mouse IgGs) with Alexa Fluor-488 ("AF-488"), Alexa Fluor-647 ("AF-647"), and Brilliant Violent-421 ("BV421") dyes. These droplets were subjected to two points of detection. The first point of detection was based on PMT (e.g., upstream of a sorting junction), and the second point of detection was based on a CMOS camera (e.g., downstream of a sorting junction). For the second point of detection, the images from 10 ms exposure correspond to green (AF-488), far red (AF-647), and blue (BV421) channel for droplet #1, #2, and #3, respectively. Fluorescence was excited at laser wavelengths 405 nm, 488 nm, and 638 nm, respectively. The individual droplets were indexed as described herein to keep track of their respective PMT signal (from the first point detection) and serial images (from the second point detection). Note that only one of serial images is shown for each of these indexed droplets.

In another exemplary assay, the intra-droplet fluorescent objects can be a variety of cells that are labeled with a cell-tracking dye, that positively express a fluorescent reporter protein (e.g., Green Fluorescent Protein), or that are fluorescently labelled for a cell surface marker (e.g., CD4, CD8, CD3, c-Kit and/or HER2).

Example 6: Implementation of Droplet Sensor

Figure 24B:
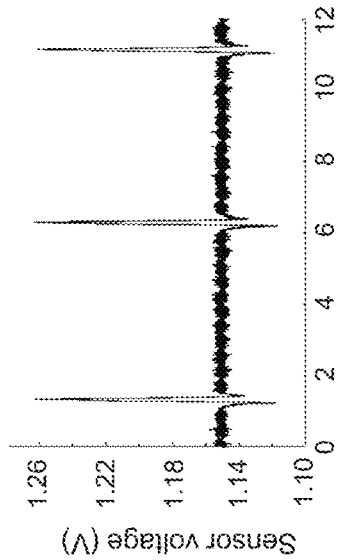
FIGS. 24B-24D show exemplary signals detected using the system of FIG. 24A, in accordance with embodiments.
Figure 24D:
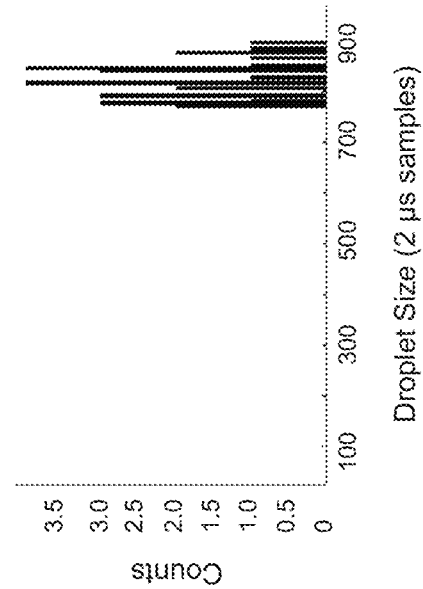
Figure 24A:
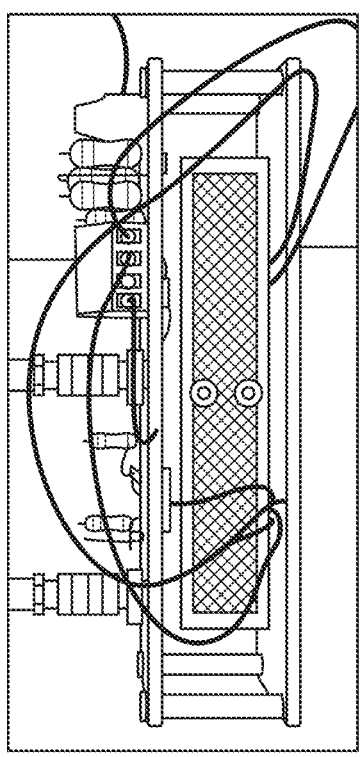
FIG. 24A shows an exemplary assembly of an exemplary optical sensor and its implementation to detect individual droplets, droplet size, droplet speed, and droplet position along a flow channel, in accordance with embodiments.
Figure 24C:
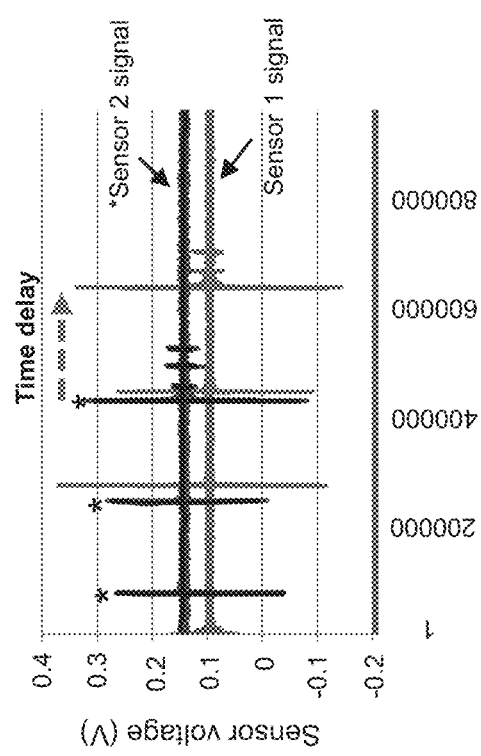

FIGS. 24A-24D show an assembly of an exemplary optical sensor and its implementation to detect individual droplets, droplet size, droplet speed, and droplet position along a flow channel. Light of an IR-LED (wavelength at 780 nm) was detected using a Si photodiode in reverse bias. The photodiode signal was high pass filtered (f=10 Hz cutoff) and amplified (gain=100). FIG. 24A shows a photograph of an assembly containing two optical sensors that was used to detect/sense droplets. FIG. 24B shows a photodiode voltage signal which was generated by droplets flowing through a glass capillary channel past the Si photodiode. FIG. 24C shows two sets of photodiode voltage signals representing droplets, which were detected by using two sensors positioned at a distance of 35 mm apart along a flow channel. From the signal time-delay and the known distance between the two sensors, the droplet velocity was calculated to time the precise dispensing step at a downstream droplet-dispensing module. FIG. 24D shows a histogram of droplet size distribution measured by the distance between the positive and negative spikes shown in FIG. 24C.

Example 7: Screening B Cells that Secrete IgGs Specifically Binding to a Human Antigen B cells can be isolated from the spleen or bone marrow of a mouse, or other commonly used animals such as rat and rabbit, after immunization with a human antigen (for example, CD3, HER2, IL-17A). Using methods described in this disclosure including those in FIGS. 14 and 15, immunization-derived mouse B cells, anti-mouse IgG coated microparticles, and Alexa Fluor 647 coated human antigen can be co-encapsulated into droplets with a homogeneous size (e.g., about 60 μm). Droplets can be collected in a tube and incubated off chip for 2-3 hours.

After incubation, droplets will be reinjected into the sorting unit. Target droplets can be detected based on a far-red peak signal that reflect the Alexa Fluor 647 fluorescent foci on the microparticles. The sorting actuator can be triggered by setting thresholds of the fluorescent signals. Then, the sorted droplets can be directed to the second point of detection through a microfluidic tubing (e.g., capillary) for double checking the fluorescent labeled target droplets. After passing the second point of detection threshold, the dispensing unit (x-y-z moving stage) will be triggered to dispense individual droplets into PCR tubes or strips. The dispensed droplets can be indexed and used for downstream analysis such as single cell PCR and further validation studies.

Example 8: Screening B Cells that Secrete Antigen Specific IgG with Magnetic Particles In this example, the sample is identical to the one used in Example 1, except that the anti-mouse IgG coated microparticles are magnetic. These magnetic microparticles can be aligned using a permanent or tunable electric magnet before a point of detection as shown in FIGS. 8A-8E. Compared to the randomly distributed microparticles, the pre-aligned magnetic microparticles will provide better focusing and thus increase detection efficiency and accuracy. The sorted droplets will be dispensed and indexed in individual tubes and used for downstream analysis such as single cell PCR and further validation studies.

Example 9: Functional Assay for Sorting B Cells Secreting Anti-CD3 Antibodies to Drive T Cell Activation Using Serial Sorting Primary B cell samples from immunized mouse, microparticles, and Jurkat reporter cells are co-encapsulated into droplets, and incubated for about 10 hours. Positive B cells secrete anti-CD3 antibodies that can activate Jurkat reporter cells which consequently produce Green Fluorescent Proteins (GFP) through a transcriptional signaling cascade in the reporter cells as a functional readout. Therefore, target droplets can be detected by the presence of green fluorescent signal when excited by a 488 nm laser beam, and sorted into the collection channel at a point of sorting that can be based on a dielectrophoretic force or an acoustic force.

The positive hits are usually extremely low for a functional antibody screening assay (e.g., <0.01% of starting B cells); therefore, false positive rate can be relatively high in part due to droplet-merging related passive sorting. To reduce false positive sorting, a second sorting unit can be added in a system and method exemplified in FIG. 9 to sort droplets again (i.e., serial sorting). The double-sorted droplets will be dispensed and indexed in individual tubes and used for downstream analysis such as single cell PCR and identification of the genetic sequences of resulting antibodies.

Example 10: Functional Assay for Sorting B Cells Secreting Anti-CD3 Antibodies to Drive T Cell Activation Using Serial Sorting Combined with Parallel Detection In this example, samples are the same as used in Example 3. However, the two detection points will share the same objective, which comprises a multi-zone detector such as a multi-zone PMT (e.g., Hamamatsu linear array multi-anode PMT module H11460-03). This method simplifies the optical path, leading to a compact design of the sorting device. Downstream dispensing, indexing and analyses can be done after the second step of sorting.

Example 11: Screening B Cells that Secrete IgG Specifically Binding to Both Human BCMA and Monkey BCMA with Signal Indexing for Tracking Individually Dispensed Droplets In this example, B cells will be stained with CellTrace Violet while human BCMA antigen conjugated with Alexa Fluor 488 and monkey BCMA antigen conjugated with Alexa Fluor 647 will be used. Microparticles coated with anti-mouse IgG will be used. All these reagents will be co-encapsulated into droplets together IgG-positive primary B cells that are enriched from the spleen of a human BCMA immunized mouse.

After about three hours of incubation at 37° C., droplets will be directed to a first point of detection to detect Alexa Fluor 647 and Alexa Fluor 488 fluorescent foci signal, and then double-positive droplets will be sorted to obtain a batch of target droplets, and the target droplets can be further detected the CellTrace signal that serves to indicate a live B cell and provide a precise timing of a target droplet to synchronize with its detection at an upstream point of detection. Only a target droplet with a live B cell will be dispensed into a multi-position collector, such as a 96-well PCR plate. By synchronizing each target droplet from its upstream first point of detection and a downstream second point of detection, the collected fluorescent signals (i.e., blue, green and red) of each said target droplet can be perfectly correlated to enable a very informative analysis of a single B cell within any target droplet.

Example 12: Implementation of Remote Focusing at a Point of Detection

The objective lens of one of disclosed cell sorting and dispensing systems in this disclosure while interfacing with the sample will be illuminated with a parallel beam through a beamsplitter followed by a cylindrical lens (for example, Thorlabs N-BK7 Mounted Plano-Convex Round Cyl. Lens, cat #LJ1629RM-A). The illumination beam will be selected of a diameter large enough to fill the back aperture of the objective lens as well as the aperture of the TAG lens (e.g., TAG Optics TAG Lens 2.0 Optimized for Visible Spectrum). Along the non-focusing axis of the cylindrical lens, the beam will be focused into a tight spot defined by the NA of the objective lens (e.g., Olympus 10$x$ NA 0.3 WD 10 mm air immersion lens). By changing the focal length of the TAG lens, the focal plane position at the sample can be rapidly translated and the same resolution can be realized along the entire axial extension of the channel.

Light from the sample will be captured with the same lens, separated from the illumination light via the beam splitter and focused into an aperture with a size corresponding to the lateral extension of the focal spot times the effective magnification of the objective lens before being detected with a PMT (e.g., Hamamatsu photosensor module #H10721).

This confocal detection scheme should efficiently suppress out-of-focus signal. Along the focusing axis of the cylindrical lens, the parallel illumination beam will be focused into the back focal plane of the objective lens resulting in a demagnification of the beam matching the width of the channel after exiting the objective lens. Along this direction, the aperture before the detector will be set to be large enough to cover the magnified image of the channel. The TAG lens will be located in the back focal plane of the objective lens coinciding with the focus position of the cylinder lens where the beam diameter should at its thinnest. Therefore, the effective aperture of the TAG lens will be very low and the beam propagation should be only minimally affected by TAG lens refocusing along the focusing axis of the cylinder lens.

Example 13: Suggested Implementation of Two-Sided Illumination/Detection at a Point of Detection In this example, our cell sorting and dispense system consists of two objective lenses (OL), OL1 and OL2 while interfacing with the sample via a prism (for example, Thorlabs Dove Prism, 15 mm, N-BK7, ARC: 350-700 nm PS992-A). Both objective lenses will be illuminated with a parallel beam through a beamsplitter followed by a cylinder lens. Along the non-focusing axis of the cylinder lens, the beam will be focused into a sheet defined by the numerical aperture of the objective lens as well as the illumination beam diameter. Light from the illuminated plane will then be captured with the opposing lens and separated from the illumination light via the beamsplitter. The signal will then be focused onto a PMT.

Example 14: Implementation of Multi-Zone Detection Modules at a Point of Detection In this example, our cell sorting and dispensing system consists of a constant or pulsed illumination source such as a continuous-wave (CW) laser or q-switched laser (e.g., Crystal Laser Diode Pumped Ultra-compact Q-switched Lasers). The targets will be imaged in a microfluidic device with objective lens and a tube lens on to an electron-multiplying CCDs (EMCCD) or scientific CMOS (sCMOS) camera chip (e.g., Photometrics Prime 95B back-illuminated sCMOS camera).

At minimum, two ways can be used to avoid motion blurriness. A sweeping deflector (e.g., Cambridge Galvanometer Scanner cat #62xx-H and 82xxK) in the detection path can be used to compensate for the particle movement and keep its image position constant on the camera chip during the camera exposure cycle. Alternatively, a brief illumination pulse can be used to limit signal photon generation at the sample plane to a time span in which the target has not moved significantly compared to the spatial resolution demanded.

Example 15: Alternative Implementation of Multi-Zone Detection Modules at Point(s) of Detection When viewed from the side, the design of our system and its detection modules is similar to a conventional optical detection within a single microfluidic channel. A parallel beam will pass through a cylinder optical element, viewed along the non-focusing axis. After passing a beam splitter, the beam will be focused into the microfluidic channel via an objective lens. Hence, a thin sheet of light will illuminate the channel perpendicular to the direction of flow.

Signals such as fluorescence will be picked up from the sample passing the channel at the location of the light sheet by the same objective lens, are reflected off the beam splitter and by passing through an aperture that blocks signals from out-of-focus planes. After passing the aperture, the signal will then be re-focused onto the active area of a suitable detector, such as a PMT.

When viewed from the front, i.e., looking at the cross-section of the channel(s), a single channel can be typically illuminated along its entire width. However, that width will be usually much smaller than the field of view of the optical arrangement. To utilize the full field of view to increase sample throughput, the sample can be split up within the microfluidic chip into multiple channels located next to each other (e.g., three channels of 0.1 mm width at a spacing of 0.1 mm resulting in a total demanded field of view of 0.5 mm).

Along this direction, the illumination beam will also be split into multiple parallel beams, for example, with a mask or a micro-lens array. Each beam will be focused into the back focal plane of the objective lens by the cylindrical optical element. The spacing and widths of the beams should be configured such that each channel is illuminated along its width.

Alternatively, a single beam can be used to illuminate all channels simultaneously. The advantage of using multiple beams is that the gap between channels will not be illuminated resulting in reduced background. Signals from all channels will be picked up by the objective lens and reflected off the beam splitter. With the tube lens, the light from each channel will be refocused into a bundle of parallel beams. An aperture can be used to spatially filter the bundle of beams to reduce background and crosstalk between channels. With another lens, each bundle will then be focused on a separate active area of a multi-zone detector such as a linear PMT array. Optical filters can be added to the detection path to select for specific wavelength bands. As an alternative to a multi-zone PMT, a camera could be used as detector where the light from the different fluidic channels is focused on different regions of the camera chip.

Example 16: Isolation of Antigen-Specific T Cells Based on Cytokine Secretion Profile Secretion of cytokines are a functional marker of many immune cells. For instance, CD8-positive cytotoxic T cells are known to become activated and secrete signatory cytokines such as IL-2, IFNγ, and TNFα, upon the T Cell Receptor (TCR) interaction with a cognate peptide-MHC complex presented by an antigen presenting cell or a cancerous cell where the peptide is processed from a tumor neoantigen such as MART-1 and NY-ESO-1. Typically, antigen-specific T cells are rare events (<0.01% of all T cells). To screen for a rare NY-ESO-1-specific cytotoxic T cell that may be present in a human blood sample or a patient-derived tumor infiltrating lymphocyte (TIL) sample, a NY-ESO-1 peptide (e.g., the peptide sequence comprising SLLMWITQV) can be presented by a MHC molecule (e.g. a HLA-A2 variant) on a model cell such as K562, to obtain an engineered antigen presenting cell, $K562^{NY-ESO-MHC}$. Then, $K562^{NY-ESO-MHC}$ cells can be co-encapsulated with a pool of human T cells derived from a donor or patient blood sample, as well as IFNγ capture microbeads (coated with a first anti-IFNγ antibody) and a second anti-IFNγ antibody labeled with Alexa Fluor 488-conjugated, such that the vast majority of droplets will each receive precisely zero or one candidate T cell, one or two $K562^{NY-ESO-MHC}$ cells, and at least one IFNγ capture microbead. Upon cognate interaction of a T cell and the encapsulated $K562^{NY-ESO-MHC}$ cell, the T cell may become activated which can be detected based on positive fluorescent focus formation on an IFNγ capture microbead in the droplets. Then, the focus-positive droplets, which are of low abundance, can be detected, sorted, and dispensed by using one or more exemplary systems described herein. The detected fluorescence signal data can be further processed and matched with each individual dispensed droplet to facilitate the analysis and identification of single T cells inside the recovered droplets.

Example 17: Identification of Circulating Tumor Cells (CTCs)

Circulating tumor cells (CTCs) represent an important topic for tumor liquid biopsy field. Circulating tumor cells (CTCs) are cells that have shed into the vasculature or lymphatics from a primary tumor and are carried around the body in the circulation. CTCs thus constitute seeds for the subsequent growth of additional tumors (metastases) in vital distant organs, triggering a mechanism that is responsible for the vast majority of cancer-related deaths. CTCs may serve as an important marker or diagnostic target for early tumor detection, tumor diagnosis, patient stratification, treatment monitoring, disease progression monitoring, and prognosis. Blood samples may be encapsulated in droplets with detection reagents for CTCs and subjected to immuno-detection or PCR detection to identify the ones with positive signals using the disclosed methods and systems in this disclosure. Identified (target) droplets) can then be sorted for further analysis as described herein.

Example 18. In Vitro Screening of Target Specific Compounds

Any of the disclosed exemplary systems and methods described herein can be used for the selection and screening of a target specific compound. A compound library comprising a plurality of compound-loaded beads that are also barcoded (i.e., the so-called "one kind of compounds on one bead", or, "one-compound-one-bead") can be individually compartmentalized with a target-expressing reporter cell within a plurality of droplets. If the provided target is bound by a specific compound in a same droplet, the reporter cell will produce a signal which can be a fluorescent molecule. The droplets can be detected and sorted using any of the disclosed exemplary systems and methods in this disclosure, to precisely identify the barcode on the recovered droplets and subsequently identify the candidate compound(s).

Example 19: Screening of Genome-Edited Cells

Any of the disclosed exemplary systems and methods described herein can be used for the screening of single cells (e.g., T cell, B cell, dendritic cells, natural killer cells, stem cell, beta cell, neuron cells, yeast, bacterium, etc.) that have been subjected to a CRISPR-cas9 mediated genome editing. Edited (i.e., engineered) cells can be provided a readout assay to indicate a successful editing event. Individual edited cells can be encapsulated with assay reagents (if any) into individual sub-nanoliter droplets which may then be introduced into a microfluidic device for subsequent measurement of the readout signal that reflect an edited cell's function or phenotypes. Exemplary readout signal can be a GFP-reporter, a luminescent reporter, a fluorogenic substrate, and/or a fluorescent labelled detection bead. Target droplets with user-established readout criteria can be identified and recovered using any of the disclosed systems and methods described herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for detecting, sorting, and dispensing droplets for use in bioassays, the system comprising:
   a microfluidic device comprising a first channel connected to a second channel and a waste channel by a first sorting junction;
   a plurality of water-in-oil droplets, wherein at least two of the plurality of droplets each comprise at least one cell or at least one particle, wherein the plurality of water-in-oil droplets comprise a plurality of target droplets;
   a first detector corresponding to a first point of detection disposed along the first channel upstream of the sorting junction, wherein the first detector comprises an optical detector configured to detect a first signal from each of the plurality of target droplets at the first point of detection;
   a second detector or a sensor corresponding to a second point of detection disposed along the second channel downstream of the sorting junction, wherein the second detector or the sensor is configured to detect a second signal from each of the plurality of target droplets at the second point of detection;
   a target droplet dispensing module comprising a dispensing nozzle disposed downstream of the second point of detection and configured to dispense each of the plurality of target droplets; and
   a processor configured to receive the first signal of each of the plurality of target droplets from the first detector, receive the second signal of each of the plurality of target droplets from the second detector or the sensor, and index each of the plurality of target droplets dispensed by the dispensing nozzle with the first signal of a same target droplet or the second signal of the same target droplet such that each of the plurality of target droplets matches precisely the first signal or second signal of the same target droplet.

2. The system of claim 1, further comprising an optical element configured to provide dual focusing along the first channel at the first point of detection.

3. The system of claim 2, wherein the optical element comprises an optical fiber splitter or a birefringent polarizer configured to split an energy beam generated by one or more lasers or laser-like sources into a first beam and a second beam and direct the first and second beams to the first point of detection.

4. The system of claim 1, wherein the second detector comprises an optical detector or a non-optical detector.

5. The system of claim 1, wherein the second detector or the sensor comprises a photo multiplier tube (PMT), a camera, a camera-like detector, or an avalanche photodiode detector (APD).

6. The system of claim 1, wherein the second detector or the sensor is configured to detect two or more optical signals for each of the plurality of target droplets, wherein the two or more optical signals detected by the second detector or the sensor comprise the second signal from the second point of detection.

7. The system of claim 6, further comprising an optical assembly configured to provide a short illumination for generating one of the two or more optical signals at the second point of detection, wherein a duration of the short illumination is within a range of about 0.5 to about 50 milliseconds.

8. The system of claim 7, wherein the optical assembly comprises a modulated or pulsed laser source, and wherein the short illumination comprises stroboscopic illumination provided by the modulated or pulsed laser source.

9. The system of claim 8, wherein the first detector is configured to provide a precise timing trigger to the optical assembly to trigger the stroboscopic illumination.

10. The system of claim 1, wherein the processor is configured to control the target droplet dispensing module such that the target droplet dispensing module dispenses the target droplets into one or more collection tubes or plates in a controlled manner.

11. The system of claim 1, wherein the processor is configured to synchronize the dispensing nozzle with one or more of the first detector, the second detector, or the sensor based on one or more of the first signal or the second signal.

12. The system of claim 1, further comprising a laser modulator comprising an optical element configured for remote focusing such that multiple focal planes at different axial positions along the first channel or the second channel are detectable in rapid sequence or in parallel.

13. The system of claim 1, further comprising an optical element configured to generate a uniform, non-diffracting beam across the first or second channel at the first or second point of detection, respectively.

* * * * *